(12) United States Patent
Yeo et al.

(10) Patent No.: US 11,490,385 B2
(45) Date of Patent: Nov. 1, 2022

(54) TRANSMISSION AND RECEPTION METHOD AND APPARATUS FOR REDUCING TRANSMISSION TIME INTERVAL IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Yongjun Kwak, Gyeonggi-do (KR); Juho Lee, Gyeonggi-do (KR); Youngbum Kim, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/077,523

(22) Filed: Oct. 22, 2020

(65) Prior Publication Data

US 2021/0045112 A1 Feb. 11, 2021

Related U.S. Application Data

(63) Continuation of application No. 16/437,959, filed on Jun. 11, 2019, now Pat. No. 11,395,293, which is a (Continued)

(30) Foreign Application Priority Data

Apr. 2, 2015 (KR) .................. 10-2015-0046828
Jul. 20, 2015 (KR) .................. 10-2015-0102675

(51) Int. Cl.
*H04W 72/04* (2009.01)
*H04L 1/18* (2006.01)
(Continued)

(52) U.S. Cl.
CPC .......... *H04W 72/0446* (2013.01); *H04L 1/18* (2013.01); *H04L 1/1854* (2013.01);
(Continued)

(58) Field of Classification Search
CPC ......... H04W 72/0446; H04W 72/1205; H04W 72/14; H04L 1/18; H04L 1/1854;
(Continued)

(56) References Cited

U.S. PATENT DOCUMENTS

2009/0279493 A1 11/2009 Gaal et al.
2010/0089247 A1 4/2010 Miettinen et al.
(Continued)

FOREIGN PATENT DOCUMENTS

EP 2 509 380 10/2012
EP 2 538 601 12/2012
(Continued)

OTHER PUBLICATIONS

U.S. Office Action dated Jan. 8, 2021 issued in counterpart U.S. Appl. No. 16/437,959, 9 pages.
(Continued)

*Primary Examiner* — Hashim S Bhatti
(74) *Attorney, Agent, or Firm* — The Farrell Law Firm, P.C.

(57) ABSTRACT

Methods and apparatuses for signal transmission and reception are provided for a wireless communication system. A message including resource configuration information for a physical uplink control channel (PUCCH) is transmitted to a terminal on higher layer signaling. The resource configuration information includes information on physical resource blocks (PRBs). Downlink control information (DCI) is transmitted to the terminal on a physical downlink control channel (PDCCH). The DCI includes a resource indicator for explicitly indicating the resource configuration information. Uplink control information (UCI) is received from the terminal on the PUCCH based on the PRBs associated with the resource configuration information indicated by the resource indicator.

20 Claims, 72 Drawing Sheets

Related U.S. Application Data continuation of application No. 15/562,343, filed as application No. PCT/KR2016/003441 on Apr. 4, 2016, now Pat. No. 10,595,312.

(51) Int. Cl.
*H04L 5/00* (2006.01)
*H04W 72/12* (2009.01)
*H04W 72/14* (2009.01)

(52) U.S. Cl.
CPC .......... *H04L 1/1861* (2013.01); *H04L 5/0035* (2013.01); *H04L 5/0048* (2013.01); *H04L 5/0053* (2013.01); *H04L 5/0055* (2013.01); *H04L 5/0057* (2013.01); *H04L 5/0094* (2013.01); *H04W 72/1205* (2013.01); *H04W 72/14* (2013.01); *H04L 1/1822* (2013.01); *H04L 1/1864* (2013.01)

(58) Field of Classification Search
CPC ... H04L 1/1861; H04L 5/0035; H04L 5/0048; H04L 5/0053; H04L 5/0055; H04L 5/0057; H04L 5/0094; H04L 1/1822; H04L 1/1864; H04L 5/0078
See application file for complete search history.

(56) References Cited

U.S. PATENT DOCUMENTS

| | | |
|---|---|---|
| 2010/0151874 A1 | 6/2010 | Cai et al. |
| 2011/0292902 A1 | 12/2011 | Yang et al. |
| 2011/0310777 A1 | 12/2011 | Jiang et al. |
| 2012/0039281 A1* | 2/2012 | Pajukoski .............. H04J 11/003 370/329 |
| 2012/0236814 A1 | 9/2012 | Nishio et al. |
| 2012/0263246 A1 | 10/2012 | Gazit et al. |
| 2012/0327916 A1* | 12/2012 | Ahn ...................... H04L 1/1671 370/336 |
| 2013/0034073 A1 | 2/2013 | Alba |
| 2013/0039307 A1* | 2/2013 | Han .................... H04W 52/146 370/329 |
| 2013/0081026 A1 | 3/2013 | Malkamaki et al. |
| 2013/0107861 A1 | 5/2013 | Cheng et al. |
| 2013/0121274 A1 | 5/2013 | Chen et al. |
| 2013/0163551 A1 | 6/2013 | He et al. |
| 2013/0303178 A1 | 11/2013 | Jitsukawa et al. |
| 2013/0308572 A1 | 11/2013 | Sayana |
| 2014/0071954 A1 | 3/2014 | Au et al. |
| 2014/0153539 A1 | 6/2014 | Seo |
| 2014/0254410 A1 | 9/2014 | Seo |
| 2014/0269452 A1* | 9/2014 | Papasakellariou .... H04L 5/0055 370/280 |
| 2014/0286277 A1 | 9/2014 | Jang et al. |
| 2014/0293942 A1 | 10/2014 | Kang et al. |
| 2014/0376422 A1 | 12/2014 | Dai et al. |
| 2015/0016377 A1 | 1/2015 | Kim et al. |
| 2015/0036651 A1 | 2/2015 | Takeda et al. |
| 2015/0043476 A1 | 2/2015 | Takeda |
| 2015/0131565 A1 | 5/2015 | Nakashima |
| 2016/0066316 A1 | 3/2016 | Bhushan |
| 2016/0192261 A1 | 6/2016 | Wang et al. |
| 2017/0251466 A1 | 8/2017 | Astely |
| 2017/0318564 A1 | 11/2017 | Lee |
| 2017/0325164 A1 | 11/2017 | Lee |
| 2018/0041325 A1 | 2/2018 | Lee |
| 2018/0042013 A1 | 2/2018 | Byun |
| 2018/0132272 A1 | 5/2018 | Sun |
| 2018/0288745 A1 | 10/2018 | Davydov et al. |
| 2021/0168843 A1 | 6/2021 | Takeda et al. |

FOREIGN PATENT DOCUMENTS

| | | |
|---|---|---|
| EP | 2 768 264 | 8/2014 |
| EP | 3 119 014 | 1/2017 |
| WO | WO 2013/137699 | 9/2013 |

OTHER PUBLICATIONS

U.S. Final Office Action dated Oct. 6, 2021 issued in counterpart U.S. Appl. No. 16/437,959, 17 pages.
European Search Report dated Nov. 26, 2021 issued in counterpart appln. No. 21197185.8-1205, 9 pages.
European Search Report dated Dec. 1, 2021 issued in counterpart appln. No. 21197197.3-1205, 9 pages.
Ericsson, "Study on Latency Reduction Techniques For LTE", RP-150310, Motivation for New Proposed SI, 3GPP TSG RAN #67, Mar. 3, 2015, 16 pages.
Korean Office Action dated Jul. 6, 2021 issued in counterpart application No. 10-2015-0102675, 10 pages.
PCT/ISA/210 Search Report dated Jul. 22, 2016 issued in PCT/KR2016/003441 (pp. 4).
PCT/ISA/237 Written Opinion dated Jul. 22, 2016 issued in PCT/KR2016/003441 (pp. 5).
3GPP TSG RAN Meeting #67, Shanghai, China, Mar. 9-12, 2015, Motivation of New SI Proposal Latency Reduction, pp. 14.
3GPP TSG RAN WG1 Meeting #80, Athens, Greece, Feb. 9-13, 2015, Uplink control channel design for MTC EUs, pp. 8.
European Search Report dated Feb. 11, 2019 issued in counterpart application No. 16773511.7-1219, 16 pages.
European Search Report dated Mar. 2, 2018 issued in counterpart application No. 16773511.7-1219, 17 pages.
European Search Report dated Dec. 16, 2019 issued in counterpart application No. 16773511.7-1219, 7 pages.
U.S. Office Action dated Feb. 7, 2022 issued in counterpart U.S. Appl. No. 16/437,959, 10 pages.

\* cited by examiner

FIG. 44

| Conf\SF | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | | | | | | | | | | | | | | | | |
| 1 | | | | | 4 | 4 | | | | | | | | | 4 | 4 | | | | |
| 2 | | | | | 5,6 | 4,5 | | | | | | | | | 5,6 | 4,5 | | | | |
| 3 | | | | | 6,7,8 | 4,5,6 | | | | | | | | | 6,7,8 | 4,5,6 | | | | |
| 4 | | | | | 13,14 | 12,13 | 11,12 | 10,11 | 9,10 | 8,9 | | | | | | | | | | |
| 5 | | | | | 13,14,15,16 | 10,11,12,13 | 8,9,10 | 6,7,8 | | | | | | | | | | | | |
| 6 | | | | | 11,12,13,14,15,16,17,18 | 4,5,6 / 7,8,9 / 10,11 | 6 | 6 | | | | | | | 4 | | | | | |

Slot number

TDD configuration

FIG. 45A

| SF\Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 |  |  |  |  | 4 | 4 |  |  |  |  |  |  |  |  | 4 | 4 |  |  |  |  |
| 1 |  |  |  |  | 4,5,6 | 4 |  |  |  |  |  |  |  |  | 4,5,6 | 4 |  |  |  |  |
| 2 |  |  |  |  | 4,5,6,7,8 | 4 |  |  |  |  |  |  |  |  | 4,5,6,7,8 | 4 |  |  |  |  |
| 3 |  |  |  |  | 4,5,6,7,8,9,10,11,12,13,14 | 4 |  |  |  |  |  |  |  |  |  |  |  |  |  |  |
| 4 |  |  |  |  | 4,5,6,7,8,9,10,11,12,13,14,15,16 | 4 |  |  |  |  |  |  |  |  |  |  |  |  |  |  |
| 5 |  |  |  |  | 4,5,6,7,8,9,10,11,12,13,14,15,16,17,18 | 4 |  |  |  |  |  |  |  |  |  |  |  |  |  |  |
| 6 |  |  |  |  | 4,5,6 | 4 |  |  |  |  |  |  |  |  | 4 | 4 |  |  |  |  |

FIG. 45B

| SF\Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 4 | 4 | | | | | | | | | 4 | 4 | | | | |
| 1 | | | | | 4,6 | 4,6 | | | | | | | | | 4,6 | 4,6 | | | | |
| 2 | | | | | 4,6,8 | 4,6,8 | | | | | | | | | 4,6,8 | 4,6,8 | | | | |
| 3 | | | | | 4,6,8,10 12,14 | 4,6,8,10 12,14 | | | | | | | | | | | | | | |
| 4 | | | | | 10,12 14,16 | 10,12 14,16 | 6,8,10 | 6,8,10 | | | | | | | | | | | | |
| 5 | | | | | 4,6,8,10 12,14 16,18 | 4,6,8 10,12,14 16,18 | | | | | | | | | | | | | | |
| 6 | | | | | 6 | 6 | 6 | 6 | | | | | | | 4 | 4 | | | | |

FIG. 45C

| SF\Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | | | | | | | | | | | | | | | | |
| 1 | | | | | 4 | 4 | | | | | | | | | 4 | 4 | | | | |
| 2 | | | | | 4,6 | 4,6 | | | | | | | | | 4,6 | 4,6 | | | | |
| 3 | | | | | 4,6,8 | 4,6,8 | | | | | | | | | 4,6,8 | 4,6,8 | | | | |
| 4 | | | | | 10,12,14 | 10,12,14 | 6,8,10 | 6,8,10 | | | | | | | | | | | | |
| 5 | | | | | 10,12,14,16 | 10,12,14,16 | 6,8,10 | 6,8,10 | | | | | | | | | | | | |
| 6 | | | | | 4,6,8,10,12,14,16,18 | 4,6,8,10,12,14,16,18 | | | | | | | | | 4 | 4 | | | | |
| 7 | | | | | 4,6 | 4,6 | | | | | | | | | | | | | | |

FIG. 45D

| SF\Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | | | | | | | | | | | | | | | | |
| 1 | | | | | 4 | 4 | | | | | | | | | 4 | 4 | | | | |
| 2 | | | | | 4,6 | 4,6 | | | | | | | | | 4,6 | 4,6 | | | | |
| 3 | | | | | 4,6,8 | 4,6,8 | | | | | | | | | 4,6,8 | 4,6,8 | | | | |
| 4 | | | | | 12,14 | 12,14 | 10,12 | 10,12 | 8,10 | 8,10 | | | | | | | | | | |
| 5 | | | | | 10,12, 14,16 | 10,12, 14,16 | 6,8,10 | 6,8,10 | | | | | | | | | | | | |
| 6 | | | | | 4,6 8,10 12,14 16,18 | 4,6 8,10 12,14 16,18 | | | | | | | | | | | | | | |
| 7 | | | | | 4,6 | 4,6 | | | | | | | | | 4 | 4 | | | | |

FIG. 45E

| SF\Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | | | | | | | | | | | | | | | | |
| 1 | | | | | 5,6 | 5 | 5 | | | | | | | | | 5 | 5 | | | |
| 2 | | | | | 5,6,7,8,13,14 | | 5,6 | | | | | | | | 5,6 | | 5,6 | | | |
| 3 | | | | | 13,14 | 12,13 | 11,12 | 10,11 | 9,10 | 8,9 | | | | | | | | | | |
| 4 | | | | | 13,14,15,16 | 10,11,12,13 | 8,9,10 | 6,7,8 | | | | | | | | | | | | |
| 5 | | | | | 11,12,13,14,15,16,17,18 | 6,7,8,9,10,11,24,25 | | | | | | | | | | | | | | |
| 6 | | | | | 6,14 | 6,14 | 6 | 6 | | | | | | | | | | | | |

FIG. 46A

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | | | | | | | | | | | | | | | | |
| 1 | | | | | 5,6 | 5 | 5 | | | | | | | | 5,6 | 5 | 5 | | | |
| 2 | | | | | 5,6,7,8,13,14 | | 5,6 | | | | | | | | 5,6,7,8,13,14 | | 5,6 | | | |
| 3 | | | | | 5,6,7,8,9,10,11,12,13,14 | 5 | 5 | | | | | | | | | | | | | |
| 4 | | | | | 5,6,7,8,9,10,11,12,13,14,15,16 | 5 | 5 | | | | | | | | | | | | | |
| 5 | | | | | 5,6,7,8,9,10,11,12,13,14,15,16,17,18,23 | 5 | | | | | | | | | | | | | | |
| 6 | | | | | 5,6,13,14 | 5 | 5 | | | | | | | | | | | | | |

FIG. 46B

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | | | | | | | | | | | | | | | | |
| 1 | | | | 5,6 | 5 | 5 | | | | | | | | 5,6 | 5 | 5 | | | | |
| 2 | | | | 6,8,14 | 6,8,14 | | | | | | | | | 6,8,14 | 6,8, 14 | | | | |
| 3 | | | | 12,14 | 12,14 | | 10,12 | | | | | | | | | | | | |
| 4 | | | | 10,12, 14,16 | 10,12, 14,16 | 6,8,10 | 6,8,10 | 8,10 | 8,10 | | | | | | | | | | |
| 5 | | | | 6,8,10, 12,14,16 18,24 | 6,8,10, 12,14, 16, 18,24 | | | | | | | | | | | | | |
| 6 | | | | 6,14 | 6,14 | 6 | 6 | | | | | | | | | | | | |

FIG. 46C

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 6 | | | | | | | | | | | | | | |
| 1 | | | | | 6 | 6 | 6 | 6 | | | | | | | 6 | 6 | 6 | 6 | | |
| 2 | | | | | 8,13,14 | 6,7,8 | | | | | | | | | 8,13,14 | 6,7,8 | | | | |
| 3 | | | | | 13,14 | 12,13 | 11,12 | 10,11 | 9,10 | 8,9 | | | | | | | | | | |
| 4 | | | | | 13,14,15,16 | 10,11,12,13 | 8,9,10 | 6,7,8 | | | | | | | | | | | | |
| 5 | | | | | 13,14,15,16,17,18,23,24 | 6,7,8,9,10,11,12,13 | | | | | | | | | | | | | | |
| 6 | | | | | 6 | 6 | 6 | 6 | | | | | | | | | 6 | 6 | | |

FIG. 46D

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 6 | | | | | | | | | | | | | | |
| 1 | | | | | 6 | 6 | 6 | 6 | | | | | | | 6 | 6 | 6 | 6 | | |
| 2 | | | | | 6,7,8,13,14 | 6 | | | | | | | | | 6,7,8,13,14 | 6 | | | | |
| 3 | | | | | 6,7,8,9,10,11,12,13,14 | 6 | 6 | 6 | | | | | | | | | | | | |
| 4 | | | | | 6,7,8,9,10,11,12,13,14,15,16 | 6 | 6 | 6 | | | | | | | | | | | | |
| 5 | | | | | 6,7,8,9,10,11,12,13,14,15,16,17,18,23,24 | 6 | | | | | | | | | | | | | | |
| 6 | | | | | 6 | 6 | 6 | 6 | | | | | | | | | 6 | 6 | | |

FIG. 46E

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | | | | | | | | | | | | | | | | |
| 1 | | | | | 6 | 6 | 6 | 6 | | | | | | | 6 | 6 | 8 | 8 | | |
| 2 | | | | | 6 | 6 | 6 | 6 | | | | | | | 6 | 6 | | | | |
| 3 | | | | | 6,8,14 | 12,14 | 10,12 | 10,12 | 8,10 | 8,10 | | | | | 6,8,14 | 6,8,14 | | | | |
| 4 | | | | | 10,12,14,16 | 10,12,14,16 | 6,8,10 | 6,8,10 | | | | | | | | | | | | |
| 5 | | | | | 6,8,10,12,14,16,18,24 | 6,8,10,12,14,16,18,24 | | | | | | | | | | | | | | |
| 6 | | | | | 6 | 6 | 6 | 6 | | | | | | | | | 8 | 8 | | |

FIG. 48

| Conf \ SF | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 6 | 5 | 4 | 12 | 11 | | | | 6 | 6 | 5 | 4 | | | |
| 1 | | | | | 4 | 4 | 4 | 4 | | | | | | 4 | 4 | 4 | 4 | | 12 | 11 |
| 2 | | | | | 4 | 4 | | | | | | | | 4 | 4 | | | | | |
| 3 | | | | | 6 | 6 | 6 | 6 | 6 | 6 | | | | | | | | | | |
| 4 | | | | | 4 | 4 | 4 | 4 | | | | | | | | | | | | |
| 5 | | | | | 4 | 4 | | | | | | | | | | | | | | |
| 6 | | | | | 6 | 5 | 5 | 4 | 10 | 9 | | | | 5 | 4 | 4 | 4 | 4 | | |

TDD configuration

FIG. 49A

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 5 | 4 | 4 | 12 | 11 | | | | | 6 | 5 | 4 | 4 | 12 | 11 |
| 1 | | | | | 4 | 4 | 4 | 4 | | | | | | | 4 | 4 | 4 | 4 | | |
| 2 | | | | | 4 | 4 | 4 | | 4 | 4 | | | | | 4 | 4 | | | | |
| 3 | | | | | 6 | 5 | 4 | 4 | | | | | | | | | | | | |
| 4 | | | | | 4 | 4 | 4 | 4 | 4 | | | | | | | | | | | |
| 5 | | | | | 4 | 4 | 4 | 4 | 10 | 9 | | | | | 4 | 4 | 4 | 4 | | |
| 6 | | | | | 6 | 5 | 4 | 4 | | | | | | | | | | | | |

FIG. 49B

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 |  |  |  |  | 6 | 6 | 5 | 4 | 12 | 11 |  |  |  |  | 6 | 6 | 5 | 4 | 12 | 11 |
| 1 |  |  |  |  | 4 | 4 | 4 | 4 |  |  |  |  |  |  | 4 | 4 | 4 | 4 |  |  |
| 2 |  |  |  |  | 4 | 4 |  |  |  |  |  |  |  |  | 4 | 4 |  |  |  |  |
| 3 |  |  |  |  | 6 | 6 | 6 | 6 | 6 | 6 |  |  |  |  |  |  |  |  |  |  |
| 4 |  |  |  |  | 4 | 4 | 4 | 4 |  |  |  |  |  |  |  |  |  |  |  |  |
| 5 |  |  |  |  | 4 | 4 |  |  |  |  |  |  |  |  |  |  |  |  |  |  |
| 6 |  |  |  |  | 6 | 5 | 5 | 4 | 10 | 9 |  |  |  |  | 5 | 4 | 4 | 4 |  |  |

FIG. 49C

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 |  |  |  |  | 6 | 5 | 4 | 13 | 12 | 11 |  |  |  |  | 6 | 5 | 4 | 13 | 12 | 11 |
| 1 |  |  |  |  | 4 | 5 | 4 | 13 |  |  |  |  |  |  | 4 | 5 | 4 | 13 |  |  |
| 2 |  |  |  |  | 4 | 5 | 4 |  |  |  |  |  |  |  | 4 | 5 |  |  |  |  |
| 3 |  |  |  |  | 6 | 5 | 6 | 5 | 6 | 5 |  |  |  |  |  |  |  |  |  |  |
| 4 |  |  |  |  | 4 | 5 | 4 | 5 |  |  |  |  |  |  |  |  |  |  |  |  |
| 5 |  |  |  |  | 4 | 5 |  |  |  |  |  |  |  |  |  |  |  |  |  |  |
| 6 |  |  |  |  | 6 | 5 | 12 | 11 | 10 | 9 |  |  |  |  | 4 | 5 | 4 | 13 |  |  |

FIG. 49D

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 5 | 4 | 5 | 12 | 11 | | | | | 6 | 5 | 4 | 5 | 12 | 11 |
| 1 | | | | | 4 | 5 | 4 | 5 | | | | | | | 4 | 5 | 4 | 5 | | |
| 2 | | | | | 4 | 5 | | 5 | 6 | 5 | | | | | 4 | 5 | | | | |
| 3 | | | | | 6 | 5 | 6 | 5 | | | | | | | | | | | | |
| 4 | | | | | 4 | 5 | 4 | 5 | | | | | | | | | | | | |
| 5 | | | | | 4 | 5 | | | | | | | | | | | | | | |
| 6 | | | | | 6 | 5 | 4 | 5 | 10 | 9 | | | | | 4 | 5 | 6 | 5 | | |

FIG. 49E

| SF Conf | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 5 | 5 | 13 | 12 | 11 | | | | | 6 | 5 | 5 | 13 | 12 | 11 |
| 1 | | | | | 5 | 5 | 5 | 11 | | | | | | | 5 | 5 | 5 | 11 | | |
| 2 | | | | | 5 | 5 | | | | | | | | | 5 | 5 | | | | |
| 3 | | | | | 6 | 5 | 5 | 5 | 5 | 5 | | | | | | | | | | |
| 4 | | | | | 5 | 5 | 5 | 5 | | | | | | | | | | | | |
| 5 | | | | | 5 | 5 | 5 | | | | | | | | | | | | | |
| 6 | | | | | 6 | 5 | 12 | 11 | 10 | 9 | | | | | 5 | 5 | 5 | 13 | | |

FIG. 50A

| Conf\SF | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 5 | 14 | 13 | 12 | 11 | | | | | 6 | 5 | 14 | 13 | 12 | 11 |
| 1 | | | | | 6 | 5 | 12 | 11 | | | | | | | | 5 | 12 | 11 | | |
| 2 | | | | | 6 | 5 | 6 | 5 | | | | | | | 6 | 5 | | | | |
| 3 | | | | | 6 | 5 | 6 | 5 | 6 | 5 | | | | | | | | | | |
| 4 | | | | | 6 | 5 | | | | | | | | | | | | | | |
| 5 | | | | | 6 | 5 | 12 | 11 | 10 | 9 | | | | | | | 14 | 13 | | |
| 6 | | | | | 6 | 5 | | | | | | | | | 6 | 5 | | | | |

FIG. 50B

| Conf \ SF | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 5 | 6 | 5 | 12 | 11 | | | | | 6 | 5 | 6 | 5 | 12 | 11 |
| 1 | | | | | 6 | 5 | 6 | 5 | | | | | | | 6 | 5 | 6 | 5 | 12 | |
| 2 | | | | | 6 | 5 | | | 6 | 5 | | | | | 6 | 5 | | | | |
| 3 | | | | | 6 | 5 | | 5 | | | | | | | | | | | | |
| 4 | | | | | 6 | 5 | 6 | 5 | | | | | | | | | | | | |
| 5 | | | | | 6 | 5 | | | | | | | | | | | | | | |
| 6 | | | | | 6 | 5 | 6 | 5 | 10 | 9 | | | | | 6 | 5 | 6 | 5 | | |

FIG. 50C

| Conf \ SF | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 7 | 6 | 14 | 13 | 12 | 12 | | | | | 7 | | 14 | 13 | | |
| 1 | | | | | 6 | 6 | 12 | 12 | | | | | | | 6 | 6 | 12 | 12 | 12 | 12 |
| 2 | | | | | 6 | 6 | | | | | | | | | 6 | 6 | | | | |
| 3 | | | | | 6 | 6 | 6 | 6 | 6 | 6 | | | | | | | | | | |
| 4 | | | | | 6 | 6 | 6 | 6 | | | | | | | | | | | | |
| 5 | | | | | | 6 | | | | | | | | | | | | | | |
| 6 | | | | | 6 | 6 | 12 | 11 | 11 | 10 | | | | | 6 | 6 | 14 | 13 | | |

FIG. 50D

| Conf\SF | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 7 | 6 | 13 | 12 | 11 | | | | | | | | | | |
| 1 | | | | | 6 | 7 | 6 | 11 | | | | | | | 6 | 7 | 6 | 13 | 12 | 11 |
| 2 | | | | | 6 | 7 | 6 | | | | | | | | 6 | 7 | 6 | 11 | | |
| 3 | | | | | 6 | 7 | 6 | 7 | 6 | 7 | | | | | | | | | | |
| 4 | | | | | 6 | 7 | 6 | 7 | | | | | | | | | | | | |
| 5 | | | | | 6 | 7 | | | | | | | | | | | | | | |
| 6 | | | | | 6 | 7 | 6 | 11 | 10 | 9 | | | | | 6 | 7 | 6 | 13 | | |

FIG. 50E

| Conf\SF | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 6 | 15 | 14 | 13 | 12 | 11 | | | | | 6 | 15 | 14 | 13 | 12 | 11 |
| 1 | | | | | 6 | 13 | 12 | 11 | | | | | | | 6 | 13 | 12 | | | |
| 2 | | | | | 6 | 11 | | | | | | | | | 6 | 11 | | | | |
| 3 | | | | | 6 | 7 | 6 | 7 | 6 | 7 | | | | | | | | | | |
| 4 | | | | | 6 | 7 | 6 | 7 | | | | | | | | | | | | |
| 5 | | | | | 6 | 7 | | | | | | | | | | | | | | |
| 6 | | | | | 6 | 13 | 12 | 11 | 10 | 9 | | | | | 6 | 15 | 14 | 13 | | |

FIG. 52

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG. 53A

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11632 | 12576 | 13536 | 14112 | 14688 |

FIG. 53B

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1680 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5332 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |

TRANSMISSION AND RECEPTION METHOD AND APPARATUS FOR REDUCING TRANSMISSION TIME INTERVAL IN WIRELESS CELLULAR COMMUNICATION SYSTEM

PRIORITY

This application is a Continuation Application of U.S. application Ser. No. 16/437,959, filed in the U.S. Patent and Trademark Office (USPTO) on Jun. 11, 2019, which is a Continuation Application of U.S. patent application Ser. No. 15/562,343, filed at the USPTO on Sep. 27, 2017, now U.S. Pat. No. 10,595,312, issued on Mar. 17, 2020, which is a National Phase Entry of PCT International Application No. PCT/KR2016/003441, filed on Apr. 4, 2016, which claims priority to Korean Patent Application No. 10-2015-0046828, filed on Apr. 2, 2015, and Korean Patent Application No. 10-2015-0102675, filed on Jul. 20, 2015, the contents of each of which are incorporated herein by reference.

BACKGROUND

1. Field

The present invention relates to a wireless communication system and, more particularly, to a method and apparatus for data transmission and reception with a reduced transmission time interval.

2. Description of Related Art

To cope with the increasing demand for wireless data traffic after commercialization of 4G communication systems, active efforts are underway to develop enhanced 5G or pre-5G communication systems. As such, 5G or pre-5G communication systems are referred to as beyond 4G communication systems or post LTE systems.

To achieve high data rates, use of the extremely high frequency (mmWave) band (e.g. 60 GHz band) is expected in a 5G communication system. To reduce propagation pathloss and to increase propagation distance at the mmWave band, use of various technologies such as beamforming, massive MIMO, full dimensional MIMO (FD-MIMO), array antenna, analog beamforming and large scale antenna are under discussion for 5G communication systems.

To enhance system networks, various technologies such as evolved or advanced small cell, cloud radio access network (cloud RAN), ultra-dense network, device-to-device (D2D) communication, wireless backhaul, moving network, cooperative communication, Coordinated Multi-Points (CoMP) and interference cancellation are under development for 5G communication systems.

In addition, for 5G communication systems, hybrid FSK and QAM modulation (FQAM) and sliding window superposition coding (SWSC) are under development for advanced coding modulation (ACM), and filter bank multi carrier (FBMC), non-orthogonal multiple access (NOMA) and sparse code multiple access (SCMA) are under development for advanced access.

In the LTE system as a representative example of a wideband wireless communication system, Orthogonal Frequency Division Multiplexing (OFDM) is used for the downlink (DL) and Single Carrier Frequency Division Multiple Access (SC-FDMA) is used for the uplink (UL). The uplink refers to a radio link through which a user equipment (UE) or mobile station (MS) sends a data or control signal to a base station (BS or eNode B), and the downlink refers to a radio link through which a base station sends a data or control signal to a user equipment. In such multiple access schemes, time-frequency resources used to carry user data or control information are allocated so as not to overlap each other (i.e. maintain orthogonality) to thereby identify the data or control information of a specific user.

The LTE system employs Hybrid Automatic Repeat reQuest (HARQ) to retransmit data at the physical layer when a decoding error has occurred in the initial transmission. HARQ is a scheme that enables the receiver having failed in decoding data to transmit information (NACK) indicating the decoding failure to the transmitter so that the transmitter can retransmit the corresponding data at the physical layer. The receiver may combine the retransmitted data with the previously received data for which decoding has failed, increasing data reception performance. When the data is correctly decoded, the receiver may send information (ACK) indicating successful decoding to the transmitter so that the transmitter can transmit new data.

FIG. 1 illustrates a basic structure of the time-frequency domain in the downlink of the LTE system serving as radio resources for transmitting data or control channels.

In FIG. 1, the horizontal axis denotes the time domain and the vertical axis denotes the frequency domain. In the time domain, the minimum unit for transmission is OFDMA symbols, $N_{symb}$ OFDMA symbols 102 constitute one slot 106, and two slots constitute one subframe 105. The length of a slot is 0.5 ms and the length of a subframe is 1.0 ms. The radio frame 114 is a time domain unit composed of 10 subframes. In the frequency domain, the minimum unit for transmission is subcarriers, and the total system bandwidth is composed of total $N_{BW}$ subcarriers 104.

The basic unit of resources in the time-frequency domain is a resource element (RE) 112. The RE may be represented by an OFDM symbol index and a subcarrier index. A resource block (RB, or physical resource block (PRB)) 108 is defined by $N_{symb}$ consecutive OFDM symbols 102 in the time domain and $N_{RB}$ consecutive subcarriers 110 in the frequency domain. Hence, one RB 108 is composed of $N_{symb} \times N_{RB}$ REs 112. In general, the minimum unit for data transmission is a resource block. Normally, in the LTE system, $N_{symb}$ is set to 7 and $N_{RB}$ is set to 12, and $N_{BW}$ and $N_{RB}$ are proportional to the system transmission bandwidth. The data rate may increase in proportion to the number of resource blocks scheduled for the user equipment. The LTE system defines and operates six transmission bandwidths. In the case of an FDD system where downlink and uplink frequencies are separately used, the downlink transmission bandwidth may differ from the uplink transmission bandwidth. The channel bandwidth denotes an RF bandwidth corresponding to the system transmission bandwidth. Table 1 illustrates a correspondence between the system transmission bandwidth and the channel bandwidth defined in the LTE system. For example, the transmission bandwidth of an LTE system having a channel bandwidth of 10 MHz is composed of 50 resource blocks.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

In a subframe, N initial OFDM symbols are used to transmit downlink control information. In general, N={1, 2, 3}. The value of N varies for each subframe according to the amount of control information to be sent at the current subframe. The control information may include a control channel transmission interval indicator indicating the number of OFDM symbols carrying control information, scheduling information for downlink data or uplink data, and HARQ ACK/NACK signals.

In the LTE system, scheduling information for downlink data or uplink data is sent by the base station to the UE in the form of Downlink Control Information (DCI). Various DCI formats are defined. The DCI format to be used may be determined according to various parameters related to scheduling information for uplink data (UL grant), scheduling information for downlink data (DL grant), compact DCI with a small size, spatial multiplexing using multiple antennas, and power control DCI. For example, DCI format 1 for scheduling information of downlink data (DL grant) is configured to include at least the following pieces of control information.

Resource allocation type 0/1 flag: this indicates whether the resource allocation scheme is of type 0 or type 1. Type 0 indicates resource allocation in the unit of Resource Block Group (RBG) by use of a bitmap. In the LTE system, the basic scheduling unit is a resource block (RB) represented as a time-frequency domain resource. An RBG including multiple RBs is the basic scheduling unit for type 0. Type 1 indicates allocation of a specific RB in one RBG.

Resource block assignment: this indicates an RB allocated for data transmission. The resource represented by resource block assignment is determined according to the system bandwidth and resource allocation scheme.

Modulation and coding scheme (MCS): this indicates the modulation scheme applied for data transmission and the transport block size for data to be sent.

HARQ process number: this indicates the process number of the corresponding HARQ process.

New data indicator: this indicates either initial transmission for HARQ or retransmission.

Redundancy version: this indicates the redundancy version for HARQ.

TPC (Transmit Power Control) command for PUCCH: this indicates a TPC command for Physical Uplink Control Channel (PUCCH) being an uplink control channel.

DCI is channel coded, modulated, and sent through Physical Downlink Control Channel (PDCCH or control information) or EPDCCH (enhanced PDCCH or enhanced control information).

In general, for each UE, DCI is scrambled with a specific Radio Network Temporary Identifier (RNTI, or UE ID), appended by a cyclic redundancy check (CRC) value, channel coded, and transmitted via independent PDCCH. In the time domain, PDCCH is mapped and transmitted during the control channel transmission interval. In the frequency domain, the mapping position of PDCCH is determined by the identifier (ID) of each UE and PDCCH is dispersed across the overall system transmission bandwidth.

Downlink data is sent via Physical Downlink Shared Channel (PDSCH) serving as a physical downlink data channel. The PDSCH is sent after the control channel transmission interval. Scheduling information for PDSCH such as mapping positions in the frequency domain or the modulation scheme is notified by DCI transmitted on the PDCCH.

The base station uses the 5-bit MCS field of control information constituting DCI to notify the UE of the modulation scheme applied to PDSCH (to be sent to UE) and the size of data to be sent (transport block size (TBS)). TBS indicates the size of a transport block (TB) before channel coding is applied for error correction.

Modulation schemes supported by the LTE system include QPSK (Quadrature Phase Shift Keying), 16QAM (Quadrature Amplitude Modulation), and 64QAM, whose modulation order ($Q_m$) is 2, 4 and 6, respectively. That is, it is possible to send 2, 4, and 6 bits per symbol by using QPSK, 16QAM, and 64QAM, respectively.

FIG. 2 is an illustration of a time-frequency domain structure of PUCCH transmission in the LTE-A system according to a related art. In other words, FIG. 2 illustrates a time-frequency domain structure of PUCCH transmission in the LTE-A system where PUCCH (Physical Uplink Control Channel) is a physical layer control channel through which the UE sends Uplink Control Information (UCI) to the base station.

The UCI may include at least one of the following pieces of control information.

HARQ-ACK: when no error is found in downlink data received from the base station through Physical Downlink Shared Channel (PDSCH, serving as a downlink data channel) to which HARQ is applied, the UE feedbacks ACK (Acknowledgement); and when an error is found therein, the UE feedbacks NACK (Negative Acknowledgement).

Channel Status Information (CSI): this includes Channel Quality Indicator (CQI), Precoding Matrix Indicator (PMI), Rank Indicator (RI), and signal carrying downlink channel coefficients. To achieve a desired level of data reception performance, the BS may set the Modulation and Coding Scheme (MCS) for data to be sent to the UE to a suitable value on the basis of CSI information obtained from the UE. The CQI indicates the signal to interference and noise ratio (SINR) for the full system bandwidth (wideband) or a part thereof (subband) and is normally represented as an MCS value indicating a specific level of data reception performance. The PMI/RI indicates precoding and rank information needed by the BS to send data through multiple antennas in a system supporting Multiple Input Multiple Output (MIMO). The signal carrying downlink channel coefficients may provide more detailed channel status information compared with the CSI signal, but with increased uplink overhead. Here, the UE is notified in advance, through higher layer signaling, by the BS of CSI configuration information, such as reporting mode indicating specific information items to be fed back, resource information indicating resources to be used, and transmission period. The UE sends CSI information to the BS by use of the CSI configuration information received in advance.

In FIG. 2, the horizontal axis denotes the time domain and the vertical axis denotes the frequency domain. In the time domain, the minimum unit for transmission is SC-FDMA symbols 201, $N_{symb}^{UL}$ SC-FDMA symbols constitute one slot 203 or 205, and two slots constitute one subframe 207. In the frequency domain, the minimum unit for transmission is subcarriers, and the total system transmission bandwidth 209 is composed of total $N_{BW}$ subcarriers. The value of $N_{BW}$ is proportional to the system transmission bandwidth.

The basic unit of resources in the time-frequency domain is a resource element (RE). The RE may be represented by an SC-FDMA symbol index and a subcarrier index. A resource block (RB) 211 or 217 is defined by $N_{symb}^{UL}$ consecutive SC-FDMA symbols in the time domain and $N_{sc}^{RB}$ consecutive subcarriers in the frequency domain. Hence, one RB is composed of $N_{symb}^{UL} \times N_{sc}^{RB}$ REs. In general, the minimum unit for transmitting data or control information is a resource block. The PUCCH is mapped to one RB in the frequency domain and transmitted for one subframe.

FIG. 2 illustrates a case where $N_{symb}^{UL}=7$, $N_{sc}^{RB}=12$, and $N_{RS}^{PUCCH}=2$ (the number of reference signals in one slot for channel estimation). Reference signals (RS) use constant amplitude zero auto-correlation (CAZAC) sequences. CAZAC sequences have a constant amplitude and have an autocorrelation of zero. When a given CAZAC sequence is cyclically shifted (CS) by a value greater than the delay spread of the propagation path to produce a new CAZAC sequence, the original CAZAC sequence and the new CAZAC sequence are orthogonal. Hence, a CAZAC sequence of length L may be used to generate up to L cyclically-shifted orthogonal CAZAC sequences. The length of a CAZAC sequence applied to the PUCCH is 12 (the number of subcarriers constituting one RB).

The UCI is mapped to a SC-FDMA symbol to which an RS is not mapped. FIG. 2 shows a case where total 10 UCI modulation symbols d(0), d(1), ..., d(9) (213 and 215) are mapped respectively to SC-FDMA symbols in one subframe. To multiplex UCI information of different UEs, each UCI modulation symbol is multiplied by a CAZAC sequence cyclically-shifted by a given value and mapped to the corresponding SC-FDMA symbol. To achieve frequency diversity, frequency hopping is applied to the PUCCH on a slot basis. The PUCCH is placed at an outer portion of the system transmission bandwidth so that the remaining portion thereof may be used for data transmission. For example, in the first slot of a subframe, the PUCCH is mapped to RB 211 disposed at an outermost portion of the system transmission bandwidth. In the second slot, the PUCCH is mapped to RB 217 disposed at another outermost portion of the system transmission bandwidth, where the frequency for RB 217 is different from that for RB 211. In general, the positions of the RBs to which the PUCCH for sending HARQ-ACK information and the PUCCH for sending CSI information are mapped do not overlap each other.

In the LTE system, for the PDSCH (physical layer channel for downlink data transmission) or the PDCCH/EPDDCH containing semi-persistent scheduling (SPS) release, the timing of the PUCCH or PUSCH (uplink physical layer channel sending HARQ ACK/NACK) may be fixed. For example, in the LTE system operating in frequency division duplex (FDD) mode, for the PDSCH or PDCCH/EPDCCH containing SPS release transmitted at n−4$^{th}$ subframe, HARQ ACK/NACK is sent through the PUCCH or PUSCH at n$^{th}$ subframe.

The LTE system adopts an asynchronous HARQ scheme where the data retransmission timing is not fixed in the downlink. That is, when HARQ NACK is fed back by the UE in response to initial data transmission from the BS, the BS may determine the retransmission timing freely according to the scheduling operation. For HARQ operation, the UE buffers the data causing a decoding error and combines the buffered data with the next retransmission data.

The LTE system adopts a synchronous HARQ scheme having fixed data transmission points in the uplink unlike downlink HARQ. That is, the uplink/downlink timing relationship among Physical Uplink Shared Channel (PUSCH), Physical Downlink Control Channel (PDCCH) followed by the PUSCH, and Physical Hybrid Indicator Channel (PHICH) carrying downlink HARQ ACK/NACK corresponding to the PUSCH are fixed according to the following rules.

If the PDCCH carrying uplink scheduling control information or the PHICH carrying downlink HARQ ACK/NACK is received from the BS at n$^{th}$ subframe, the UE transmits the PUSCH carrying uplink data corresponding to the control information at n+k$^{th}$ subframe. Here, k is specified differently for the FDD or TDD (time division duplex) mode and its configurations. For example, k is fixed to 4 for the FDD LTE system.

If the PHICH carrying downlink HARQ ACK/NACK is received from the BS at i$^{th}$ subframe, the PHICH corresponds to the PUSCH having been transmitted by the UE at i−k$^{th}$ subframe. Here, k is specified differently for the FDD or TDD mode and its configurations. For example, k is fixed to 4 for the FDD LTE system.

For a cellular wireless communication system, one of important performance criteria is the latency of packet data. To this end, in the LTE system, signals are sent and received on a subframe basis with a transmission time interval (TTI) of 1 ms. The LTE system may support UEs with a shortened-TTI less than 1 ms (shortened-TTI UE or shorter-TTI UE). Shortened-TTI UEs can be suitable for latency-critical services such as Voice over LTE (VoLTE) and remote control services. Shortened-TTI UEs can also be used to realize cellular-based mission critical Internet of Things (IoT).

In the current LTE or LTE-A system, base stations and user equipments are designed to transmit and receive on a subframe basis with a 1 ms TTI. To support a shortened-TTI UE with a TTI less than 1 ms in an environment where regular BSs and UEs operate with a 1 ms TTI, it is necessary to specify transmission and reception operations different from those of a regular LTE or LTE-A UE. Accordingly, the present invention proposes a detailed scheme that enables a regular LTE or LTE-A UE and a shortened-TTI UE to operate together in the same system.

Hence, in the LTE or LTE-A system supporting a short transmission time interval (TTI), it is necessary to define, for each TTI, downlink physical channels including Physical Downlink Control Channel (PDCCH), Enhanced Physical Downlink Control Channel (EPDCCH), Physical Downlink Shared Channel (PDSCH), Physical Hybrid ARQ Indicator Channel (PHICH) and Physical Control Format Indicator Channel (PCFICH), uplink physical channels including Physical Uplink Control Channel (PUCCH) and Physical Uplink Shared Channel (PUSCH), and a HARQ transmission scheme for the downlink and the uplink.

SUMMARY

To solve the above problems, an aspect of the present invention is to define the PDCCH, EPDCCH, PDSCH, PHICH, PCFICH, PUCCH and PUSCH for each TTI in the LTE or LTE-A system supporting a TTI less than 1 ms. Another aspect of the present invention is to define a HARQ transmission method for the downlink and the uplink in the above system. Another aspect of the present invention is to provide a resource allocation method and apparatus for the above physical channels and HARQ transmission.

In accordance with an aspect of the present invention, a method of signal transmission and reception for a base station in a wireless communication system is provided. A message including resource configuration information for a PUCCH is transmitted to a terminal on higher layer signaling. The resource configuration information includes information on PRBs. DCI is transmitted to the terminal on a PDCCH. The DCI includes a resource indicator for explicitly indicating the resource configuration information. UCI is received from the terminal on the PUCCH based on the PRBs associated with the resource configuration information indicated by the resource indicator.

In accordance with another aspect of the present invention, a method of signal transmission and reception for a terminal in a wireless communication system is provided. A message including resource configuration information for a PUCCH is received from a base station on higher layer signaling. The resource configuration information includes information on PRBs. DCI is received from the base station on a PDCCH. The DCI includes a resource indicator for explicitly indicating the resource configuration information. UCI is transmitted to the base station on the PUCCH based on the PRBs associated with the resource configuration information indicated by the resource indicator.

In accordance with another aspect of the present invention, a base station is provided in a wireless communication system. The base station includes a transceiver and a controller coupled with the transceiver. The controller is configured to transmit, to a terminal, a message including resource configuration information for a PUCCH on a higher layer signaling. The resource configuration information includes information on PRBs. The controller is also configured to transmit, to the terminal, DCI on a PDCCH. The DCI includes a resource indicator for explicitly indicating the resource configuration information. The controller is further configured to receive, from the terminal, UCI on the PUCCH based on the PRBs associated with the resource configuration information indicated by the resource indicator.

In accordance with another aspect of the present invention, a terminal is provided in a wireless communication system. The terminal includes a transceiver and a controller coupled with the transceiver. The controller is configured to receive, from a base station, a message including resource configuration information for a PUCCH on a higher layer signaling. The resource configuration information includes information on PRBs. The controller is also configured to receive, from the base station, DCI on a PDCCH. The DCI includes a resource indicator for explicitly indicating the resource configuration information. The controller is further configured to transmit, to the base station, UCI on the PUCCH based on the PRBs associated with the resource configuration information indicated by the resource indicator.

BRIEF DESCRIPTION OF THE DRAWINGS

FIG. 44 shows a table that specifies the points in time when the UE sends a HARQ ACK/NACK signal to the BS according to the fourteenth embodiment of the present invention.

FIGS. 45A, 45B, 45C, 45D, and 45E show tables that specify the points in time when the UE sends a HARQ ACK/NACK signal to the BS according to the fourteenth embodiment of the present invention.

FIGS. 46A, 46B, 46C, 46D, and 46E show tables that specify the points in time when the UE sends a HARQ ACK/NACK signal to the BS according to the fourteenth embodiment of the present invention.

FIG. 48 shows a table that specifies the points in time when the BS sends a HARQ ACK/NACK signal to the UE according to the fifteenth embodiment of the present invention.

FIGS. 49A, 49B, 49C, 49D, and 49E show tables that specify the points in time when the BS sends a HARQ ACK/NACK signal to the UE according to the fifteenth embodiment of the present invention.

FIGS. 50A, 50B, 50C, 50D, and 50E show tables that specify the points in time when the BS sends a HARQ ACK/NACK signal to the UE according to the fifteenth embodiment of the present invention.

FIG. 52 shows a table used for determining the TBS index based on the MCS index in the existing LTE system.

FIGS. 53A and 53B show tables used for determining the TBS according to the TBS index and the number of allocated PRBs in the existing LTE system.

DETAILED DESCRIPTION

Figure 1:
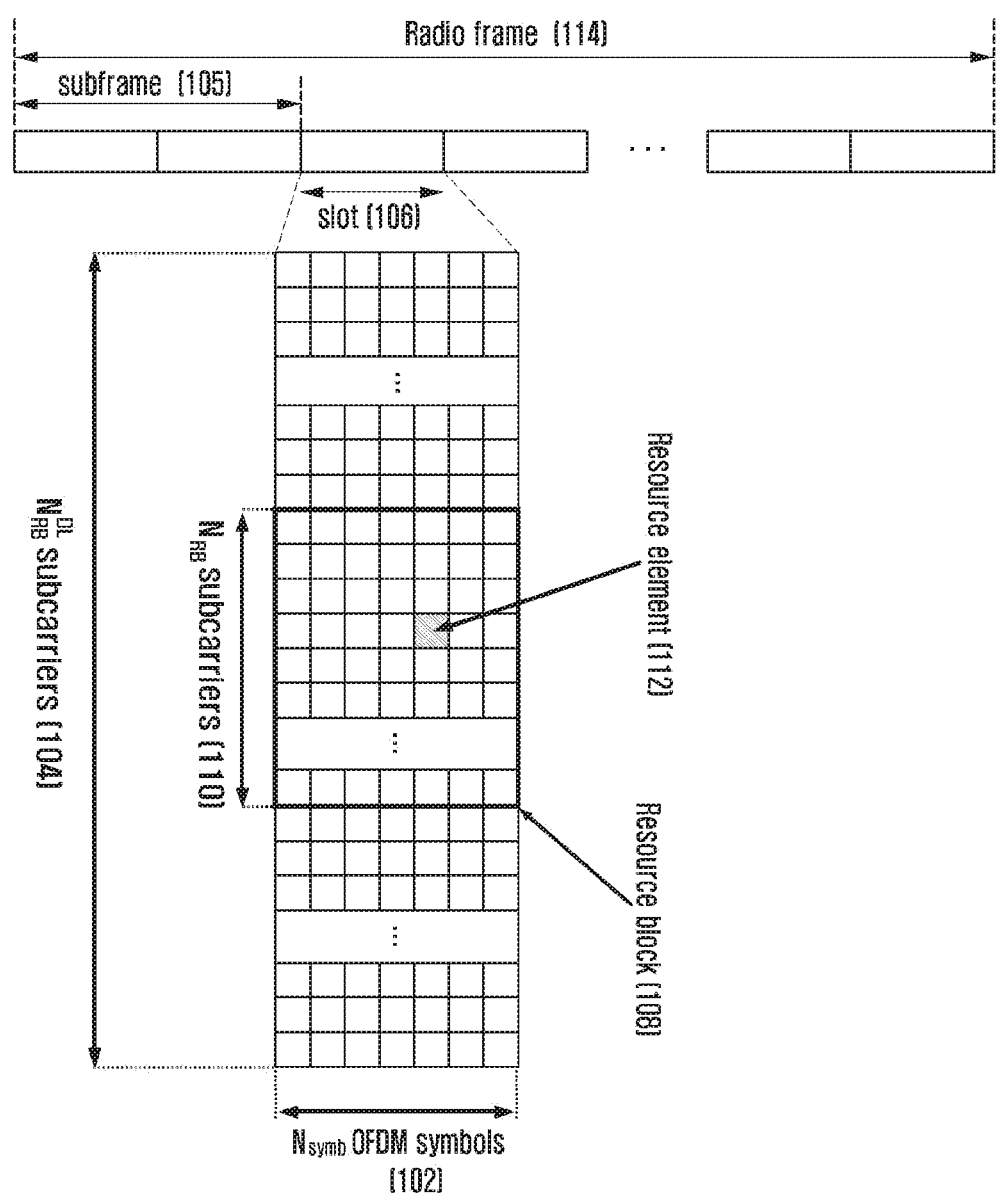
FIG. 1 illustrates a time-frequency domain structure for downlink transmission in the LTE or LTE-A system according to a related art.

Hereinafter, embodiments of the present invention are described in detail with reference to the accompanying drawings. Detailed descriptions of well-known functions and structures incorporated herein may be omitted to avoid obscuring the subject matter of the present invention. Particular terms may be defined to describe the present invention in the best manner. Accordingly, the meaning of specific terms or words used in the specification and the claims should be construed in accordance with the spirit of the present invention. In the following description, the term "base station" is a main agent allocating resources to UEs and may refer to at least one of eNode B, Node B, BS, radio access unit, base station controller, and network node. The term "user equipment (UE)" may refer to at least one of mobile station (MS), cellular phone, smartphone, computer, and multimedia system with a communication function. The term "downlink (DL)" refers to a wireless transmission path through which the BS sends a signal to the UE, and the term "uplink (UL)" refers to a wireless transmission path through which the UE sends a signal to the BS. The following description of embodiments is focused on the LTE or LTE-A system. However, it should be understood by those skilled in the art that the subject matter of the present invention is applicable to other communication systems having similar technical backgrounds and channel configurations without significant modifications departing from the scope of the present invention.

In the following description, a shortened-TTI UE may be referred to as a first type UE, and a normal-TTI UE may be referred to as a second type UE. The first type UE may refer to a UE that can transmit control information, data, or control information and data within a TTI less than or equal to 1 ms, and the second type UE may refer to a UE that can transmit control information, data, or control information and data within a TTI of 1 ms. The shortened-TTI UE may be used interchangeably with the first type UE, and the normal-TTI UE may be used interchangeably with the second type UE. Additionally, in the present invention, the terms "shortened-TTI", "shorter-TTI", "shortened TTI", "shorter TTI", "short TTI" and "sTTI" have the same meaning and may be used interchangeably. The terms "normal-TTI", "normal TTI", "subframe TTI" and "legacy TTI" have the same meaning and may be used interchangeably.

In the present invention, the first type UE may receive conventional SIB transmission or paging information with an existing TTI of 1 ms.

In the present invention, for the first type UE, the TTI length for downlink transmission may be different from that for uplink transmission. For example, two OFDM symbols may become a TTI for the downlink, and a slot of 0.5 ms may become a TTI for the uplink.

In the present invention, the short TTI is set so as not to cross the boundary of the existing subframe. However, in a different embodiment, the subframe may specify an additional OFDM symbol as a short TTI.

In the following description, shortened-TTI transmission may be referred to as first type transmission, and normal-TTI transmission may be referred to as second type transmission. In the first type transmission, a control signal, a data signal, or control and data signals may be transmitted within a TTI less than 1 ms. In the second type transmission, a control signal, a data signal, or control and data signals may be transmitted within a TTI of 1 ms. In the description, the terms "shortened-TTI transmission" and "first type transmission" may be used interchangeably, and the terms "normal-TTI transmission" and "second type transmission" may be used interchangeably. The first type UE may support both the first type transmission and the second type transmission or may support the first type transmission only. The second type UE may support the second type transmission only and cannot support the first type transmission. In the present invention, for ease of description, the phrase "for the first type UE" may be understood as "for the first type transmission".

In the present invention, the TTI in the downlink may refer to a unit for transmitting a control signal and data signal or for transmitting a data signal. For example, in the downlink of the existing LTE system, the TTI is a subframe of 1 ms. The TTI in the uplink may refer to a unit for transmitting a control signal or a data signal. For example, in the uplink of the existing LTE system, the TTI is a subframe of 1 ms (identical to the downlink).

In the present invention, the term "shortened-TTI mode" indicates a situation where the UE or BS sends or receives a control or data signal according to a shortened-TTI unit, and the term "normal-TTI mode" indicates a situation where the UE or BS sends or receives a control or data signal according to a subframe unit.

In the present invention, the term "shortened-TTI data" refers to data sent on the PDSCH or PUSCH sent or received according to a shortened-TTI unit, and the term "normal-TTI data" refers to data sent on the PDSCH or PUSCH sent or received according to a subframe unit. In the present invention, a downlink control signal for the shortened TTI indicates a control signal for shortened-TTI mode operations and may be referred to as sPDCCH or sEPDCCH; an uplink control signal for the shortened TTI may be referred to as sPUCCH; and a control signal for the normal TTI indicates a control signal for normal-TTI mode operations. For example, in the existing LTE system, downlink and uplink control signals for the normal TTI may include the PCFICH, PHICH, PDCCH, EPDCCH, and PUCCH.

In the present invention, the terms "physical channel" and "signal" in the existing LTE or LTE-A system may be used interchangeably with the term "data" or "control signal". For example, the PDSCH being a physical channel to send normal-TTI data may be referred to as normal-TTI data; and the sPDSCH being a physical channel to send shortened-TTI data may be referred to as shortened-TTI data. Similarly, in the present invention, shortened-TTI data sent in the downlink and the uplink may be referred to as sPDSCH and sPUSCH, respectively.

As described above, the present invention defines transmission and reception operations for the shortened-TTI UE and the BS, and presents a detailed scheme that enables the existing UE and the shortened-TTI UE to coexist in the same system. In the present invention, a normal-TTI UE refers to a UE that sends and receives control information and data information according to a subframe unit of 1 ms. The control information for the normal-TTI UE may be carried by the PDCCH mapped to maximum three OFDM symbols in one subframe or carried by the EPDCCH mapped to a specific RB in one entire subframe. A shortened-TTI UE indicates a UE that can not only send and receive according to a subframe unit as in the case of a normal-TTI UE but also send and receive according to a time unit less than a subframe. A shortened-TTI UE may also indicate a UE that can support transmission and reception according to a time unit less than a subframe only.

One of the features of the present invention is to provide a method that delivers uplink and downlink control information to a shortened-TTI UE using a TTI less than 1 ms and enables the shortened-TTI UE to perform data transmission and reception. More specifically, the present invention is to provide a method that can allocate and determine PDCCH, EPDCCH, PUCCH, PDSCH and PUSCH resources for shortened-TTI transmission. A description is given of the time-frequency domain structure in the LTE system with reference to FIGS. 1, 2 and 3.

Figure 2:
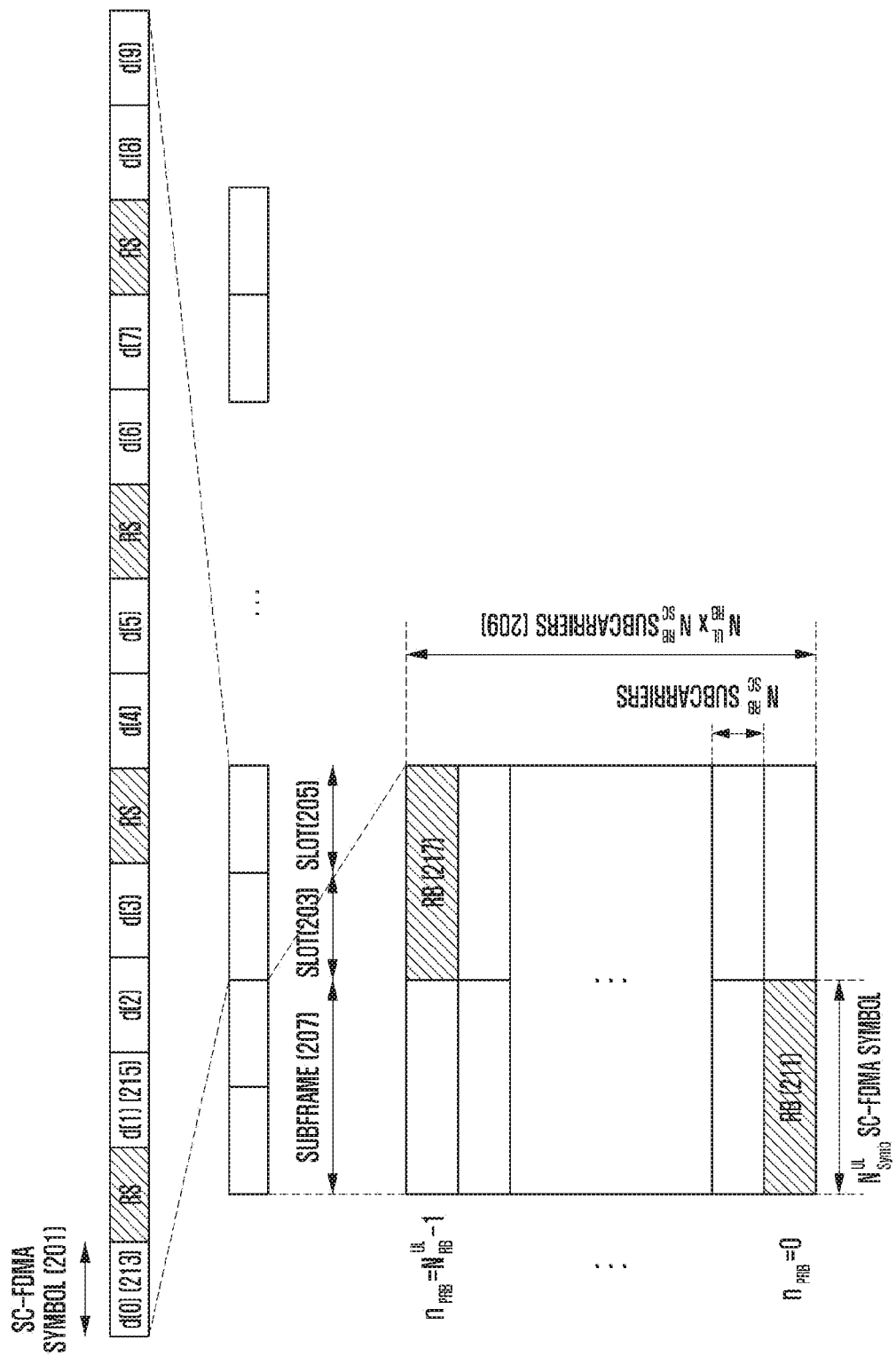
FIG. 2 illustrates a time-frequency domain structure for uplink transmission in the LTE or LTE-A system according to a related art.

FIG. 1 and FIG. 2 show the downlink frame structure and the uplink frame structure in the LTE or LTE-A system, respectively. The uplink and the downlink are commonly composed of subframes of 1 ms or slots of 0.5 ms in the time domain, and are respectively composed of $N_{RB}^{DL}$ RBs and $N_{RB}^{UL}$ RBs in the frequency domain.

Figure 3A:
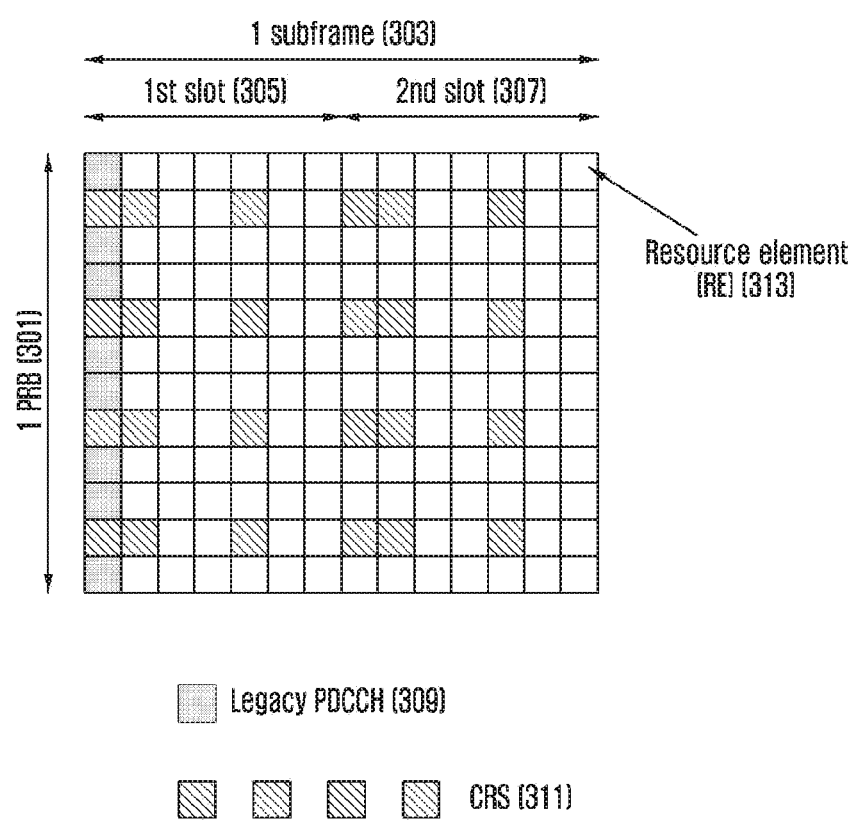
FIG. 3A illustrates the structure of a radio resource region corresponding to one subframe and one PRB through which data or control channels are transmitted in the downlink of the LTE or LTE-A system according to a related art.

FIG. 3A illustrates one PRB 301 of the time-frequency domain structure serving as a radio resource region for data or control channel transmission in the downlink of the LTE system.

In FIG. 3A, the horizontal axis denotes the time domain and the vertical axis denotes the frequency domain. In the LTE system, the TTI is one subframe 300 corresponding to 1 ms. One subframe is composed of two slots 305 and 307, and each slot includes 7 OFDM symbols. In the frequency domain, one PRB 301 is composed of 12 consecutive subcarriers. A resource element (RE) 313 is defined by one OFDM symbol and one subcarrier. One PRB is the basic unit for resource allocation in the LTE system. In one PRB with one subframe, 24 REs are used for CRS. One subframe includes total 14 OFDM symbols, and 1, 2 or 3 OFDM symbols may be used for PDCCH transmission. In FIG. 3A, one OFDM symbol is used for PDCCH transmission. Namely, in the existing LTE system, up to 3 OFDM symbols in the fore part of a subframe may be used for downlink control channels.

Figure 3B:
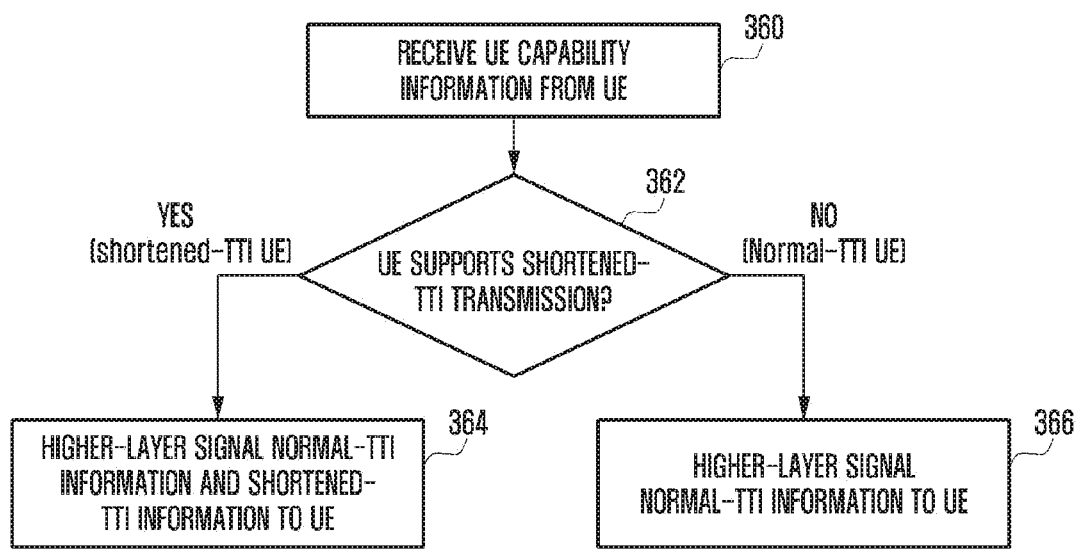
FIG. 3B depicts a base station procedure carried out when the BS receives UE capability information on capabilities supported by the UE from the UE.

FIG. 3B depicts a base station procedure carried out when the BS receives UE capability information on capabilities supported by the UE from the UE.

Upon reception of UE capability information from a UE, if support of shortened-TTI transmission is indicated by the received UE capability information (362), the BS provides the UE with both normal-TTI information and shortened-TTI information through higher layer signaling (364). If support of shortened-TTI transmission is not indicated by the received UE capability information (362), the BS determines that the UE does not support the shortened-TTI transmission and provides the UE with only normal-TTI information through higher layer signaling (366).

Figure 3C:
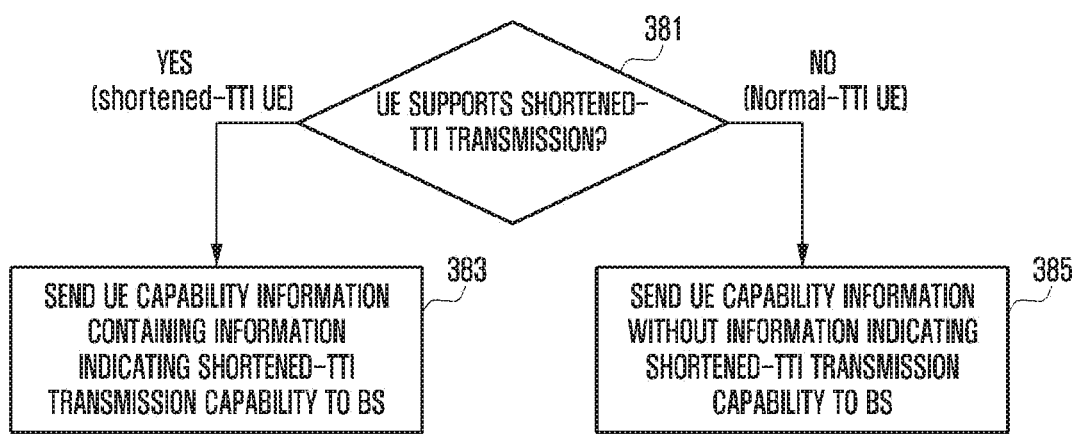
FIG. 3C depicts a procedure used by the UE to send UE capability information to the BS.

FIG. 3C depicts a procedure used by the UE to send UE capability information to the BS.

If the UE is capable of supporting the shortened-TTI transmission (381), it sends the BS UE capability information containing an indication to the capability of shortened-TTI transmission (383). If the UE does not support the shortened-TTI transmission (381), it sends the BS UE capability information without an indication to the capability of shortened-TTI transmission (385).

In the above description, the UE is depicted as sending UE capability information containing information related to the shortened-TTI transmission, and the BS is depicted as receiving information related to the shortened-TTI transmission via UE capability information. However, the BS may receive information indicating supportability of the shortened-TTI transmission from the UE by use of various other schemes.

First, in the present invention, to support transmission and reception based on a slot unit, transmission and reception operations of the shortened-TTI UE and the BS are defined and a scheme is proposed that enables the normal-TTI UE and the shortened-TTI UE to operate together in the same system. That is, in FIG. 3A, the first slot 305 of a subframe is a transmission interval, and the second slot 307 thereof is the next transmission interval. Although only one PRB is shown in FIG. 3A for brief description, this may be repeated for $N_{RB}$ RBs.

To achieve transmission and reception according to a slot unit, control and data signals for the uplink and the downlink should be included in each slot. A scheme for including control and data signals for the uplink and the downlink in the first slot and second slot of a subframe is described later as a specific embodiment. In the present invention, the number of RBs used for transmission and reception may be greater than or equal to 6 and less than 110 without any limitation.

Meanwhile, in one embodiment, a UE having received scheduling according to a 1 ms TTI in the first slot of a subframe may not decode control information in the second slot. In another embodiment, a UE having received scheduling according to a 0.5 ms TTI in the first slot of a subframe can try to decode control information in the second slot. However, this is an illustrative example and the present invention is not limited to or by the above operations.

First Embodiment

The first embodiment relates to a shortened-TTI transmission scheme where the BS sends downlink control information for shortened-TTI UEs in the first slot of each subframe by use of a specific DCI format. For example, the DCI format serving as scheduling information (DL grant) for shortened-TTI downlink data may be configured to fully or partially include the following control information.

Resource allocation type 0/1 flag: this indicates whether the resource allocation scheme is of type 0 or type 1. Type 0 indicates resource allocation in the unit of Resource Block Group (RBG) by use of a bitmap. In the LTE system, the basic scheduling unit is a RB represented as a time-frequency domain resource. An RBG including multiple RBs is the basic scheduling unit for type 0. Type 1 indicates allocation of a specific RB in one RBG.

Resource block assignment: this indicates an RB allocated for data transmission. The resource represented by resource block assignment is determined according to the system bandwidth and resource allocation scheme. Here, the resource is an RB corresponding only to the first slot.

Modulation and coding scheme (MCS): this indicates the modulation scheme applied for data transmission and the transport block size for data to be sent.

HARQ process number: this indicates the process number of the corresponding HARQ process.

New data indicator: this indicates either initial transmission for HARQ or retransmission.

Redundancy version: this indicates the redundancy version for HARQ.

TPC command for PUCCH: this indicates a TPC command for Physical Uplink Control Channel (PUCCH) being an uplink control channel.

Shortened-TTI indicator: this indicates whether shortened-TTI transmission or existing transmission applies. That is, this indicates whether the allocated resource is associated with either one subframe or the first slot. If shortened-TTI transmission does not apply, the shortened-TTI indicator may be absent or set to a specific value. The shortened-TTI indicator may be a 1-bit value indicating whether shortened-TTI transmission applies, or may be a 2 or 3-bit value indicating the TTI length. For example, when TTI lengths available to first type UEs include subframe, slot, 2 symbols and 1 symbol, the shortened-TTI indicator may be 2 bits wide. The shortened-TTI indicator may be referred to as a TTI length indicator.

The DCI format described above explicitly includes the shortened-TTI indicator for shortened-TTI control information. Hence, the DCI format containing normal-TTI control information is different from that containing shortened-TTI control information, which enables a UE to distinguish between normal-TTI control information and shortened-TTI control information by checking the DCI format.

As described above, the shortened-TTI indicator is separately defined for the DCI format. However, the present invention is not necessarily limited thereto. For example, reuse of an existing field can be considered for notifying shortened-TTI transmission.

The DCI is appended by a CRC value using a specific RNTI, channel coded, rate matched, modulated, and transmitted via the PDCCH. The PDCCH is mapped to up to the first three OFDM symbols in the first slot for transmission.

Figure 4:
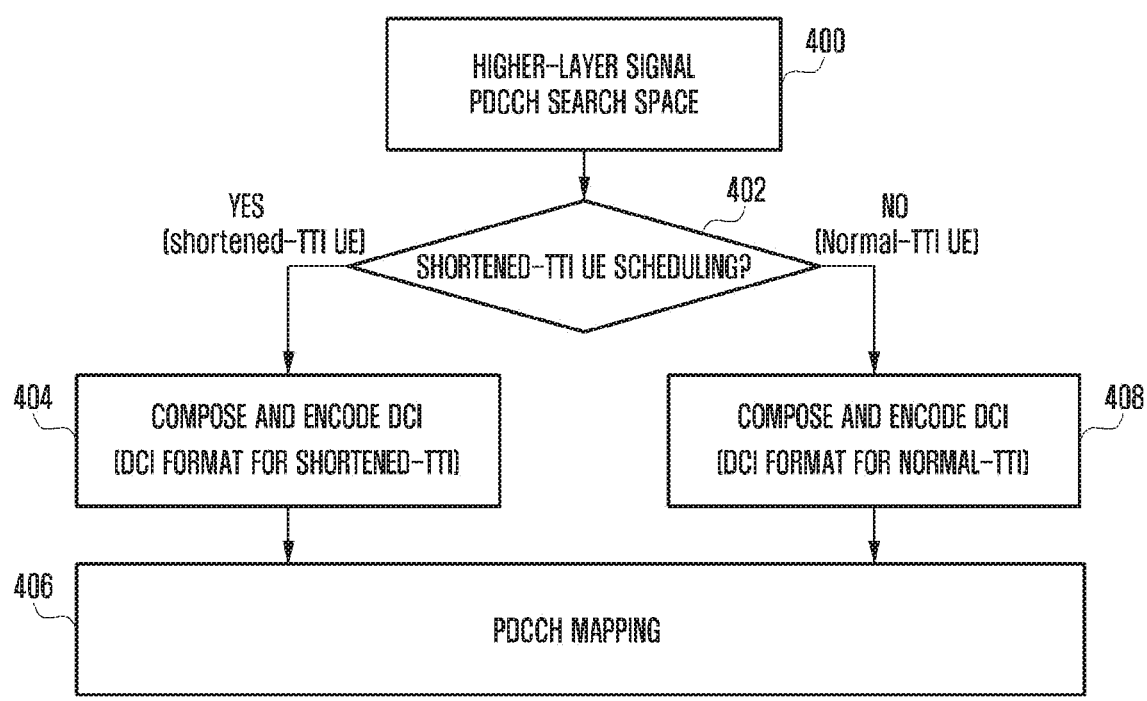
FIG. 4 depicts a BS procedure according to the first embodiment of the present invention.

FIG. 4 depicts a procedure for the BS to transmit shortened-TTI downlink control information to the UE according to the first embodiment of the present invention.

Referring to FIG. 4, the BS notifies the UE of the search space indicating the resource that can carry downlink control information through higher layer signaling (400). The BS may determine the number of OFDM symbols to be used for PDCCH transmission (1, 2, or 3) in consideration of the amount of control information to be sent in the current subframe. Control information for a shortened-TTI UE is encoded in a shortened-TTI DCI format (404), appended by a CRC value using a C-RNTI, channel encoded, mapped to PDCCH resources (406) together with control information for other UEs, and transmitted. Control information for a normal-TTI UE is encoded in a normal-TTI DCI format (408), appended by a CRC value using a C-RNTI, channel encoded, mapped to PDCCH resources (406) together with control information for other UEs, and transmitted. Here, the above C-RNTIs may have different type values.

Figure 5:
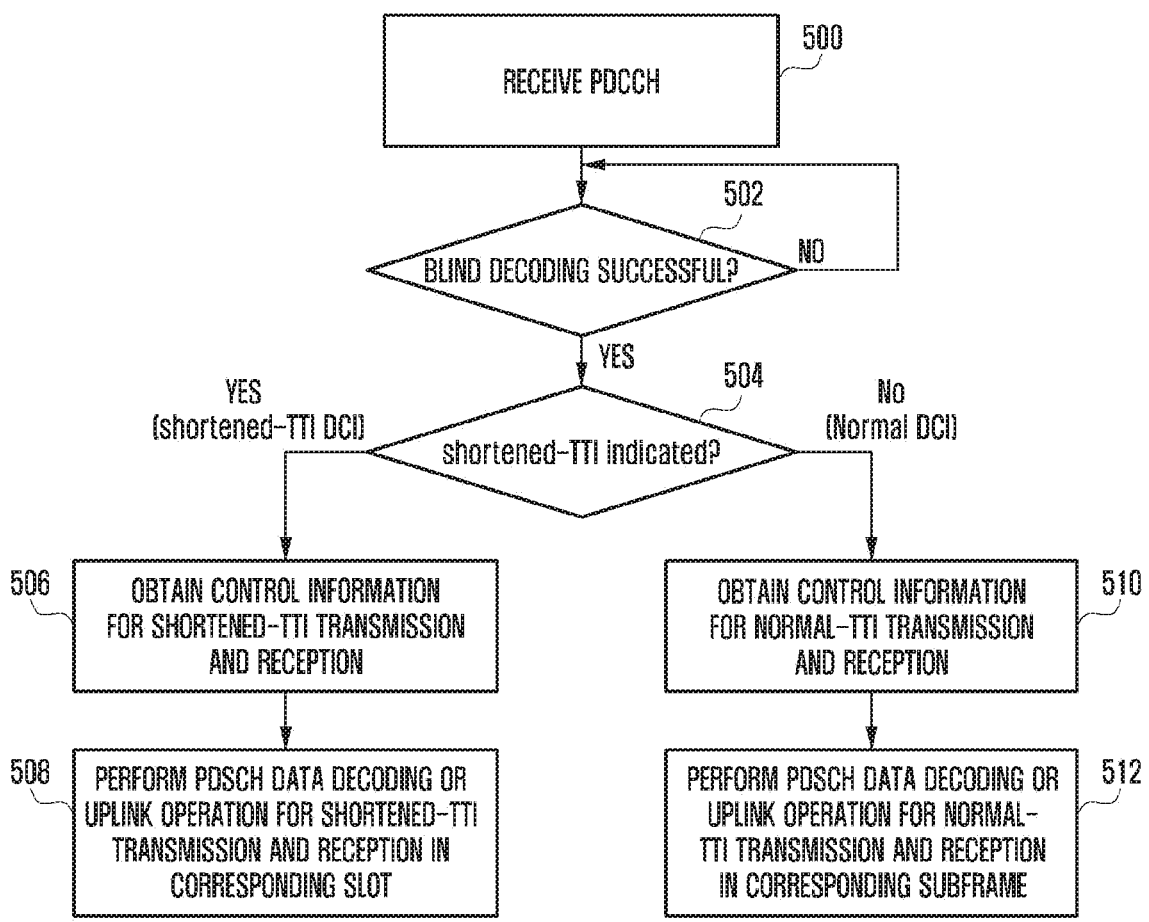
FIG. 5 depicts a UE procedure according to the first embodiment of the present invention.

FIG. 5 depicts a procedure for the UE to distinguish between shortened-TTI control information and normal-TTI control information after PDCCH reception according to the first embodiment of the present invention.

Referring to FIG. 5, the shortened-TTI UE performs PDCCH reception in the PDCCH resource region (500) and performs channel decoding by assuming that a PDCCH carrying a shortened-TTI DCI format is present. The UE performs blind decoding to identify the DCI through CRC checking using a specific C-RNTI (502). The UE determines whether a shortened-TTI indicator is present in the DCI information (504) to identify a shortened-TTI transmission. If a shortened-TTI indicator is present, the UE determines that the DCI is control information for shortened-TTI transmission and reception (506). Thereafter, the UE performs PDSCH data decoding in the corresponding slot according to the control information or performs an uplink operation for shortened-TTI transmission and reception in the corresponding slot (508).

Here, performing an uplink operation in the corresponding slot may indicate performing a HARQ feedback operation for a shortened-TTI transmission. For example, in the case of FDD mode, a UE performing an uplink operation for shortened-TTI transmission and reception may send HARQ feedback information to the BS in a slot that is four slots after the slot where the PDSCH is received. In another embodiment, a UE performing shortened-TTI transmission and reception may perform a related art HARQ feedback operation by sending HARQ feedback information to the BS at a subframe that is four subframes after the subframe including the corresponding slot.

If a shortened-TTI indicator is not present (existing subframe-unit TTI transmission), the UE determines that the DCI is control information for normal-TTI transmission (510). Thereafter, the UE performs PDSCH data decoding in the corresponding subframe or performs an uplink operation for normal-TTI transmission and reception in the corresponding subframe (512).

The first embodiment may have several variations. For example, to indicate shortened-TTI control information, the shortened-TTI DCI format may be designed to include a shortened-TTI indicator whose length in bits may be set to one of 1, 2 and 3. As another example, the shortened-TTI DCI format may be designed so that the shortened-TTI indicator occupies a specified position in the DCI. For instance, when the corresponding DCI is shortened-TTI control information, the bit at the position designated for the shortened-TTI indicator in the shortened-TTI DCI format may be set to 1.

Second Embodiment

The second embodiment relates to a shortened-TTI transmission scheme where the DCI having shortened-TTI control information is implicitly encoded without use of separate bits indicating shortened-TTI transmission. The second embodiment is described with reference to FIG. 6.

Figure 6:
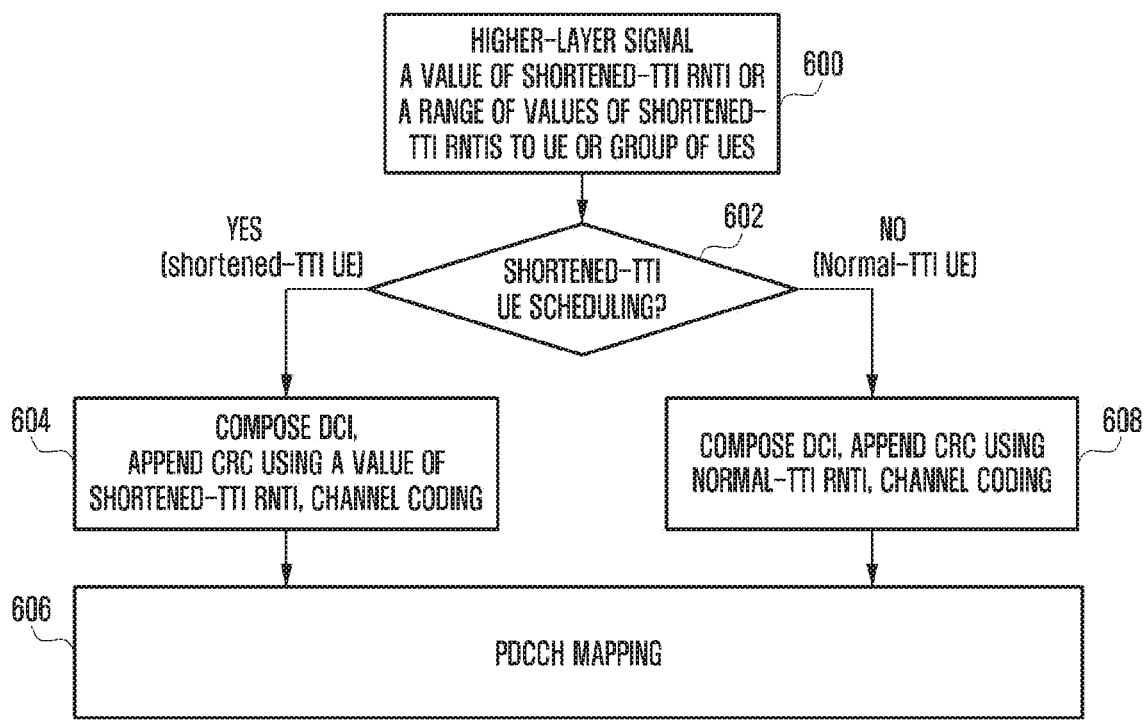
FIG. 6 depicts a BS procedure according to the second embodiment of the present invention.

FIG. 6 depicts a procedure for the BS to allocate downlink control resources for shortened-TTI transmission to the UE according to the second embodiment of the present invention.

In the second embodiment, the BS notifies the UE or a UE group of a shortened-TTI RNTI value or a range of shortened-TTI RNTI values through higher layer signaling (600). Thereafter, to configure shortened-TTI downlink control information in a DCI format, the BS may generate the DCI so that a shortened-TTI indicator is not included or generate the DCI using an existing DCI format of the LTE system.

For shortened-TTI transmission, the BS appends a CRC value using a shortened-TTI RNTI different from a normal-TTI C-RNTI to the DCI, and applies channel encoding to the DCI (604). For normal-TTI transmission, the BS appends a CRC value using a C-RNTI to the DCI, and applies channel encoding to the DCI (608).

Thereafter, the resulting control information is mapped to PDCCH resources (606) for transmission.

The shortened-TTI RNTI may be different from the normal-TTI RNTI such as C-RNTI. For example, for shortened-TTI transmission, RNTI values between 003D and FFF3 (in hexadecimal notation) may be assigned to UEs. The channel-encoded DCI is mapped to PDCCH resources together with control information for other UEs. Different shortened-TTI RNTI values may be assigned to different first-type UEs, or the same shortened-TTI RNTI value may be assigned to a group of first-type UEs.

Then, the UE decodes the PDCCH region in the search space by use of a shortened-TTI RNTI. For example, A-bit control information, 16 parity bits for CRC appending, and a 16-bit RNTI value can be represented below in Equation 1, Equation 2, and Equation 3.

$b_0, b_1, b_2, b_3, \ldots, b_{A-1}$, [Equation 1]

$p_0, p_1, p_2, p_3, \ldots, p_{15}$ [Equation 2]

$x_{rnti,0}, x_{rnti,1}, \ldots, x_{rnti,15}$ [Equation 3]

When control information B (in bits), 16 parity bits for CRC appending, and a 16-bit RNTI value are given by Equations 1 to 3, (A+16)-bit $c_0, c_1, c_2, c_3, \ldots, c_{A+15}$ is after CRC appending using the RNTI value are given below by Equation 4.

$c_k = b_k$ for $k=0,1,2,\ldots,A-1$ $c_k = (b_k + x_{rnti,k-A}) \bmod 2$ for $k=A, A+1, A+2, \ldots, A+15$ [Equation 4]

In the above example, the BS may set a shortened-TTI RNTI value to $x_{rnti,0}, x_{rnti,1}, \ldots, x_{rnti,15}$ for shortened-TTI transmission, and set a normal-TTI RNTI value to $x_{rnti,0}, x_{rnti,1}, \ldots, x_{rnti,15}$ for normal-TTI transmission.

Figure 7:
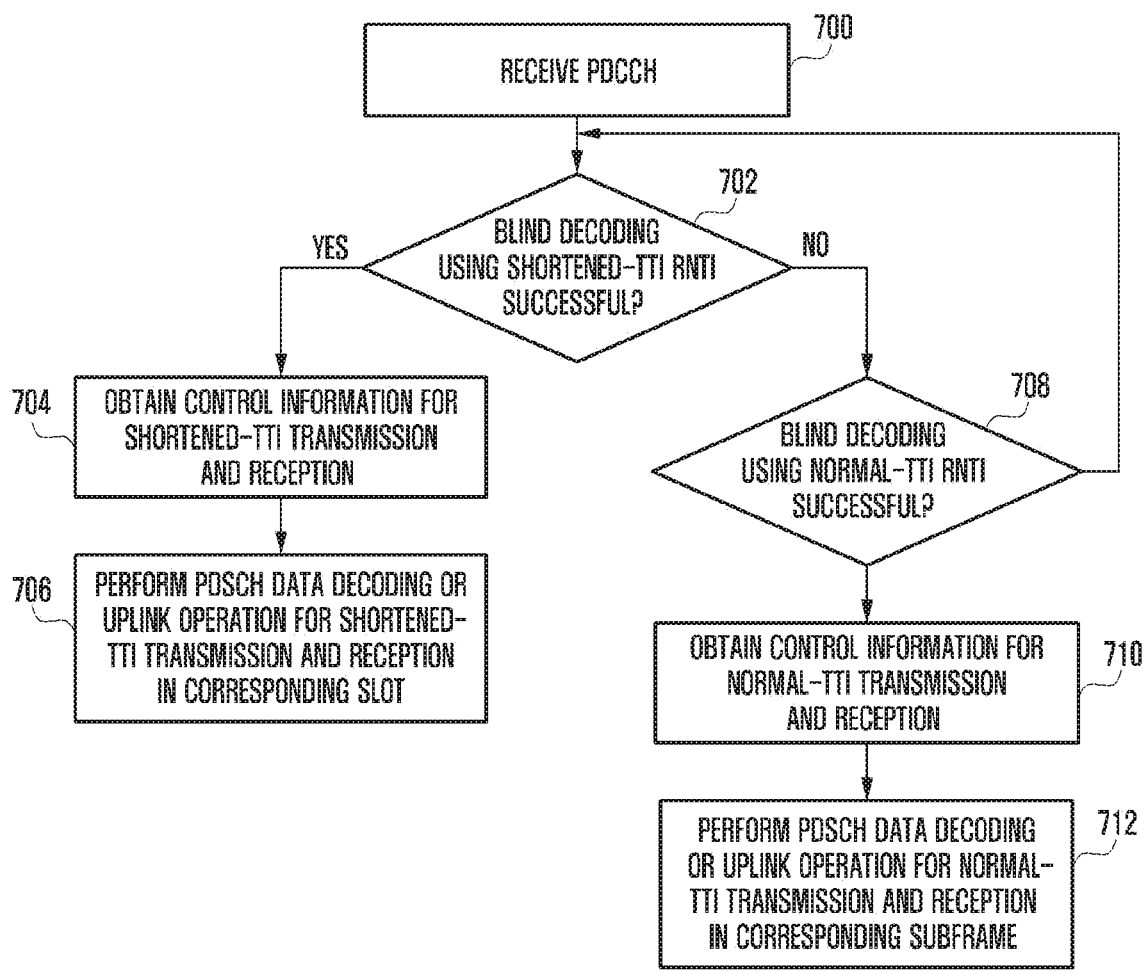
FIG. 7 depicts a UE procedure according to the second embodiment of the present invention.

FIG. 7 depicts a procedure for the UE to receive shortened-TTI control information and data according to the second embodiment of the present invention.

Referring to FIG. 7, the shortened-TTI UE performs PDCCH reception in the PDCCH resource region (700) and performs channel decoding. The UE attempts to perform CRC decoding by use of a shortened-TTI RNTI notified in advance through higher layer signaling (702).

If CRC decoding is successful, the UE determines that the DCI is control information for shortened-TTI transmission (704). Thereafter, the UE performs PDSCH data decoding in the corresponding slot according to the DCI format and information or performs an uplink operation for shortened-TTI transmission and reception in the corresponding slot (706).

If CRC decoding using the shortened-TTI RNTI is unsuccessful, the UE attempts to perform CRC decoding by use of a normal-TTI RNTI (708). If CRC decoding using the normal-TTI RNTI is successful, the UE determines that the DCI is a control signal for normal-TTI transmission (710). Thereafter, the UE performs PDSCH data decoding in the corresponding subframe according to the DCI format and information or performs an uplink operation for normal-TTI transmission and reception in the corresponding subframe (712).

The second embodiment may have several variations. For example, the BS may notify a shortened-TTI UE of a specific shortened-TTI RNTI value or a range of shortened-TTI RNTI values through higher layer signaling. As another example, the UE is depicted in FIG. 7 as attempting CRC decoding using a higher-layer-signaled shortened-TTI RNTI first. However, the UE may perform blind decoding using a normal-TTI RNTI first, and, if unsuccessful, then may perform blind decoding using a shortened-TTI RNTI. Alternatively, the UE may perform blind decoding using a normal-TTI RNTI and blind decoding using a shortened-TTI RNTI at the same time.

Third Embodiment

The third embodiment relates to a method where the BS configures a search space through which a shortened-TTI PDCCH can be transmitted and notifies one UE or all UEs of the search space through higher layer signaling. The third embodiment is described with reference to FIG. 8.

Figure 8:
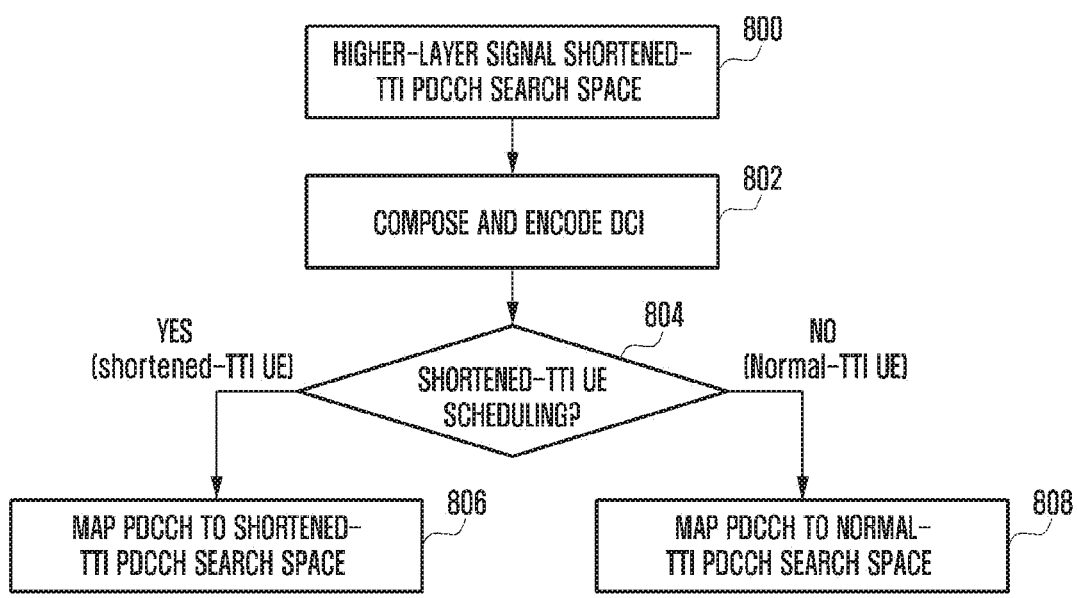
FIG. 8 depicts a BS procedure according to the third embodiment of the present invention.

FIG. 8 depicts a procedure for the BS to transmit control information for shortened-TTI transmission and reception according to the third embodiment of the present invention.

In the third embodiment, the BS configures a search space through which a shortened-TTI PDCCH can be transmitted and notifies the search space to a shortened-TTI UE through higher layer signaling (800). The BS appends a CRC to the DCI including a control resource indicating shortened-TTI transmission and applies channel encoding to the DCI (802). The BS maps the PDCCH to the search space (806), and does not map normal-TTI control resources to the search space (808).

Downlink control information is sent in a unit of Control Channel Element (CCE). One PDCCH may be carried by 1, 2, 4, or 8 CCEs, and the number of CCEs used to carry the PDCCH is referred to as the aggregation level. The search space indicates a set of CCEs that can be monitored by a UE attempting blind decoding for downlink control information. In the following description, the search space with aggregation level L $\in\{1, 2, 4, 8\}$ is denoted by $S_k^{(L)}$. For normal-TTI transmission to a normal-TTI UE or shortened-TTI UE, the CCE number indicating the search space with aggregation level L is given by Equation 5.

$$L\{(Y_k+m') \bmod \lfloor N_{CCE,k}/L \rfloor\}+i, i=0, \ldots, L-1 \quad \text{[Equation 5]}$$

In the above equation, $N_{CCE,k}$ indicates the total number of CCEs in the control region of $k^{th}$ subframe. In the case of m', for the common search space used by all UEs in the cell, m'=m; and, for the UE-specific search space given to a particular UE, if the carrier indicator field (CIF) $n_{CI}$ is set, m'=m+$M^{(L)}$*$n_{CI}$ and if CIF $n_{CI}$ is not set, m'=m. Here, m=0, ..., $M^{(L)}$−1 and $M^{(L)}$ is the number of PDCCHs to be monitored in the given search space. In the case of $Y_k$, for the common search space, $Y_k$=0; and, for the UE-specific search space, $Y_k$=(A*$Y_{k-1}$) mod D, where $Y_{-1}$=$n_{RNTI}$≠0, A=39827, D=65537, k=n$\lfloor n_s/2 \rfloor$. Here, $n_{RNTI}$ indicates a RNTI value assigned to the UE.

For shortened-TTI transmission to a shortened-TTI UE, the CCE number indicating the search space carrying downlink control information may be set differently from that for a normal-TTI UE, so that shortened-TTI transmission and normal-TTI transmission can be distinguished.

For example, the CCE number indicating the search space allocated to transmit downlink control information for shortened-TTI transmission can be given by the following equation.

$$L\{(Y_k^{shortened-TTI}+m') \bmod \lfloor N_{CCE,k}/L \rfloor\}+i, i=0, \ldots, L-1 \quad \text{[Equation 6]}$$

In Equation 6, in the case of $Y_k^{shortened-TTI}$, for the common search space, $Y_k$=c; and, for the UE-specific search space, $Y_k$=(A*$Y_{k-1}$)mod D, where $Y_{-1}$=$n_{RNTI}$+c≠0, A=39827, D=65537, and k=$\lfloor n_s/2 \rfloor$. Here, $n_{RNTI}$ indicates a RNTI value assigned to the UE, and c is a value selected from among nonzero integers. Use of constant c in the formation of the search space for shortened-TTI transmission enables a differentiation between the search space for normal-TTI transmission and the search space for shortened-TTI transmission.

As another example, the CCE number indicating the search space allocated to transmit downlink control information for shortened-TTI transmission can be given by the following equation.

$$L\{(Y_k+m^{shortened-TTI}) \bmod \lfloor N_{CCE,k}/L \rfloor\}+i, i=0, \ldots, L-1 \quad \text{[Equation 7]}$$

In the above equation, in the case of $m^{shortened-TTI}$, for the common search space used by all UEs in the cell, $m^{shortened-TTI}$=m+c; and, for the UE-specific search space given to a particular UE, if the carrier indicator field (CIF) $n_{CI}$ is set, $m^{shortened-TTI}$=m+$M^{(L)}$*$n_{CI}$+c and if CIF $n_{CI}$ is not set, $m^{shortened-TTI}$=m+c. Here, m=0, ..., $M^{(L)}$−1; $M^{(L)}$ is the number of PDCCHs to be monitored in the given search space; and c is a value selected from among nonzero integers.

Equation 6 and Equation 7 are illustrations for configuring different search spaces for normal-TTI transmission and shortened-TTI transmission. The above equations can be modified in various ways to enable a differentiation between the search space for normal-TTI transmission and the search space for shortened-TTI transmission. Meanwhile, in the second embodiment, assigning a separate shortened-TTI RNTI may enable a differentiation between search spaces.

Figure 9:
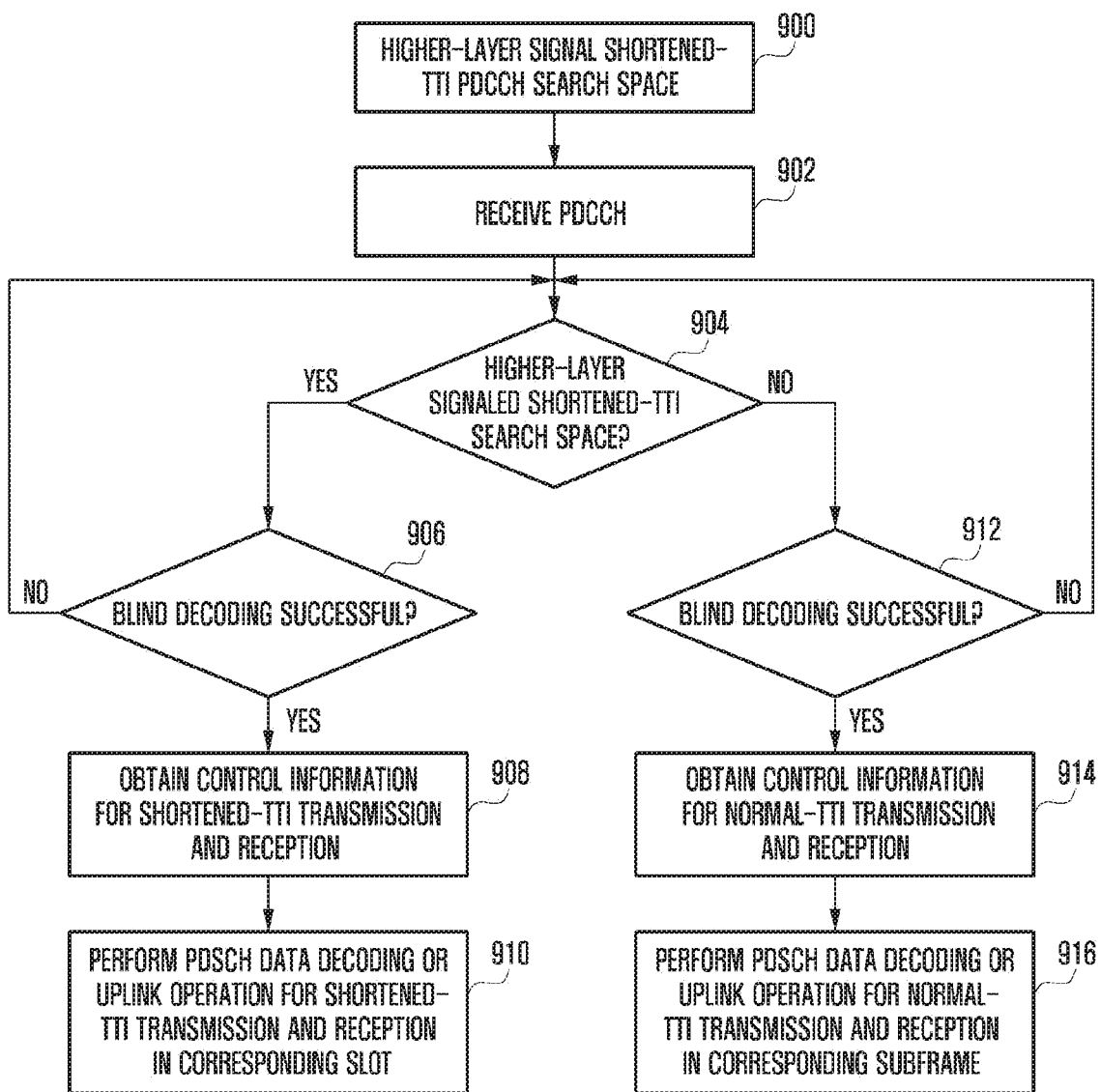
FIG. 9 depicts a UE procedure according to the third embodiment of the present invention.

FIG. 9 depicts a procedure for the UE to receive a shortened-TTI control signal according to the third embodiment of the present invention.

Referring to FIG. 9, a shortened-TTI UE receives information on a search space through which a shortened-TTI PDCCH can be sent from the BS through higher layer signaling (900).

The UE receives the PDCCH (902) and performs blind decoding in a specific search space.

If PDCCH decoding in the shortened-TTI search space (904) is successful (906), the UE determines that the control information carried by the corresponding PDCCH is control information for shortened-TTI transmission (908), and performs PDSCH data decoding in the corresponding slot according to the DCI format and information or performs an uplink operation for shortened-TTI transmission and reception in the corresponding slot (910).

If PDCCH decoding in the normal-TTI search space is successful (912), the UE determines that the control information carried by the corresponding PDCCH is control information for normal-TTI transmission (914), and performs PDSCH data decoding in the corresponding subframe according to the DCI format and information or performs an uplink operation for normal-TTI transmission and reception in the corresponding subframe (916).

Fourth Embodiment

The fourth embodiment relates to a method where the BS configures a resource block to which a shortened-TTI PDSCH can be mapped and notifies a UE or all UEs of the resource block through higher layer signaling, and a shortened-TTI UE recognizes PDSCH reception in the shortened-TTI resource block as shortened-TTI transmission. The fourth embodiment is described with reference to FIG. 10.

Figure 10:
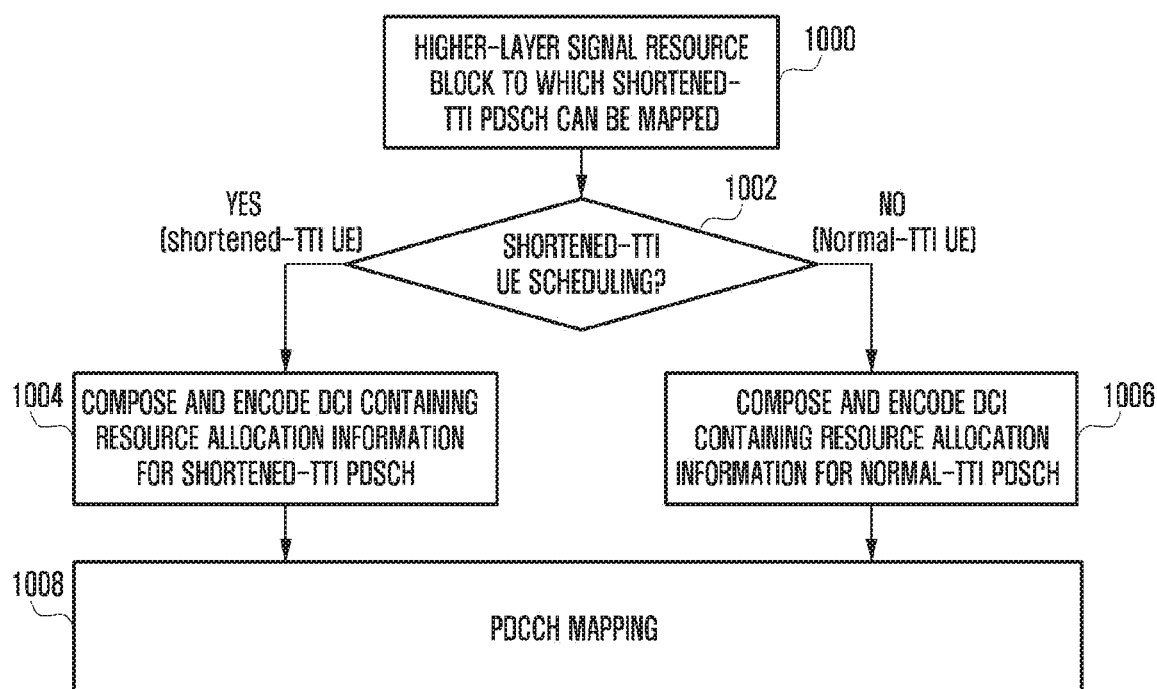
FIG. 10 depicts a BS procedure according to the fourth embodiment of the present invention.

FIG. 10 depicts a procedure for the BS to transmit a shortened-TTI PDSCH according to the fourth embodiment of the present invention.

In the fourth embodiment, the BS configures a resource block in which a shortened-TTI PDSCH can be allocated and notifies a shortened-TTI UE of the resource block through higher layer signaling (1000). The information on the resource block may be applied commonly to all UEs managed by the BS or be applied specifically (dedicatedly) to a shortened-TTI UE.

To transmit a shortened-TTI PDSCH (1002), the BS includes allocation information on the resource block configured for PDSCH transmission in the DCI (1004) and maps the resulting DCI to PDCCH resources (1008) for transmission. To transmit a normal-TTI PDSCH (1002), the BS includes allocation information on a resource block configured for non-shortened-TTI PDSCH transmission in the DCI (1004) and maps the resulting DCI to PDCCH resources (1008) for transmission.

Figure 11:
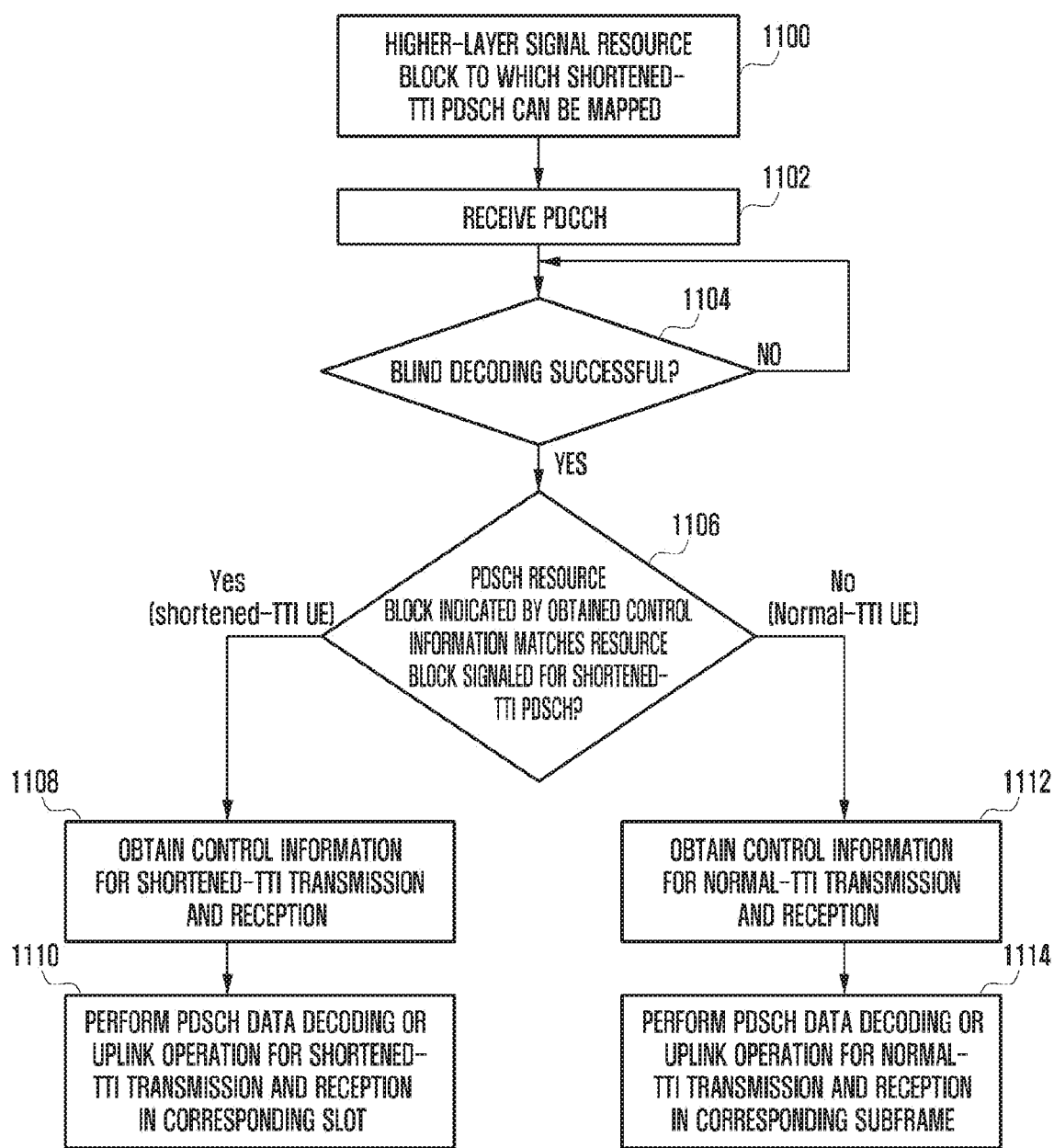
FIG. 11 depicts a UE procedure according to the fourth embodiment of the present invention.

FIG. 11 depicts a procedure for the UE to receive a shortened-TTI control signal according to the fourth embodiment of the present invention.

Referring to FIG. 11, a shortened-TTI UE receives information on a resource block through which a shortened-TTI PDSCH can be sent from the BS through higher layer signaling (1100).

The UE performs PDCCH decoding in the corresponding slot (1104) and identifies allocation information on a resource block used for PDSCH transmission in the PDCCH (1106). If the resource block, used for PDSCH transmission, indicated by the identified allocation information matches the resource block, through which a shortened-TTI PDSCH can be sent, notified by the BS through higher layer signaling, the UE determines that the control information carried by the corresponding PDCCH is control information for shortened-TTI transmission (1108), and performs PDSCH data decoding in the corresponding slot according to the DCI format and information or performs an uplink operation for shortened-TTI transmission and reception in the corresponding slot (1110).

If the resource block, used for PDSCH transmission, indicated by the identified allocation information does not match the resource block, through which a shortened-TTI PDSCH can be sent, notified by the BS through higher layer signaling, the UE determines that the control information carried by the corresponding PDCCH is control information for normal-TTI transmission (1112), and performs PDSCH data decoding in the corresponding subframe according to the DCI format and information or performs an uplink operation for normal-TTI transmission and reception in the corresponding subframe (1114).

Fifth Embodiment

The fifth embodiment relates to a method for downlink control information transmission where the BS configures an RB range, including up to the first three OFDM symbols of the second slot of a subframe, to which shortened-TTI control information can be mapped or configures a set of such RB ranges and notifies a UE or all UEs of the RB range or the RB range set through higher layer signaling, and a shortened-TTI UE performs blind decoding within the RB range or sequentially performs blind decoding within each RB range belonging to the RB range set. The fifth embodiment is described with reference to FIG. 12. In this embodiment, the RB refers to the PRB or VRB.

Figure 12:
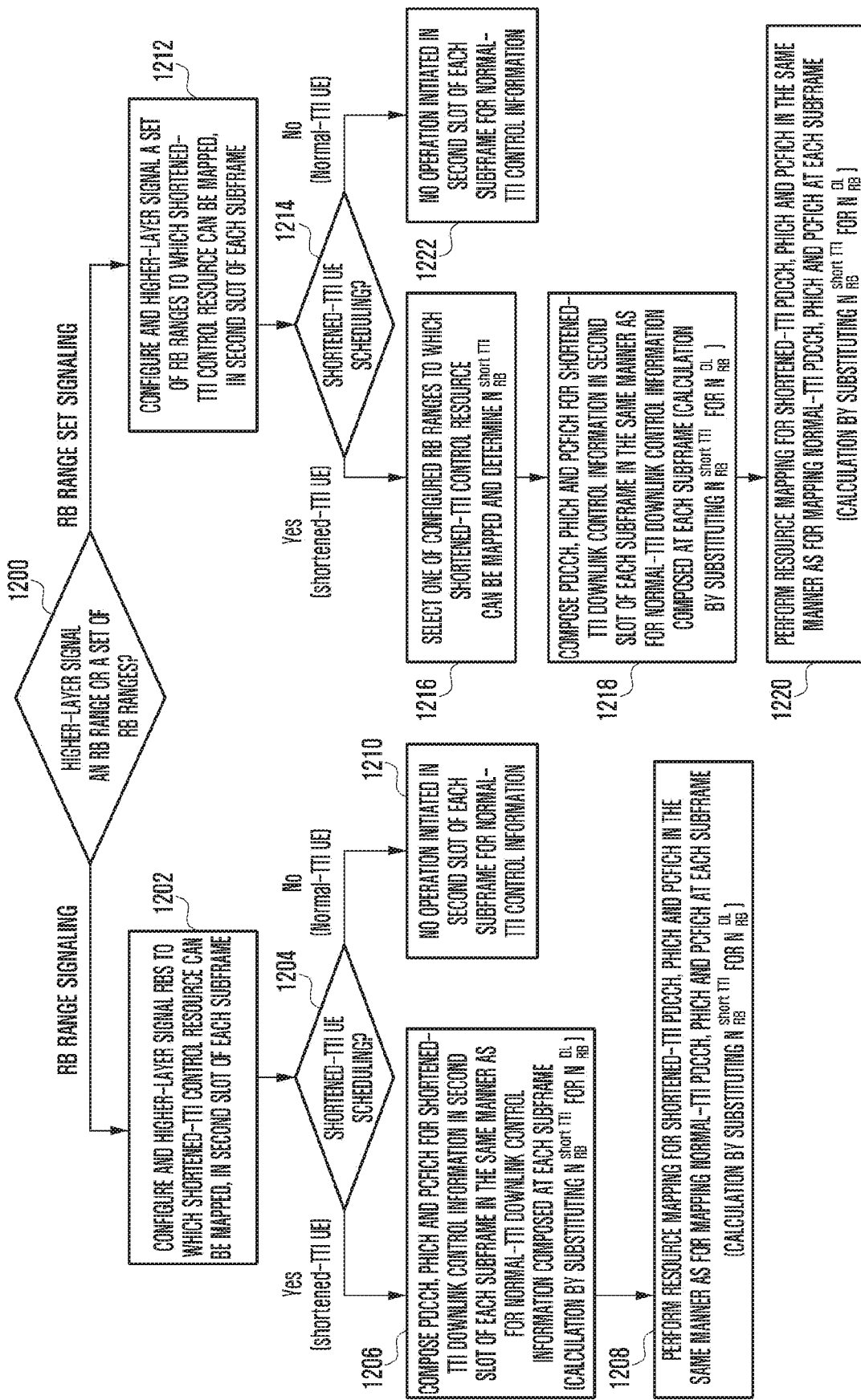
FIG. 12 depicts a BS procedure according to the fifth embodiment of the present invention.

FIG. 12 depicts a procedure for the BS to transmit a shortened-TTI control resource in the second slot of each subframe according to the fifth embodiment of the present invention.

Figure 14:
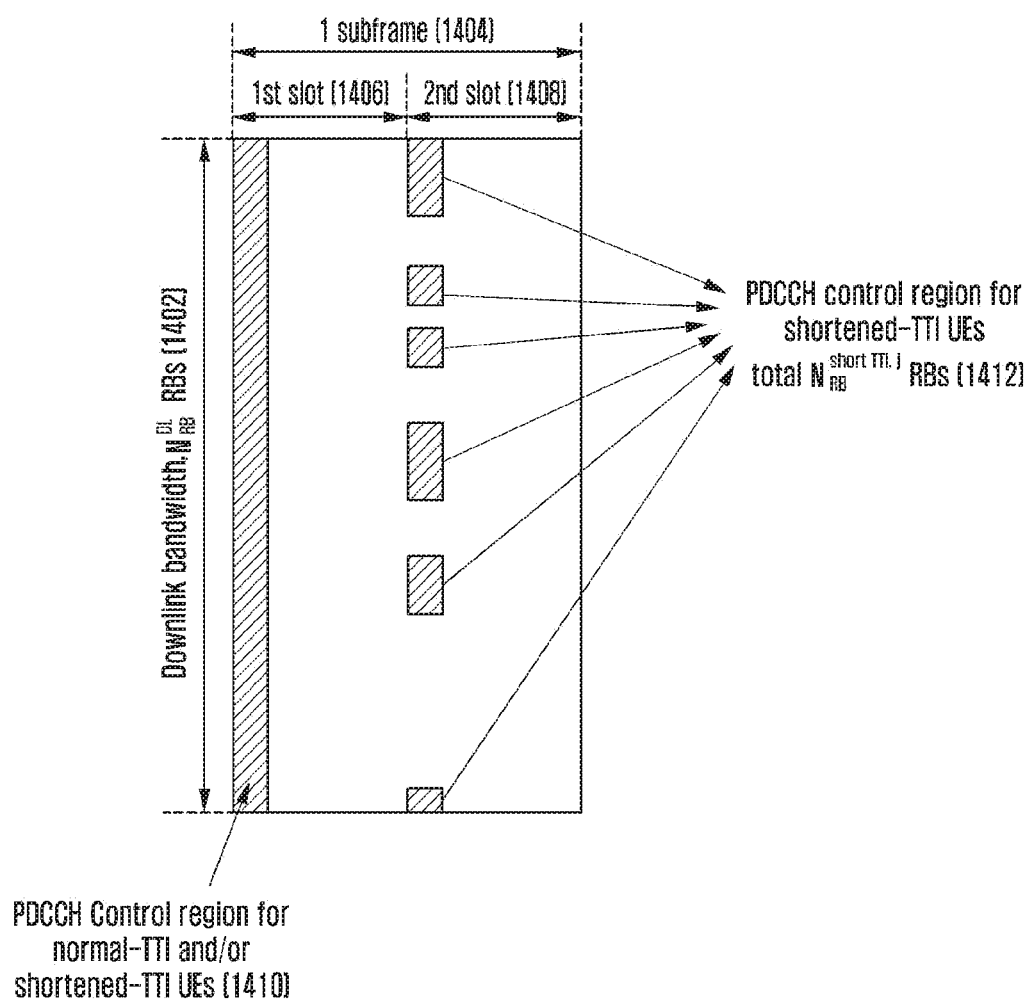
FIG. 14 illustrates regions to which downlink control resources for the shortened-TTI UE can be mapped according to the fifth embodiment of the present invention.
Figure 15:
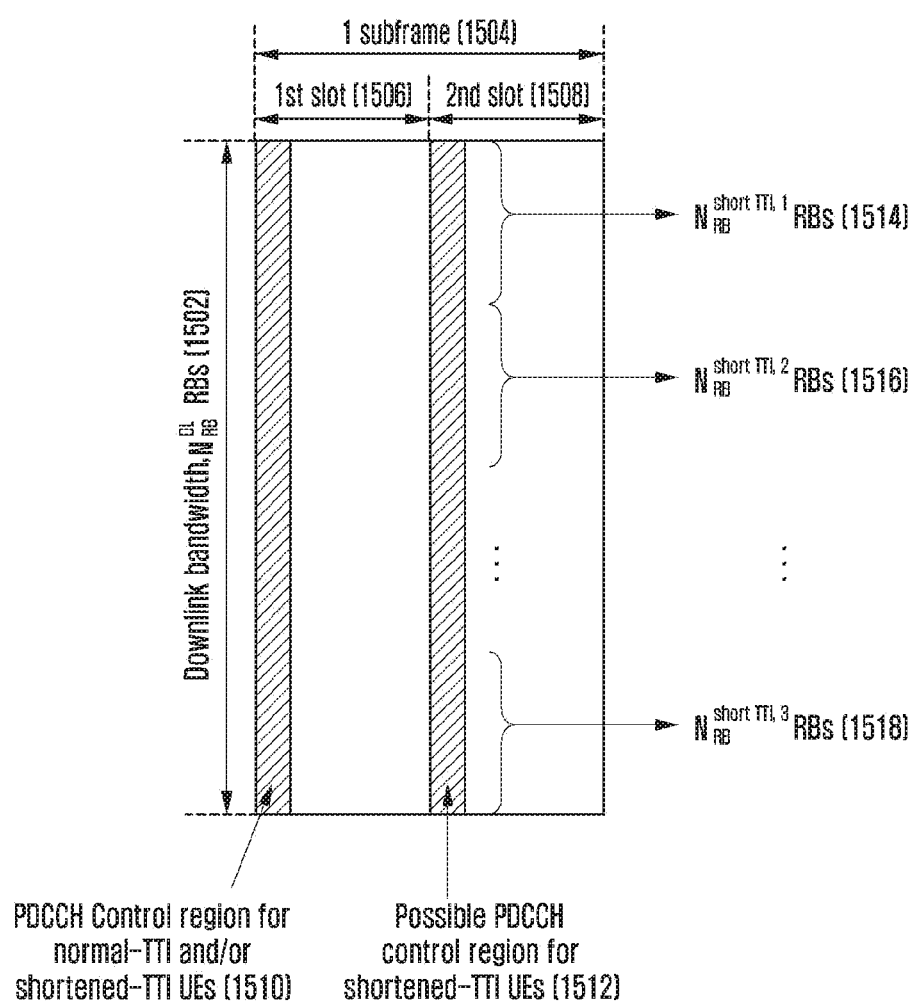
FIG. 15 illustrates regions to which downlink control resources for the shortened-TTI UE can be mapped according to the fifth embodiment of the present invention.

In the fifth embodiment, the BS configures a resource block through which a shortened-TTI control resource is to be transmitted in the second slot of each subframe and notifies the resource block to each shortened-TTI UE through higher layer signaling (1200). A description is given of a scheme for configuring a resource block through which a shortened-TTI control resource is to be transmitted and signaling the resource block to the UE with reference to FIG. 13, FIG. 14, and FIG. 15.

Figure 13:
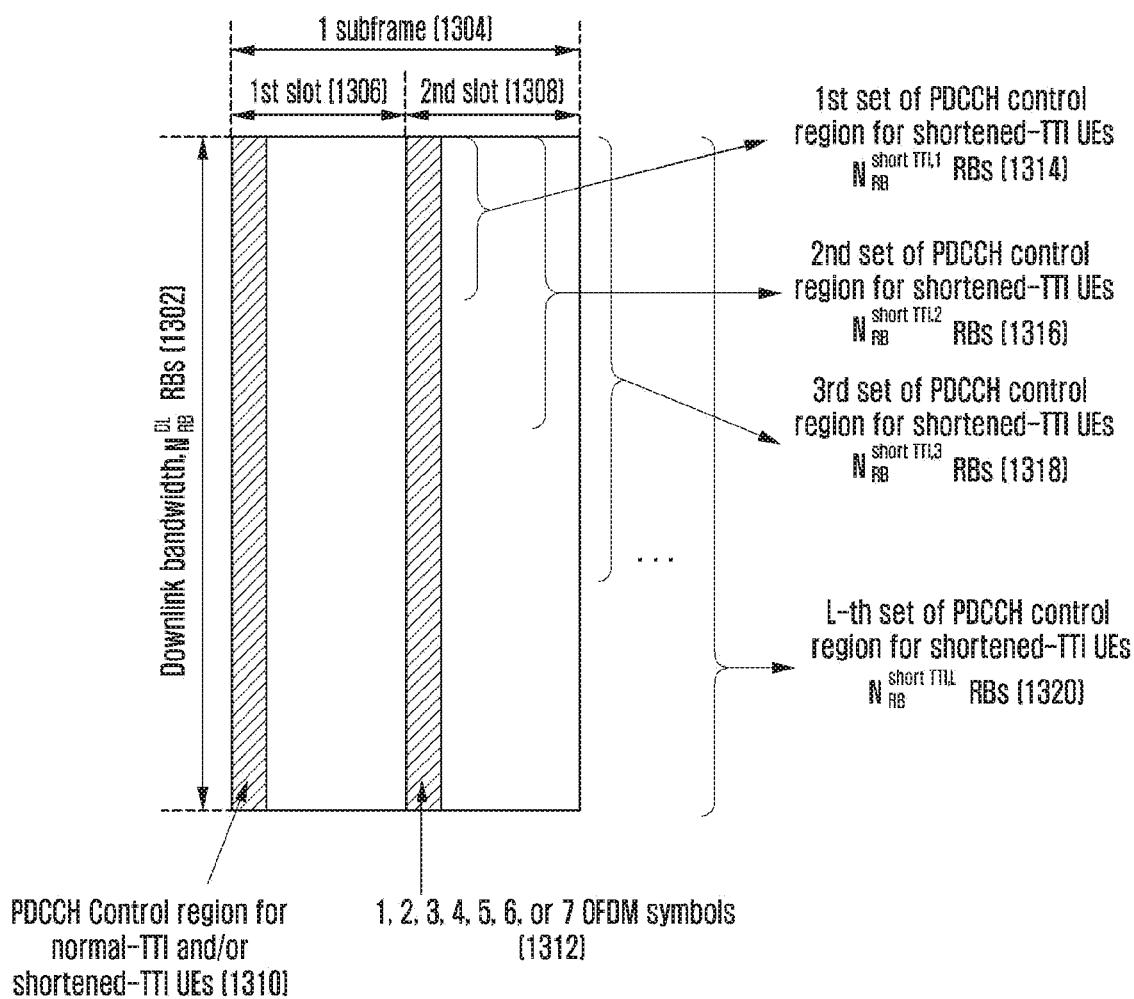
FIG. 13 illustrates regions to which downlink control resources for the shortened-TTI UE can be mapped according to the fifth embodiment of the present invention.

FIG. 13 illustrates regions to which downlink control resources for the shortened-TTI UE can be mapped according to the fifth embodiment of the present invention. In FIG. 13, up to the first three OFDM symbols of the second slot can be a region to which downlink control resources for a shortened-TTI UE can be mapped. First, among $N_{RB}^{DL}$ RBs constituting the whole frequency domain, a first RB range to which the PDCCH for a shortened-TTI UE can be mapped is formed to include $N_{RB}^{shortTTI,1}$ RBs. Next, a second RB range to which the PDCCH for a shortened-TTI UE can be mapped is formed to include $N_{RB}^{shortTTI,2}$ RBs among $N_{RB}^{DL}$ RBs constituting the whole frequency domain. In this way, for mapping the PDCCH for shortened-TTI UEs, it is possible to form L RB ranges respectively including $N_{RB}^{shortTTI,1}$ RBs, $N_{RB}^{shortTTI,2}$ RBs, . . . , $N_{RB}^{shortTTI,L}$ RBs among $N_{RB}^{DL}$ RBs. Here, L is an integer greater than or equal to 1. When one of the RB ranges is higher-layer signaled by the BS to a shortened-TTI UE, the UE configures the higher-layer signaled value $N_{RB}^{shortTTI}$ as the number of RBs used to map control signals in the second slot. Instead of signaling one RB range, when L RB ranges (a set of RB ranges) are higher-layer signaled by the BS to a shortened-TTI UE, the UE selects one of the L RB ranges and configures the selected value $N_{RB}^{shortTTI}$ as the number of RBs used to map control signals in the second slot. Thereafter, if blind decoding in the selected RB range is unsuccessful, the UE selects another one of the L RB ranges and configures the selected value $N_{RB}^{shortTTI}$ as the number of RBs used to map control signals in the second slot. The UE may repeat the above process.

The above scheme for configuring RB ranges to which the PDCCH for shortened-TTI UEs can be mapped and higher-layer signaling the same can be modified in various ways. For example, referring to FIG. 14, the RBs to which the PDCCH for shortened-TTI UEs can be mapped may be allocated as $N_{RB}^{shortTTI,i}$ RBs (1412) distributed in the overall downlink frequency domain. As another example, referring to FIG. 15, the resource region 1512 containing up to the first three OFDM symbols in the second slot of each subframe may be subdivided in the frequency domain into L RB groups including $N_{RB}^{shortTTI,1}$ RBs, $N_{RB}^{shortTTI,2}$ RBs, . . . , $N_{RD}^{shortTTI,L}$ RBs, respectively (1514, 1516, 1518).

In addition to the schemes described above, the block of resources corresponding to up to the first three OFDM symbols in the second slot of each subframe can be divided in the frequency domain so as to map control signals for shortened-TTI UEs in a variety of other ways.

Accordingly, the BS determines whether to higher-layer signal one value $N_{RB}^{shortTTI}$ being the number of RBs usable for mapping control signals for shortened-TTI UEs or a set of values $N_{RB}^{shortTTI}$ each being the number of RBs usable for mapping control signals for shortened-TTI UEs (1200). When the BS supports only one of one-value signaling and multi-value signaling described above, it may use the supported signaling scheme. According to the determination result, the BS notifies one value $N_{RB}^{shortTTI}$ (RB count) to the UE through higher layer signaling (1202) or notifies a set of values $N_{RB}^{shortTTI}$ (RB counts) to the UE through higher layer signaling (1212). To higher-layer signal a set of values $N_{RB}^{shortTTI}$ (1212), the BS selects one from the set of values as $N_{RB}^{shortTTI}$ (1216). To perform downlink control resource mapping for shortened-TTI UEs with respect to the value of $N_{RB}^{shortTTI}$ (1204, 1214), the BS composes the PDCCH carrying downlink control information, the PHICH carrying ACK/NACK information for uplink HARQ, and the PCFICH carrying information on the number of OFDM symbols used for control information mapping in the corresponding slot, and maps the PDCCH, PHICH and PCFICH to the allocated RBs. Here, the process for composing the PDCCH, PHICH, PCFICH for shortened-TTI UEs (1206, 1218) and mapping these channels to both up to the first three OFDM symbols in the second slot of each subframe and the RBs allocated for shortened-TTI control signal transmission (1208, 1220) follows the process used by the BS to compose the PDCCH, PHICH and PCFICH for normal-TTI UEs and map these channels to up to the first three OFDM symbols of each subframe with substituting $N_{RB}^{shortTTI}$ for $N_{RB}^{DL}$ (total number of downlink RBs) (1208, 1220). Unlike normal-TTI transmission, the PHICH and PCFICH may be omitted for shortened-TTI transmission. In this case, the region assigned to the omitted PHICH and PCFICH may be used to transmit the PDCCH. Information on the omitted PHICH and PCFICH may be notified by the BS to the UE through higher layer signaling or through a procedure pre-agreed between the BS and the UE.

When $N_{RB}^{shortTTI}$ RBs are used to transmit shortened-TTI control information, the RB number for these RBs may be assigned in the range from 0 to $N_{RB}^{shortTTI}-1$ according to the existing PRB numbers in ascending or descending order. For normal-TTI UE control information, no operation is newly initiated in the second slot of each subframe (1210, 1222).

In the above description, the RB range is depicted as being used for control information transmission in the second slot of a subframe. In this case, the RB range used to transmit data scheduled by the control information may also be a problem. In one embodiment, the data scheduled by specific control information can be sent through the same RB range as that used to transmit the control information. In another embodiment, the data scheduled by specific control information can be sent through any RB range regardless of or other than the RB range used to transmit the control information.

Figure 16:
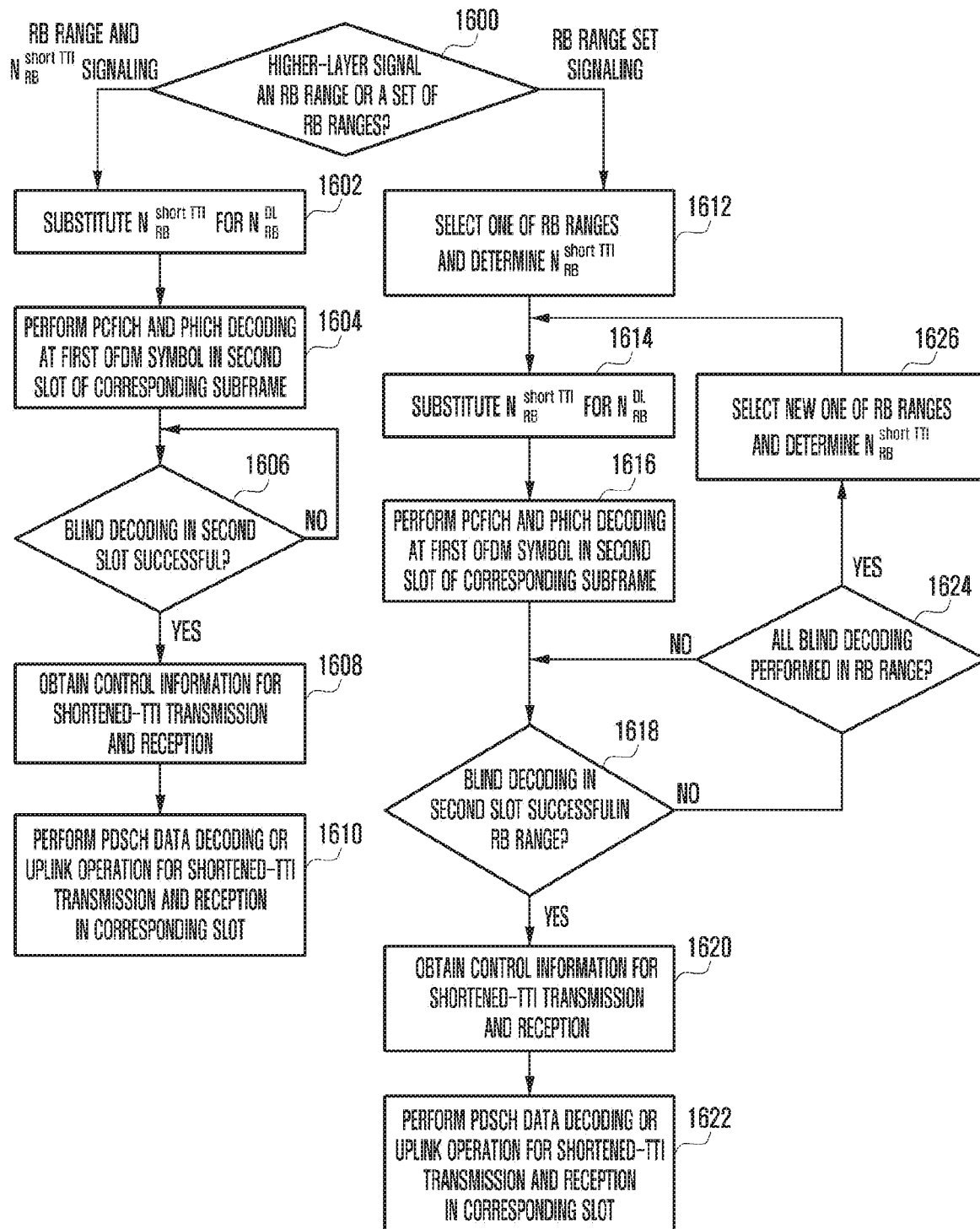
FIG. 16 depicts a UE procedure according to the fifth embodiment of the present invention.

FIG. 16 depicts a procedure for the UE to receive shortened-TTI control signals sent in the second slot of each subframe according to the fifth embodiment of the present invention.

Referring to FIG. 16, a shortened-TTI UE receives information on an RB range (through which control information is to be sent in the second slot of each subframe) and the number of RBs or information on a set of RB ranges and the number of RB ranges from the BS through higher layer signaling (1600).

Upon reception of information on an RB range (through which control information is to be sent in the second slot of each subframe) and the number of RBs ($N_{RB}^{shortTTI}$), the UE temporarily substitutes $N_{RB}^{shortTTI}$ for $N_{RB}^{DL}$ for decoding in the second slot of the corresponding subframe (1602). Using the above values, the UE performs, at the first OFDM symbol of the second slot, decoding on the PHICH carrying ACK/NACK information for uplink HARQ and the PCFICH carrying information on the number of OFDM symbols used to map control information in the corresponding slot (1604).

On the basis of the decoded PCFICH information, the UE performs blind decoding on up to the first three OFDM symbols for PDCCH decoding (1606). If control information is obtained through successful blind decoding (1608), the UE determines that the obtained control information is control information for shortened-TTI transmission, and performs PDSCH data decoding in the corresponding slot according to the DCI format and information or performs an uplink operation for shortened-TTI transmission and reception in the corresponding slot (1610).

Upon reception of information on a set of RB ranges (through which control information is to be sent in the second slot of each subframe) and the number of RB ranges from the BS through higher layer signaling, the UE selects one RB range from the set of RB ranges and sets the value of $N_{RB}^{shortTTI}$ to the number of RBs belonging to the selected RB range (1612).

The UE temporarily substitutes $N_{RB}^{shortTTI}$ for $N_{RB}^{DL}$ for decoding in the second slot of the corresponding subframe (1614). Using the above values, the UE performs, at the first OFDM symbol of the second slot, decoding on the PHICH carrying ACK/NACK information for uplink HARQ and the PCFICH carrying information on the number of OFDM symbols used to map control information in the corresponding slot (1616).

On the basis of the decoded PCFICH information, the UE performs blind decoding on up to the first three OFDM symbols for PDCCH decoding (1618). If control information is obtained through successful blind decoding (1620), the UE determines that the obtained control information is control information for shortened-TTI transmission, and performs PDSCH data decoding in the corresponding slot according to the DCI format and information or performs an uplink operation for shortened-TTI transmission and reception in the corresponding slot (1622).

Upon unsuccessful blind decoding, if there remains an RB not blind-decoded yet in the RB range (1624), the UE performs blind decoding again on the remaining RB. If blind decoding has been unsuccessful on all RBs belonging to the RB range (1624), the UE newly selects one RB range from the higher-layer signaled set of RB ranges and newly determines the value of $N_{RB}^{shortTTI}$ (1626). Thereafter, the above process is repeated until the control information is successfully obtained or blind decoding is performed for all RB ranges in the higher-layer signaled set.

The fifth embodiment may be modified and applied in various ways. For example, to configure L RB ranges with $N_{RB}^{shortTTI,1}, N_{RB}^{shortTTI,2}, \ldots, N_{RB}^{shortTTI,L}$ for PDCCH mapping for shortened-TTI UEs, the value of L may be set to 1 (L=1). That is, for shortened-TTI UEs, the BS may configure only one RB range for PDCCH mapping.

Sixth Embodiment

The sixth embodiment relates to a method where the BS configures a search space to which a shortened-TTI EPDCCH (or enhanced control information) can be mapped and notifies one UE or all UEs of the search space through higher layer signaling. The sixth embodiment is described with reference to FIG. 17.

Figure 17:
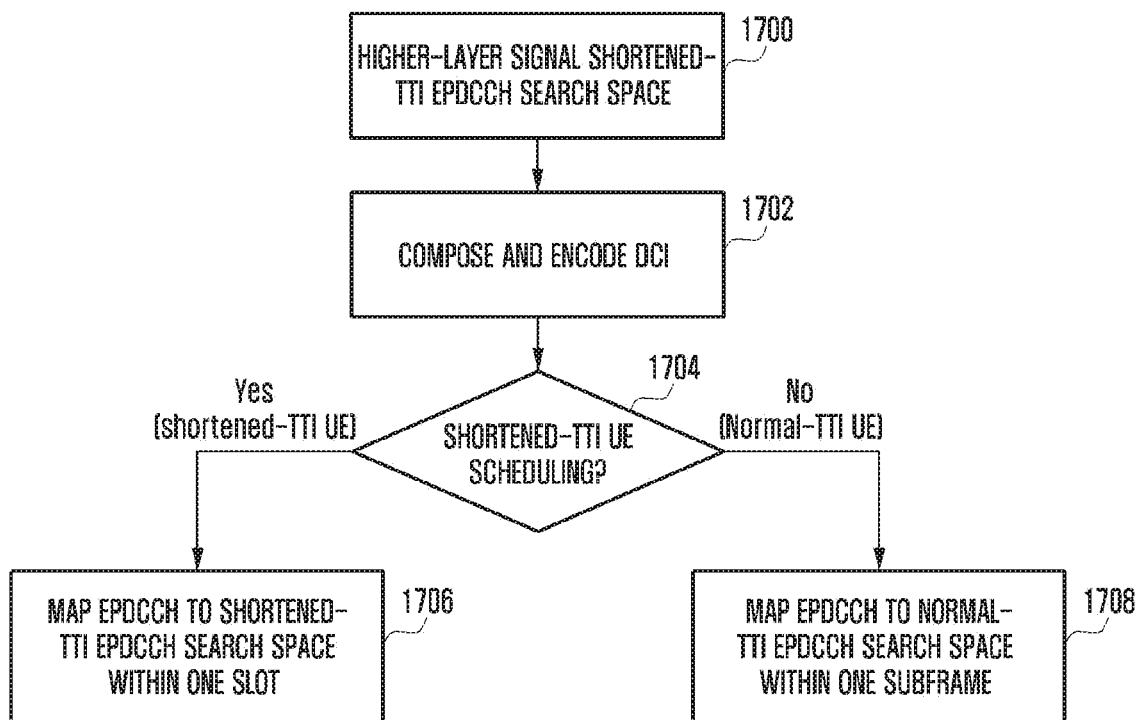
FIG. 17 depicts a BS procedure according to the sixth embodiment of the present invention.

FIG. 17 depicts a procedure for the BS to transmit control information for shortened-TTI transmission and reception by use of shortened-TTI EPDCCH transmitted within one slot according to the sixth embodiment of the present invention.

In the sixth embodiment, the BS configures a search space through which a shortened-TTI EPDCCH can be transmitted and notifies information related to the search space to a shortened-TTI UE through higher layer signaling (1700). This higher layer signaling may carry information regarding a subframe at which the EPDCCH can be sent, the OFDM symbol number at which the EPDCCH can start, an RB at which the EPDCCH can be sent, the resource element index for transmitting uplink control information for EPDCCH transmission, and the sequence index number for transmitting an EPDCCH reference signal. The BS appends a CRC value to the DCI including a control resource indicating shortened-TTI transmission and applies channel encoding to the DCI (1702). The BS maps the EPDCCH to the search space (1706), and does not map normal-TTI control resources to the search space (1708). The search space with aggregation level L through which a shortened-TTI EPDCCH can be sent may be determined according to the following equation.

$$L\left\{\left(Y_{p,k} + \left\lfloor \frac{m \cdot N_{ECCE,p,k}}{L \cdot M_p^{(L)}} + b + c \right\rfloor \mod \lfloor N_{CCE,p,k}/L \rfloor \right) + i,\right.$$
$$i = 0, \ldots, L-1$$
[Equation 8]

In Equation 8, $Y_{p,k}=(A p \cdot Y_{p,k-1}) \mod D$ where $Y_{p,-1}=n_{RNTI} \neq 0$, $A_0=39827$, $A_1=39829$, $D=65537$, and $k=\lfloor n_s/2 \rfloor$. Here, $n_s$ is a slot number in a radio frame.

In the above equation, b is given by $n_{CI}$ if the carrier indicator field (CIF) $n_{CI}$ is set, and is given by 0 if CIF $n_{CI}$ is not set. Here, $m=0, \ldots, M_p^{(L)}-1$ and $M_p^{(L)}$ is the number of PDCCHs to be monitored in each search space, and c is a value selected from among nonzero integers.

Equation 8 is an illustration for configuring different EPDCCH search spaces for normal-TTI transmission and shortened-TTI transmission. The above equation can be modified in various ways to enable a differentiation between the EPDCCH search space for normal-TTI transmission and the EPDCCH search space for shortened-TTI transmission. Meanwhile, in the second embodiment, assigning a separate shortened-TTI RNTI may enable a differentiation between search spaces.

According to the sixth embodiment, in the first slot of a subframe, while control information for a normal-TTI UE is mapped to the first three OFDM symbols of the slot, the EPDCCH for a shortened-TTI UE is mapped to other OFDM symbols of the slot excluding the first three OFDM symbols; and, in the second slot of the subframe, while control information for a shortened-TTI is mapped to the first three OFDM symbols of the slot and the EPDCCH for a shortened-TTI UE is mapped to other OFDM symbols of the slot excluding the first three OFDM symbols.

In the present invention, the shortened-TTI EPDCCH, like the existing normal-TTI EPDCCH, is mapped in a unit of ECCE. However, while the existing normal-TTI EPDCCH is mapped to ECCEs in the corresponding subframe, the shortened-TTI EPDCCH is mapped to ECCEs in the corresponding slot. The shortened-TTI ECCE is composed of resource elements (REs) in the slot.

Figure 18:
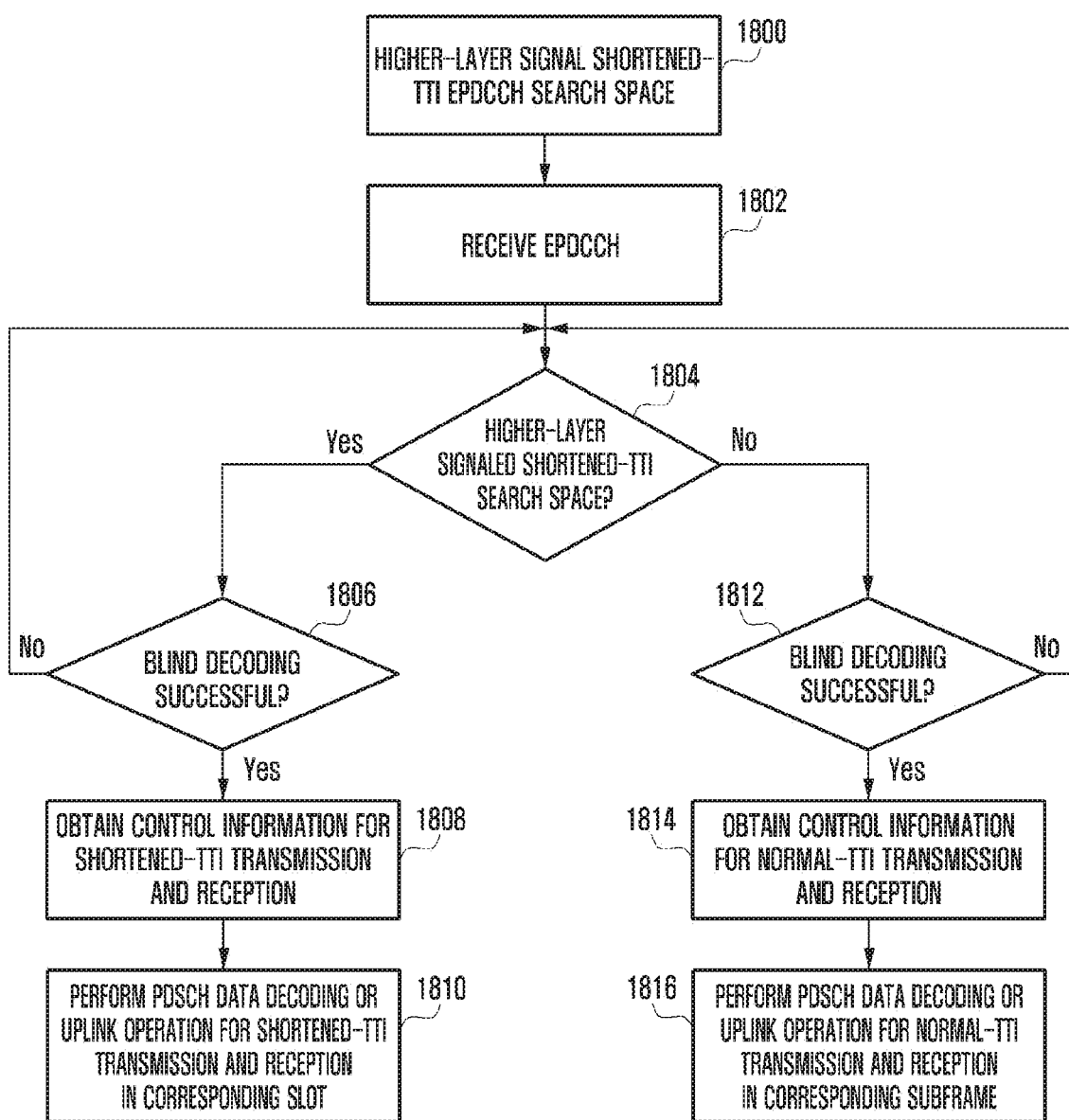
FIG. 18 depicts a UE procedure according to the sixth embodiment of the present invention.

FIG. 18 depicts a procedure for the UE to receive a control signal sent for shortened-TTI transmission according to the sixth embodiment of the present invention.

Referring to FIG. 18, a shortened-TTI UE receives information on a search space through which a shortened-TTI EPDCCH can be sent from the BS through higher layer signaling (1800).

The UE receives the EPDCCH (1802) and performs blind decoding in a specific search space. If EPDCCH decoding in the shortened-TTI search space (1804) is successful (1806), the UE determines that the control information carried by the corresponding EPDCCH is control information for shortened-TTI transmission (1808), and performs PDSCH data decoding in the corresponding slot according to the DCI format and information or performs an uplink operation for shortened-TTI transmission and reception in the corresponding slot (1810).

If EPDCCH decoding in the normal-TTI search space is successful (1812), the UE determines that the control information carried by the corresponding EPDCCH is control information for normal-TTI transmission (1814), and performs PDSCH data decoding in the corresponding subframe according to the DCI format and information or performs an uplink operation for normal-TTI transmission and reception in the corresponding subframe (1816).

6.5[th] Embodiment

The 6.5[th] embodiment relates to a method for transmission where the BS maps the PDSCH for shortened-TTI UEs in a full subframe. The 6.5[th] embodiment is described with reference to FIG. 20. In this embodiment, the PDSCH for shortened-TTI UEs is mapped not only to a slot where shortened-TTI control resources are transmitted but also to the next slot after the slot where shortened-TTI control resources are transmitted. In other words, the PDSCH for shortened-TTI UEs may be mapped for transmission to a resource block section occupying a full subframe where shortened-TTI control resources can be present.

Figure 20:
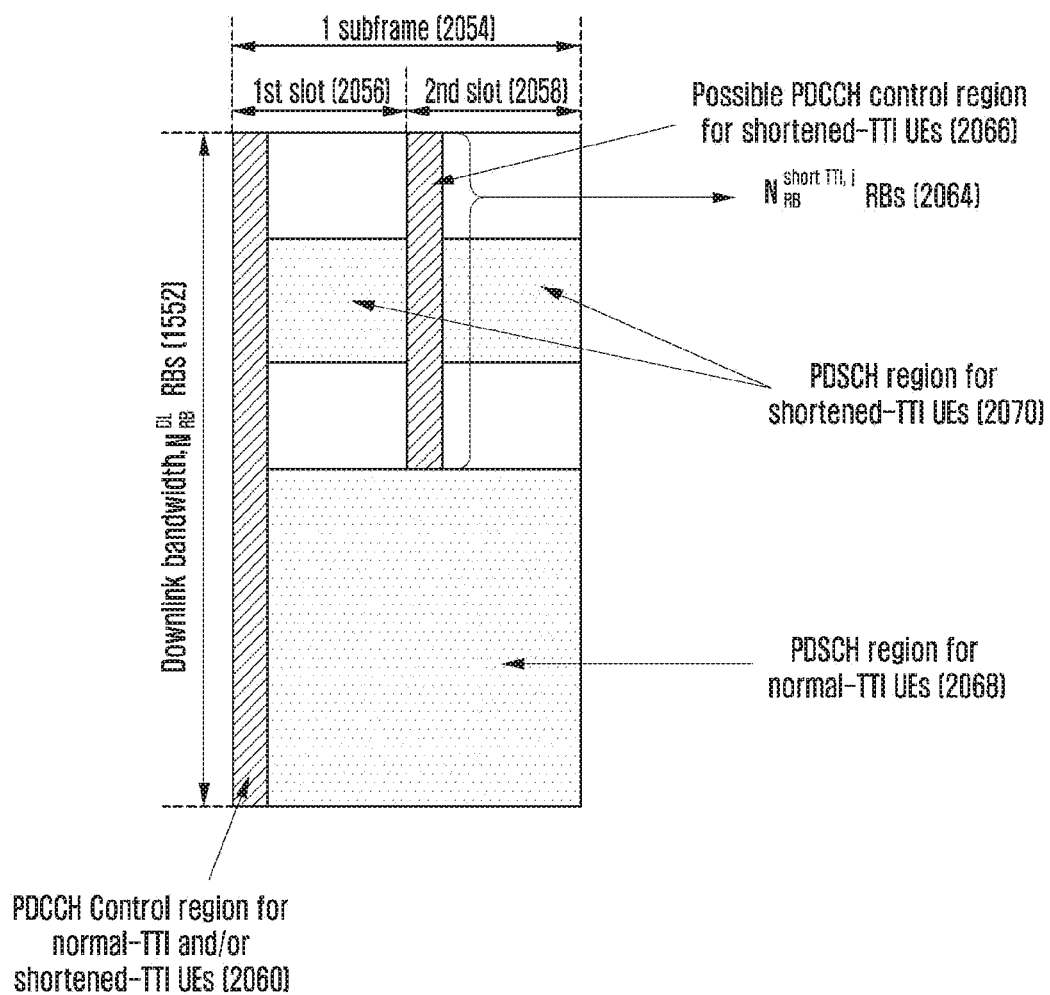
FIG. 20 illustrates a region in which the PDSCH is mapped to an entire subframe for the shortened-TTI UE according to the $6.5^{th}$ embodiment of the present invention.

FIG. 20 shows a downlink frame structure where one subframe is divided for RBs for shortened-TTI transmission and RBs for normal-TTI transmission. The region 2060 of up to the first three OFDM symbols in the first slot is used to map control information for normal-TTI or shortened-TTI transmission. The region 2066 of up to the first three OFDM symbols in the second slot is used to map control information for shortened-TTI transmission. Allocation of $N_{RB}^{shortTTI,i}$ RBs usable for mapping shortened-TTI control information may be performed in a manner similar to that of other embodiments described before.

Multiple RB sections to which shortened-TTI control information is mapped can be configured and allocated to UEs. The remaining downlink interval where shortened-TTI control information is not mapped may be used to map the PDSCH for normal-TTI transmission (2068).

The PDSCH indicated by shortened-TTI control information sent in the first slot may be mapped to a specific RB section of the corresponding slot for transmission; and the PDSCH indicated by shortened-TTI control information sent in the second slot may be mapped to a specific RB section of the corresponding slot for transmission.

As another example, at a resource block used to transmit shortened-TTI control information to shortened-TTI UEs, the control information sent in the first slot (2060) may indicate resource blocks to transmit the PDSCH mapped in both the first slot and the second slot (2070).

How to map the PDSCH sent in both the first slot and the second slot may be described in the following way.

To map the PDSCH with rate matching, it is possible to map the PDSCH to the corresponding RB with rate matching by excluding the resource region used to map second-slot shortened-TTI control information.

As another example, the PDSCH is rate-matched in a manner similar to that for normal-TTI transmission, and mapped to the corresponding RB by excluding the resource element used to transmit second-slot shortened-TTI control information through puncturing.

Figure 21:
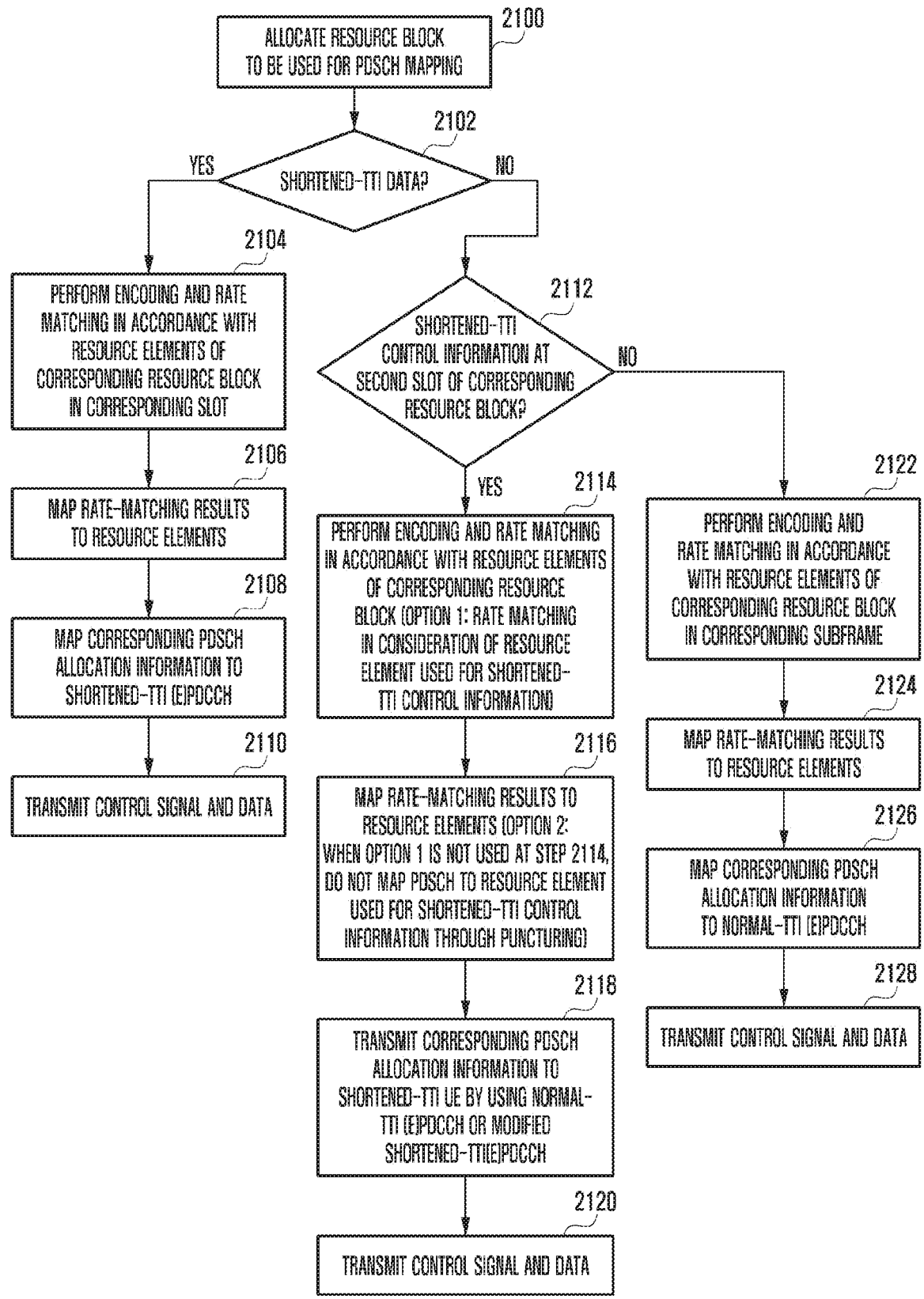
FIG. 21 depicts a BS procedure according to the $6.5^{th}$ embodiment of the present invention.

FIG. 21 depicts a procedure of the BS operating by use of the above PDSCH mapping.

The BS allocates an RB to be used to send data to a shortened-TTI UE (2100). If the data is shortened-TTI data to be sent in one slot (2102), to allocate the PDSCH in the corresponding RB in the corresponding slot, the BS encodes the PDSCH with rate matching (2104) and maps the PDSCH to resource elements (2106). Thereafter, the BS maps shortened-TTI control information to the (E)PDCCH (2108).

The BS sends the control signal and PDSCH data as determined above to the UE (2110). If the data is shortened-TTI data to be sent in one subframe (2102), the BS checks whether shortened-TTI control information is present in the second slot of the corresponding RB used to send the data (2112). If shortened-TTI control information is present in the second slot of the corresponding RB, the BS does not map the PDSCH to the resource element used to map the shortened-TTI control information.

Not to map the PDSCH to the resource element to which the shortened-TTI control information is mapped, the PDSCH may be rate-matched so that the resource element used to carry the shortened-TTI control information is excluded (2114), or the PDSCH may be rate-matched in a regular way and then the resource element used to carry the shortened-TTI control information may be punctured (2116).

Upon mapping the PDSCH, the BS may send the corresponding resource allocation information through a normal-TTI (E)PDCCH or a modified shortened-TTI (E)PDCCH (2118). Here, the modified shortened-TTI (E)PDCCH corresponds to adding an extra bit, which notifies a shortened-TTI UE that the PDSCH is mapped to a specific resource region occupying a full subframe, to the scheme for shortened-TTI (E)PDCCH mapping proposed in a different embodiment described before. If the data is not shortened-TTI data (2102) and shortened-TTI control information is not present in the second slot of the corresponding RB, the BS encodes and rate-matches the PDSCH in a manner similar to that for normal-TTI transmission (2122) and maps the resulting PDSCH to the corresponding resource element (2124). The BS maps the PDSCH allocation information to the normal-TTI (E)PDCCH for transmission (2126).

Figure 22:
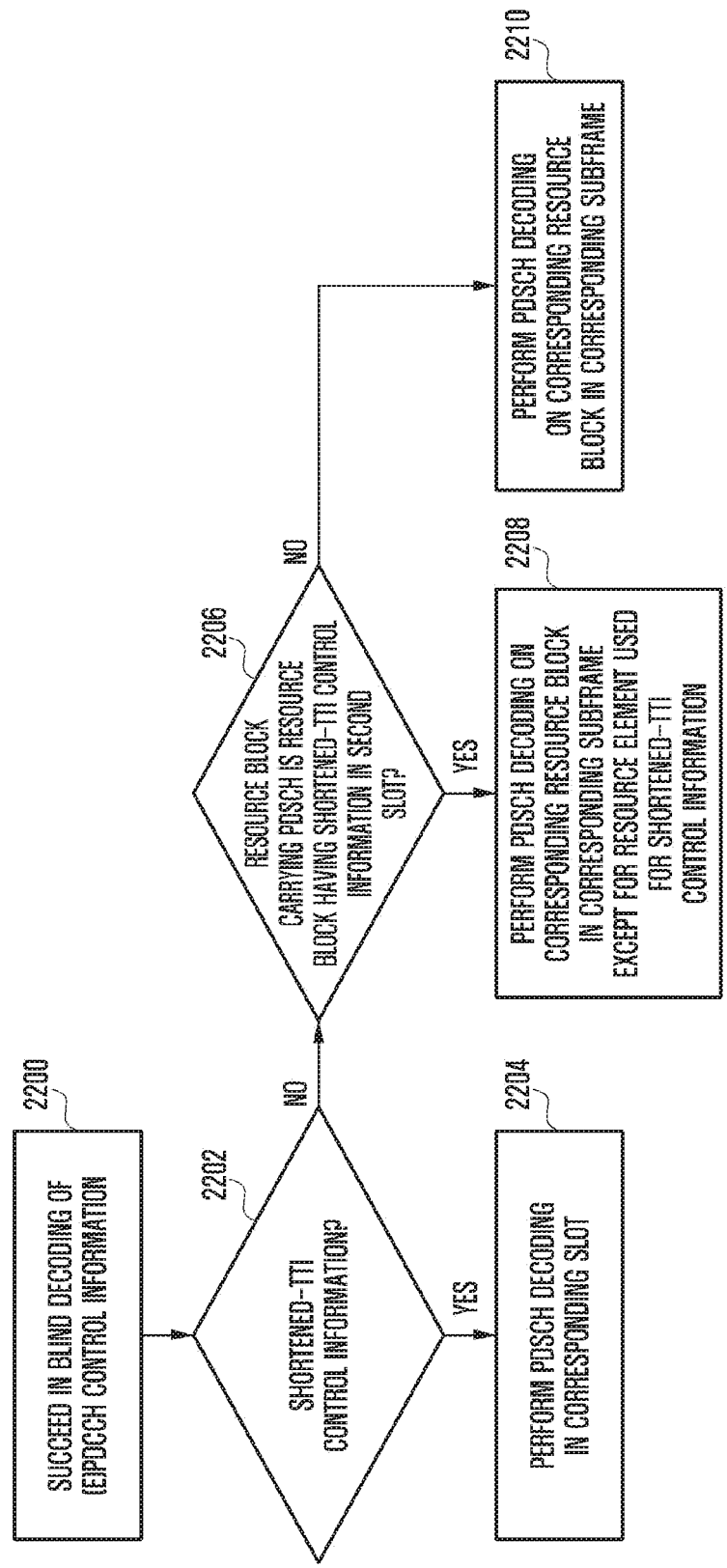
FIG. 22 depicts a UE procedure according to the $6.5^{th}$ embodiment of the present invention.

FIG. 22 depicts a procedure performed by a shortened-TTI UE to determine the region for PDSCH decoding upon receiving control information through (E)PDCCH blind decoding (2200).

Referring to FIG. 22, when a shortened-TTI UE succeeds in decoding received downlink control information (2200), and if the control information is for shortened-TTI control information (2202), the UE performs PDSCH decoding in the slot where the control information is received (2204). If the control information is not for shortened-TTI control information and the RB carrying the PDSCH is an RB having shortened-TTI control information in the second slot (2206), the UE performs PDSCH decoding on the RB except for the resource element to which the second-slot shortened-TTI control information is mapped (2208).

If the control information is not for shortened-TTI control information and the RB carrying the PDSCH is not an RB having shortened-TTI control information in the second slot (2206), the UE performs PDSCH decoding on the RB at the corresponding subframe (2210).

Seventh Embodiment

The seventh embodiment relates to a method where the BS notifies information on an RB to which shortened-TTI EPDCCH can be mapped in each slot through higher layer signaling and the UE receives downlink control information through blind decoding of the EPDCCH. The seventh embodiment is described with reference to FIG. 19.

That is, when control information is obtained from a higher-layer signaled RB range, the UE may regard the obtained control information as shortened-TTI control information.

Figure 19:
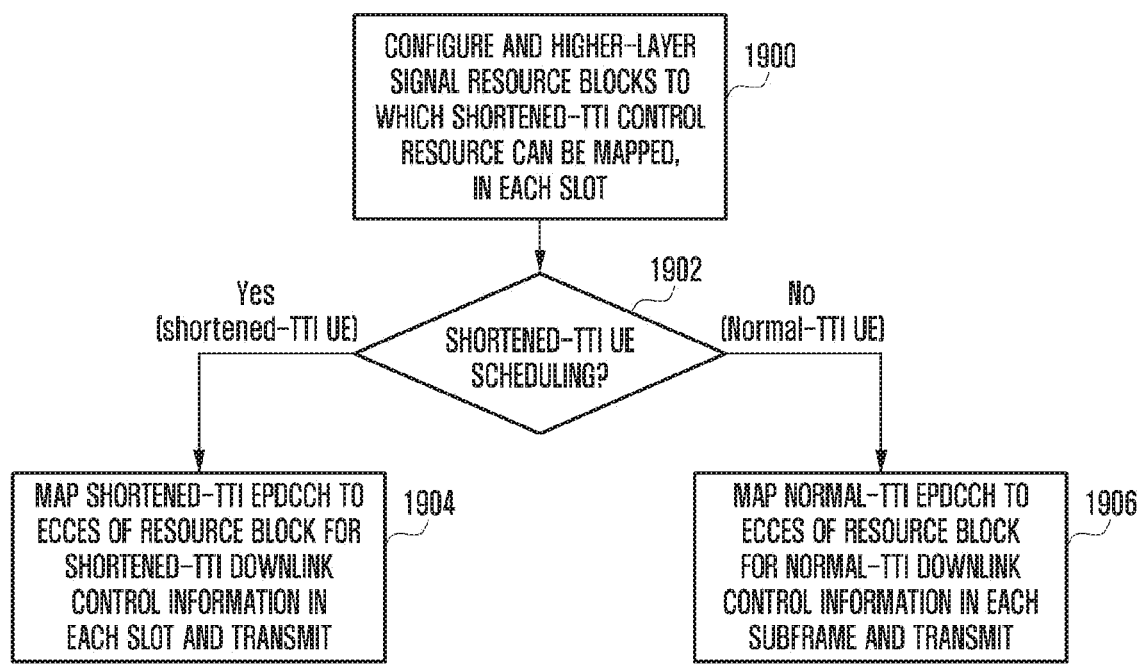
FIG. 19 depicts a BS procedure according to the seventh embodiment of the present invention.

FIG. 19 depicts a procedure for the BS to transmit shortened-TTI EPDCCH in each second slot according to the seventh embodiment of the present invention.

In the seventh embodiment, the BS configures an RB used to transmit a shortened-TTI control resource in each slot and notifies information on the RB to shortened-TTI UEs through higher layer signaling (1900).

After configuring an RB to which a shortened-TTI control signal can be mapped, the BS maps the EPDCCH for shortened-TTI UEs to ECCEs (Enhanced Control Channel Element) of the configured RB for transmission in each slot (1904). If shortened-TTI scheduling is not applied, the BS maps the EPDCCH for normal-TTI UEs to an RB configured to transmit a normal-TTI EPDCCH for transmission at each subframe (1906).

Figure 23:
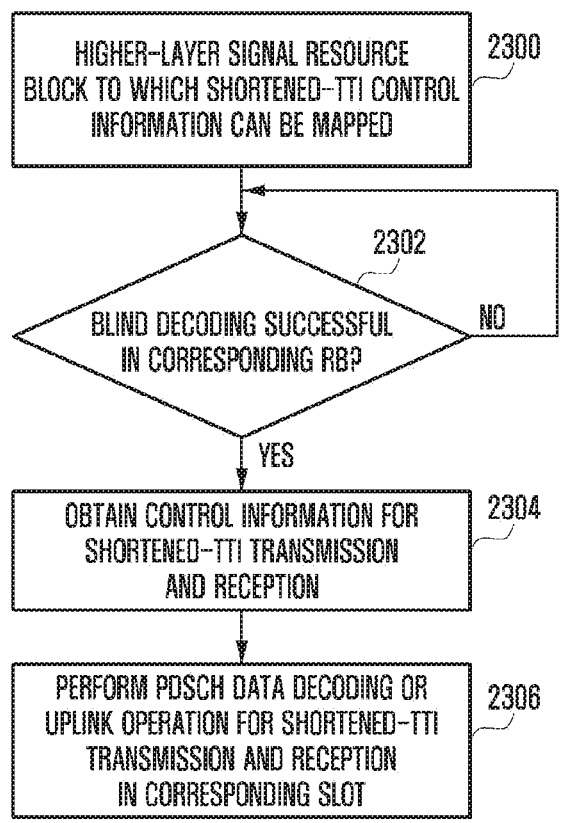
FIG. 23 depicts a UE procedure according to the seventh embodiment of the present invention.

FIG. 23 depicts a procedure for the UE to receive a shortened-TTI control signal sent at each slot according to the seventh embodiment of the present invention.

Referring to FIG. 23, a shortened-TTI UE receives location information of an RB through which control information is to be sent from the BS in each slot through higher layer signaling (2300).

The UE performs blind decoding on the corresponding RB to decode the EPDCCH (2302). If control information is obtained through successful blind decoding (2304), the UE determines that the obtained control information is shortened-TTI control information, and performs PDSCH data decoding in the corresponding slot according to the DCI format and information or performs an uplink operation for shortened-TTI transmission and reception in the corresponding slot (2306).

Next, a description is given of schemes for sending and receiving shortened-TTI uplink control resources through the PUCCH.

Meanwhile, according to one embodiment of the present invention, a UE performing downlink reception based on shortened-TTI mode may perform uplink transmission based on either shortened-TTI mode or normal-TTI mode.

Eighth Embodiment

The eighth embodiment relates to a method for uplink control resource transmission and reception where, to send a shortened-TTI uplink control resource through the PUCCH, a shortened-TTI UE may send the uplink control resource using one PRB during one slot, or the UE may send a portion of the uplink control resource using one PRB during up to the first six OFDM symbols of one slot, performs frequency hopping, and send the remaining portion of the uplink control resource using another PRB during the remaining OFDM symbols of the slot. The eighth embodiment is described with reference to FIGS. 24 and 25.

Figure 24:
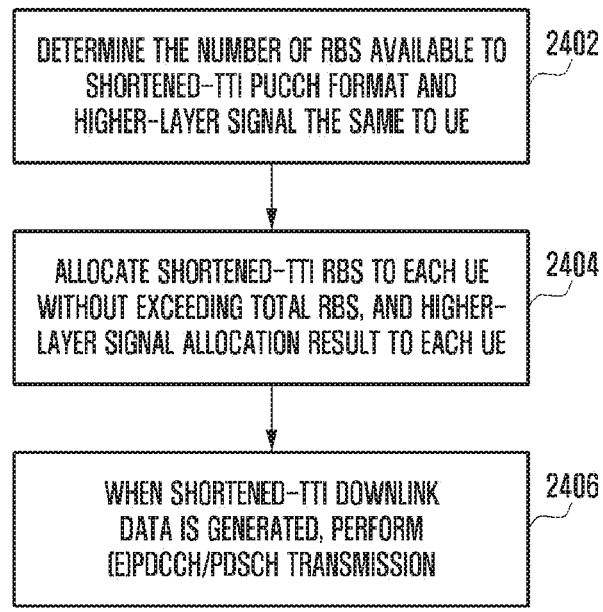
FIG. 24 depicts a BS procedure according to the eighth embodiment of the present invention.

FIG. 24 depicts a procedure for the BS to allocate resources to a shortened-TTI UE for shortened-TTI PUCCH transmission according to the eighth embodiment of the present invention.

Before describing the procedure in FIG. 24, an example of a PUCCH transmission structure for a shortened-TTI is described with reference to FIG. 25.

Figure 25:
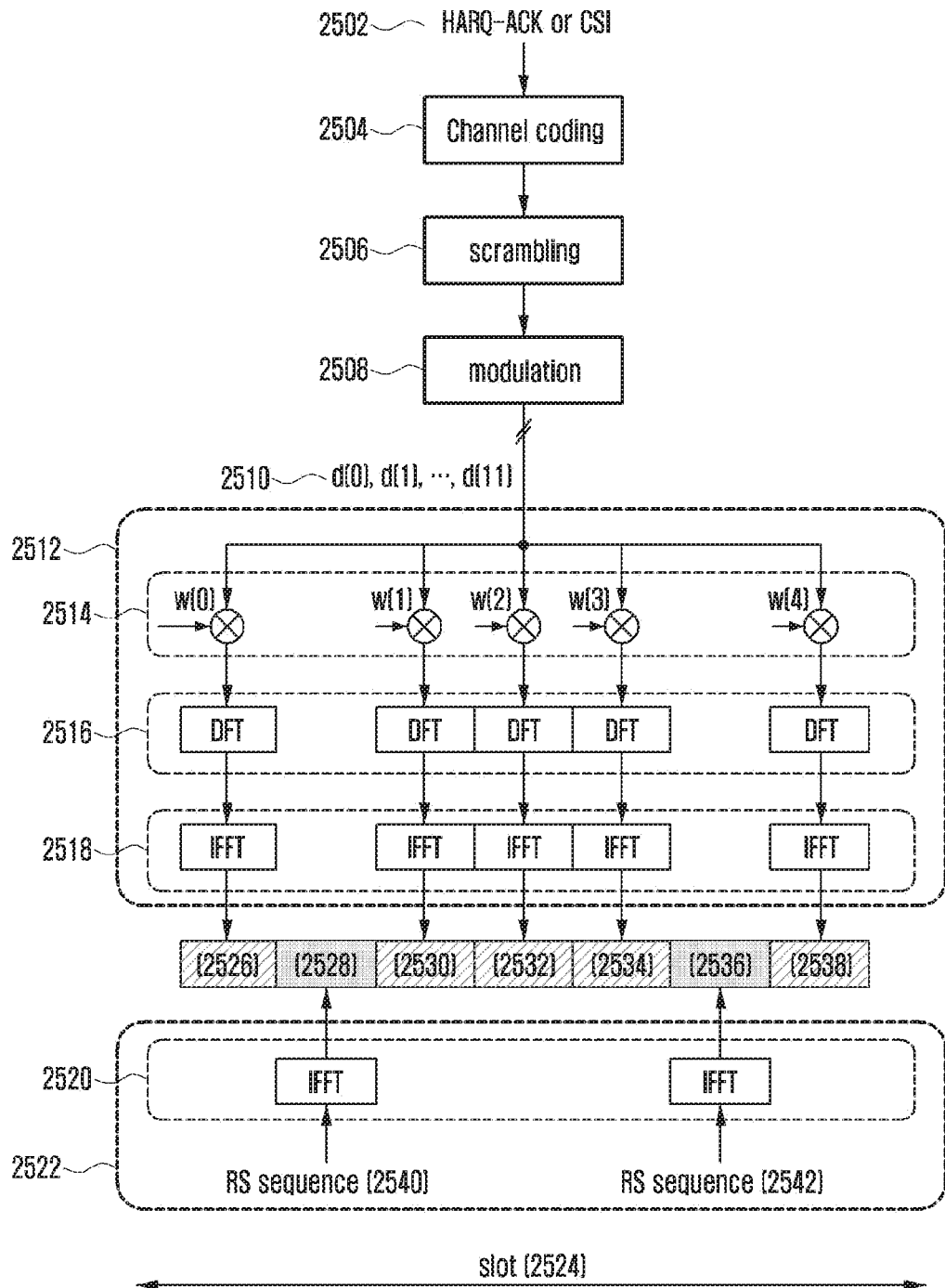
FIG. 25 illustrates shortened-TTI PUCCH transmission according to the eighth embodiment of the present invention.

Referring to FIG. 25, downlink HARQ ACK/NACK bits and/or CSI information bits 2502 are channel coded (2504). Here, channel coding may include rate matching or interleaving. The UE applies scrambling (2506). The UE modulates the scrambled signal (2508) to generate $M_{symb}$ modulation symbols $d(0), d(1), \ldots, d(M_{symb}-1)$. In FIG. 25, $M_{symb}=12$. The modulation symbols are mapped to the slot 2524 used to transmit a shortened-TTI PUCCH through a signal processor 2512. Here, the signal processor 2512 for a shortened-TTI PUCCH may include a block-wise multiplier 2514, a DFT (Discrete Fourier Transform) block 2516, and an IFFT (Inverse Fast Fourier Transform) block 2518. In the block-wise multiplier 2514, length-5 orthogonal sequences (or orthogonal cover (OC)) [w(0), w(1), w(2), w(3), w(4)] are block-wise multiplied.

When the last OFDM symbol is used for SRS transmission or is emptied to protect another UE performing SRS transmission, the last OFDM symbol is not sent. In this case, length-4 orthogonal sequences are used. After processing of DFT (2516) and IFFT (2518), the resulting values are mapped respectively to SC-FDMA symbols for UCI transmission in the slot.

Specifically, the modulation symbols d(0) to d(11) are block-wise multiplied by OC sequences to produce the following five symbol sequences.

[d(0)w(0), d(1)w(0), d(2)w(0), d(3)w(0), d(4)w(0), d(5) w(0), d(6)w(0), d(7)w(0), d(8)w(0), d(9)w(0), d(10)w(0), d(11)w(0)],

[d(0)w(1), d(1)w(1), d(2)w(1), d(3)w(1), d(4)w(1), d(5) w(1), d(6)w(1), d(7)w(1), d(8)w(1), d(9)w(1), d(10)w(1), d(11)w(1)],

[d(0)w(2), d(1)w(2), d(2)w(2), d(3)w(2), d(4)w(2), d(5) w(2), d(6)w(2), d(7)w(2), d(8)w(2), d(9)w(2), d(10)w(2), d(11)w(2)],

[d(0)w(3), d(1)w(3), d(2)w(3), d(3)w(3), d(4)w(3), d(5) w(3), d(6)w(3), d(7)w(3), d(8)w(3), d(9)w(3), d(10)w(3), d(1)w(3)],

[d(0)w(0), d(1)w(4), d(2)w(4), d(3)w(4), d(4)w(4), d(5) w(4), d(6)w(4), d(7)w(4), d(8)w(4), d(9)w(4), d(10)w(4), d(1)w(4)]

Thereafter, the individual symbol sequences are DFT and IFFT processed and mapped respectively to SC-FDMA symbols 2526, 2530, 2532, 2534 and 2538 in the slot for UCI transmission. In the above process, DFT and IFFT processing may be omitted.

The RS signals used by the BS for channel estimation for UCI reception are mapped respectively to SC-FDMA symbols 2528 and 2536 designated for RS signal transmission through an RS signal processor 2522. Here, the RS signal processor 2522 includes an IFFT block 2520 and RS signal generators 2540 and 2542. Hence, the UE generates RS signals through the RS signal generators 2540 and 2542 using CAZAC sequences. The generated RS signals are IFFT processed (2520) and mapped respectively to SC-FDMA symbols 2528 and 2536 designated for RS signal transmission.

Figure 26:
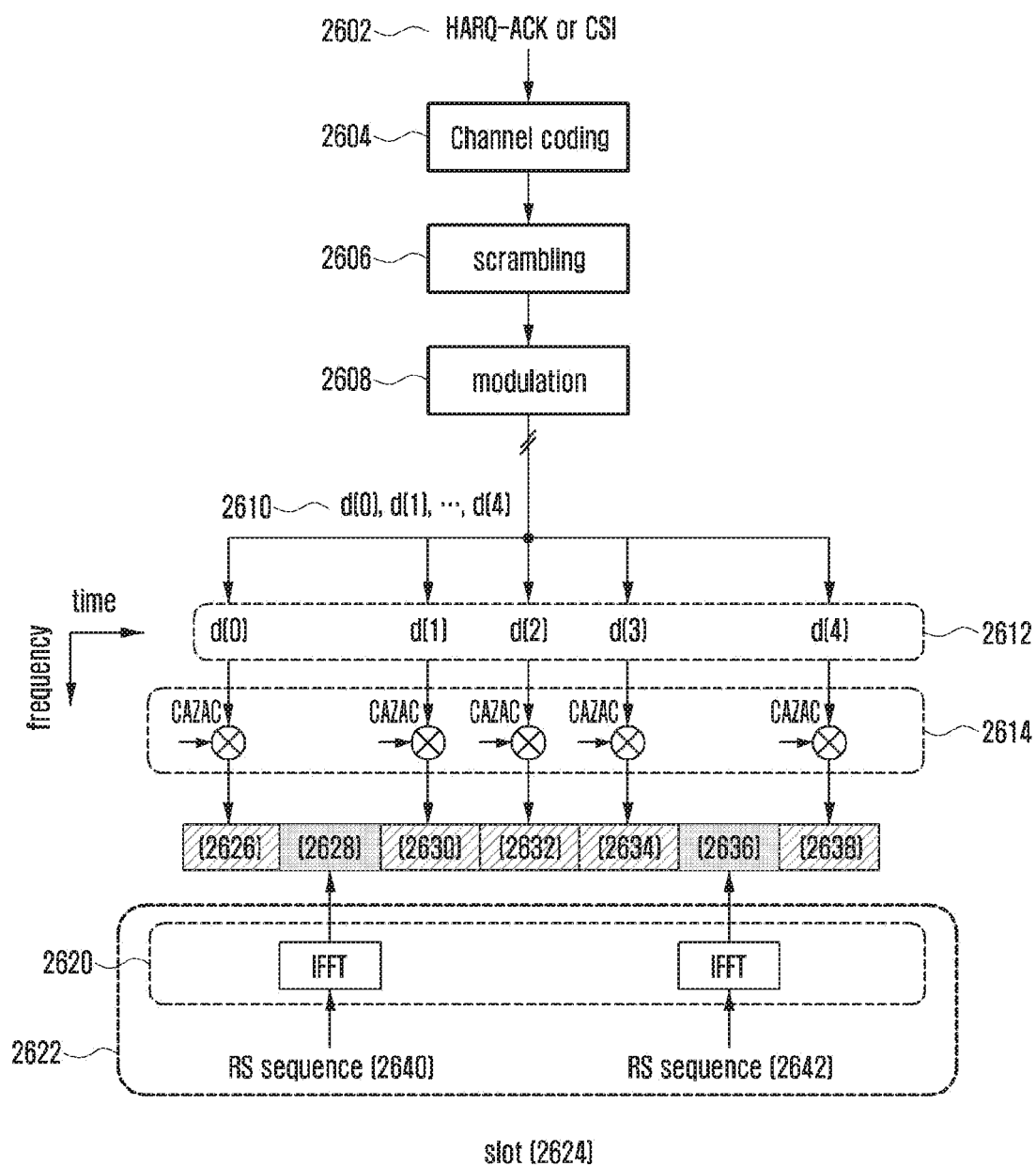
FIG. 26 illustrates shortened-TTI PUCCH transmission according to the eighth embodiment of the present invention.

FIG. 26 is an example of a PUCCH transmission structure for a shortened-TTI according to the present invention.

Referring to FIG. 26, downlink HARQ ACK/NACK bits and/or CSI information bits 2602 are channel coded (2604), scrambled (2606), and modulated (2608) in the same way as that of FIG. 25. In FIG. 26, the number of modulation symbols $M_{symb}$ is 5. The modulation symbols are multiplied by length-12 CAZAC sequences (2614) and mapped respectively to SC-FDMA symbols 2626, 2630, 2632, 2634 and 2638 designated for UCI transmission in the slot.

The RS signals used by the BS for channel estimation for UCI reception are mapped respectively to SC-FDMA symbols 2628 and 2636 designated for RS signal transmission through an RS signal processor 2622. Here, the RS signal processor 2622 includes an IFFT block 2620 and RS signal generators 2640 and 2642. Hence, the UE generates RS signals through the RS signal generators 2640 and 2642 using CAZAC sequences. The generated RS signals are IFFT processed (2620) and mapped respectively to SC-FDMA symbols 2628 and 2636 designated for RS signal transmission.

Figure 27:
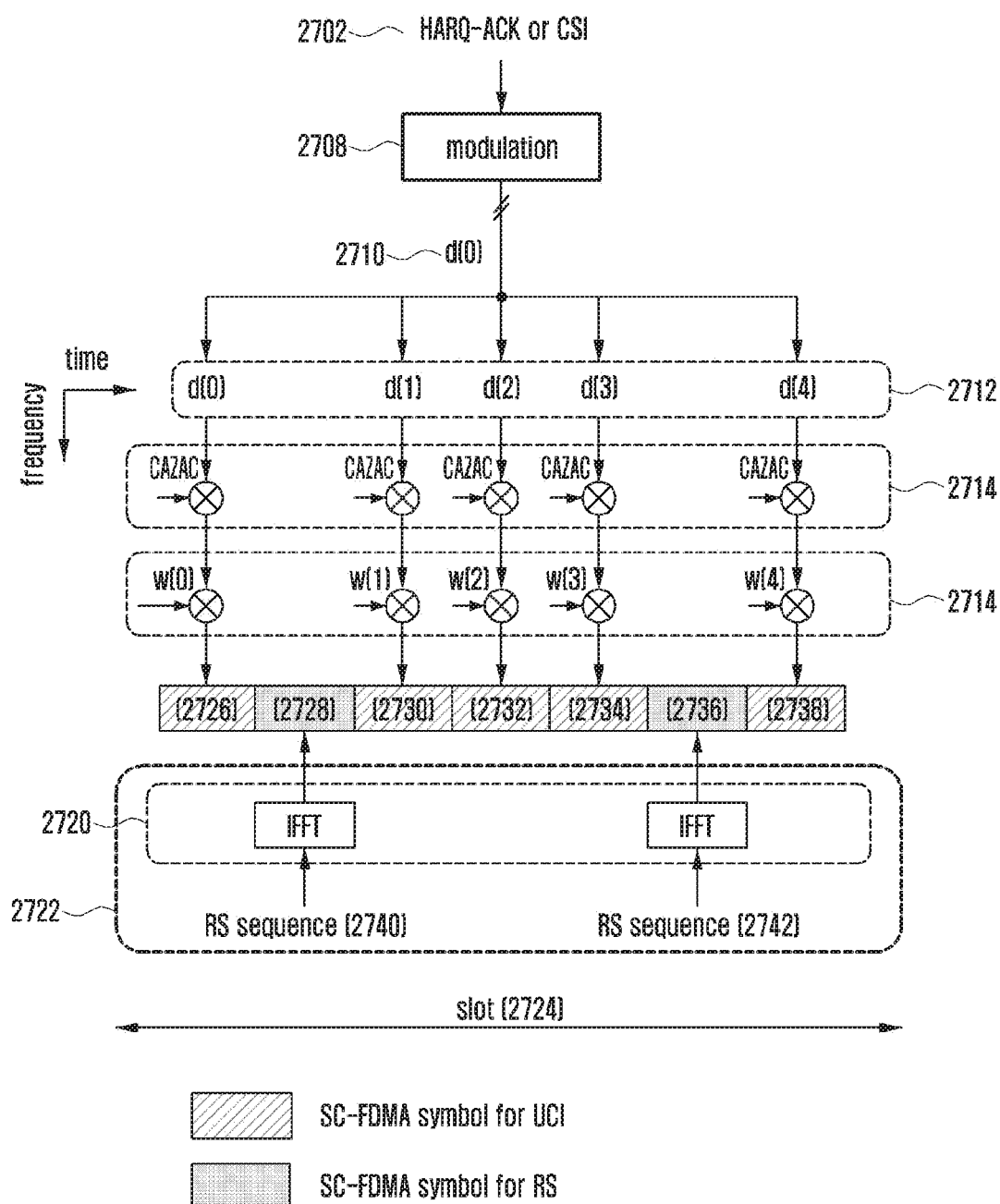
FIG. 27 illustrates shortened-TTI PUCCH transmission according to the eighth embodiment of the present invention.

FIG. 27 is another example of a PUCCH transmission structure for a shortened-TTI according to the present invention.

Referring to FIG. 27, downlink HARQ ACK/NACK information of 1 or 2 bits is modulated into one symbol. This symbol is multiplied by length-12 CAZAC sequences (2714), and block-wise multiplied by length-5 orthogonal sequences (or orthogonal cover (OC)) [w(0), w(1), w(2), w(3), w(4)] through a block-wise multiplier (2716). The resulting values are mapped respectively to SC-FDMA symbols 2726, 2730, 2732, 2734 and 2738 designated for UCI transmission in the slot.

The RS signals used by the BS for channel estimation for UCI reception are mapped respectively to SC-FDMA symbols 2728 and 2736 designated for RS signal transmission in the same manner as in FIG. 25 or 26.

In the above examples of FIGS. 25, 26 and 27, two OFDM symbols are used for RS signal transmission in one slot. However, the number or position of OFDM symbols used for RS signal transmission in one slot may be varied. For example, in FIGS. 25, 26 and 27, among 7 OFDM symbols, the second and sixth OFDM symbols are used for RS signal transmission. However, this can be readily modified so that the third, fourth and fifth OFDM symbols are used for RS signal transmission. In this case, as four OFDM symbols in the slot are not used for RS signal transmission, the length of orthogonal sequences used in the above examples is to be 4. As another example, only the fourth OFDM symbol may be used for RS signal transmission and the remaining 6 OFDM symbols may be used for UCI transmission.

When a shortened-TTI PUCCH format depicted in FIG. 25, 26 or 27 is used, the RB used in one slot may be selected in various ways. For example, referring to FIG. 28, the UE may map the shortened-TTI PUCCH to, among total $N_{RB}^{UL}$ uplink RBs 2800, the $n^{th}$ PRB 2806 in a full slot 2802 for uplink transmission.

Figure 29:
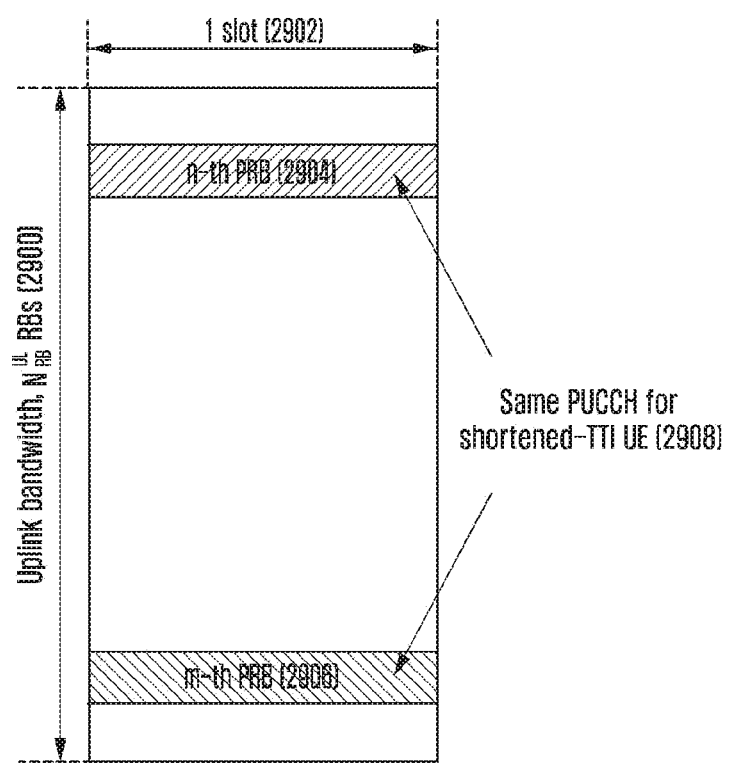
FIG. 29 illustrates shortened-TTI PUCCH resource mapping according to the eighth embodiment of the present invention.

As another example, when a shortened-TTI PUCCH format depicted in FIG. 25, 26 or 27 is used, it is possible to map the shortened-TTI PUCCH to two different PRBs for transmission as shown in FIG. 29. In this case, a frequency diversity gain can be obtained.

Here, two PRBs may be selected in various ways. As a representative example, the $n^{th}$ PRB 2904 and the $m^{th}$ PRB 2906 may be selected for transmission so that $m=N_{UL}^{RB}-n-1$. As another example, for a shortened-TTI UE trying to select two PRBs for uplink control signal transmission as shown in FIG. 29, the shortened-TTI UE may map a portion of a normal-TTI PUCCH format, being sent through one PRB during two slots, to be sent in the first slot to the $n^{th}$ PRB 2904 used for uplink control signal transmission, and map another portion of the normal-TTI PUCCH format to be sent in the second slot to the $m^{th}$ PRB 2906 used for uplink control signal transmission.

Figure 30:
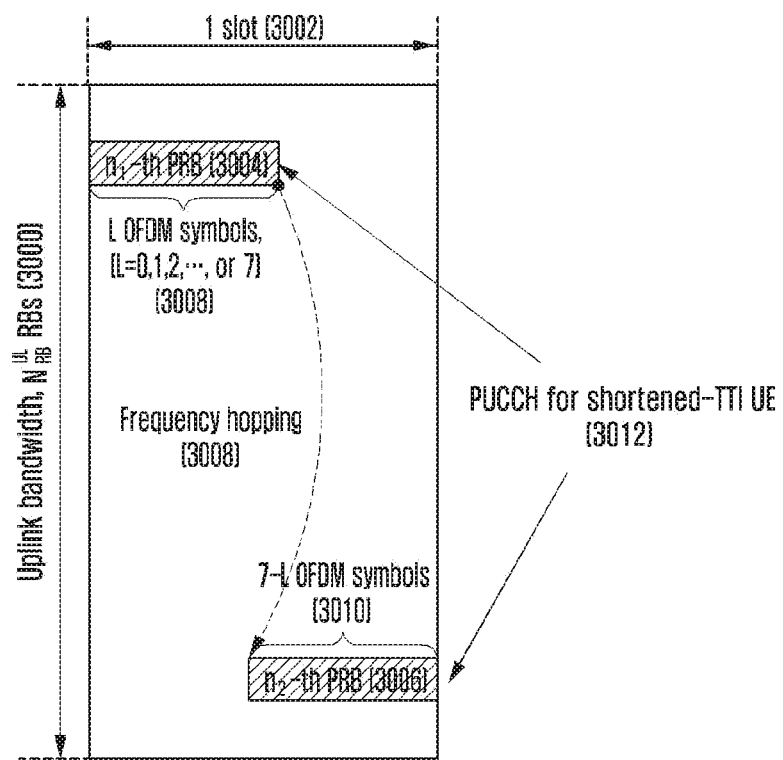
FIG. 30 illustrates shortened-TTI PUCCH resource mapping according to the eighth embodiment of the present invention.

As another example for resource mapping of a shortened-TTI PUCCH format, frequency hopping may be applied within one slot 3002 as shown in FIG. 30. In FIG. 30, the portion of a shortened-TTI PUCCH format corresponding to the first L OFDM symbols 3008 is mapped to the $n_1^{th}$ PRB 3004 and the portion of the shortened-TTI PUCCH format corresponding to the remaining 7-L OFDM symbols 3010 is mapped to the $n_2^{th}$ PRB 3006 within the same slot.

Figure 28:
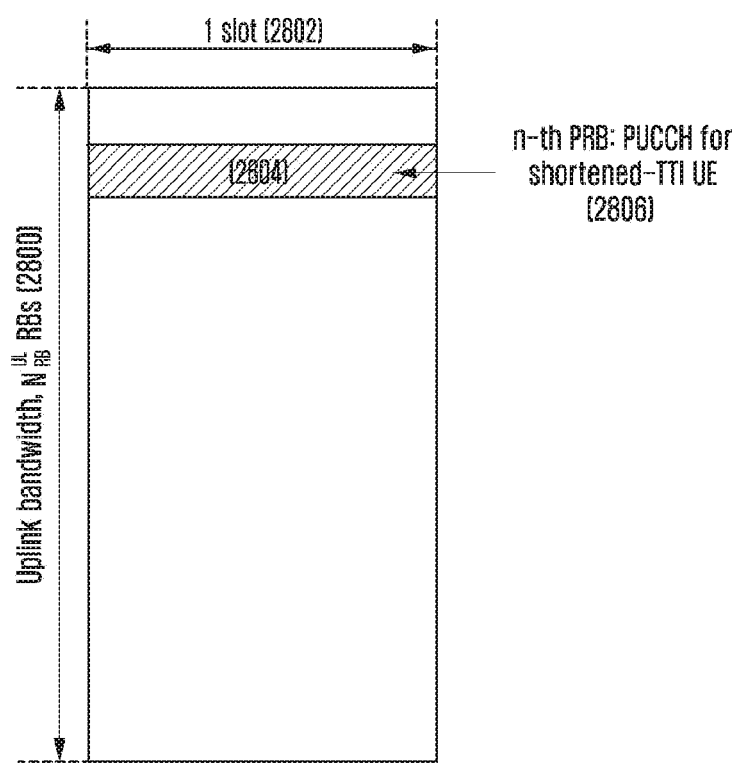
FIG. 28 illustrates shortened-TTI PUCCH resource mapping according to the eighth embodiment of the present invention.

The PRB number used for mapping described in the above examples of FIGS. 28, 29 and 30 may be higher-layer signaled by the BS or may be explicitly or implicitly delivered from the BS through a shortened-TTI (E)PDCCH used to transmit shortened-TTI downlink control resources.

When the shortened-TTI UE transmits both a shortened-TTI PUCCH format and a shortened-TTI PUCCH in the same slot, the BS may perform transmission and reception of uplink control resources in the following way.

Referring to FIG. 24, the BS determines the number of RBs available to the shortened-TTI PUCCH format ($N_{RB}^{(shortend-TTI)}$) in consideration of the number of shortened-TTI UEs and the number of shortened-TTI UEs supporting carrier aggregation in the current cell, and notifies all shortened-TTI UEs in the cell of information on the number of RBs available to the shortened-TTI PUCCH format ($N_{RB}^{(shortend-TTI)}$) through higher layer signaling (2402). The BS allocates $n_{PUCCH}^{(shortend-TTI)}$ RBs for the shortened-TTI PUCCH format to each shortened-TTI UE without exceeding the $N_{RB}^{(shortend-TTI)}$ RBs, and notifies individual shortened-TTI UEs of information on the RBs allocated as a shortened-TTI PUCCH format resource through higher layer signaling (2404). Alternatively, the BS may perform (E)PDCCH mapping implicitly according to the shortened-TTI PUCCH format resource allocated to each UE, enabling the UE to identify the shortened-TTI PUCCH format resource.

Figure 31:
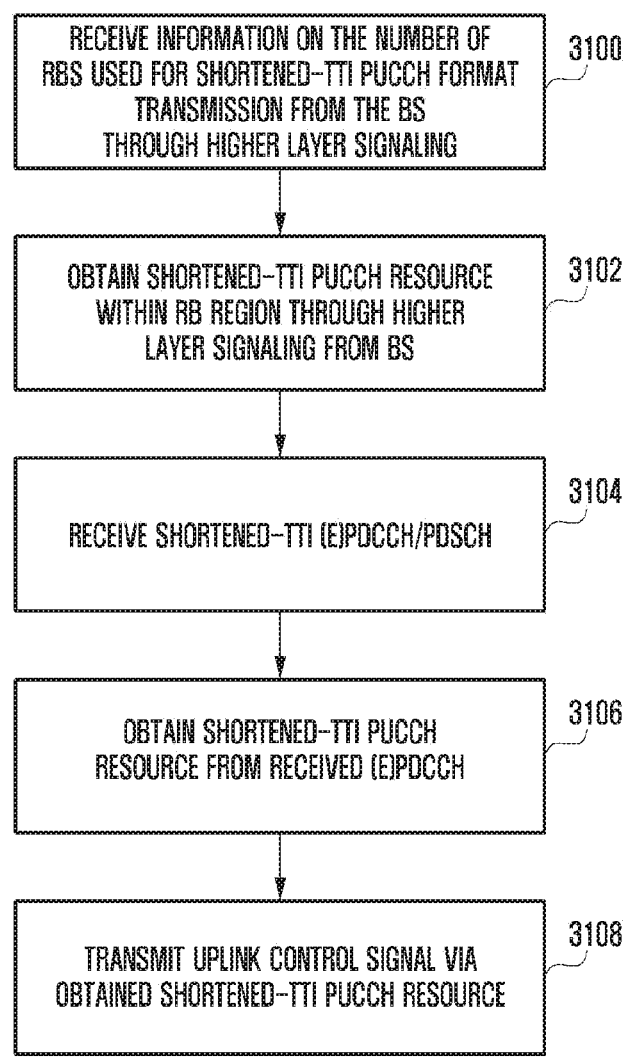
FIG. 31 depicts a UE procedure according to the eighth embodiment of the present invention.

FIG. 31 depicts a procedure for the UE to receive a shortened-TTI control signal sent in each slot according to the eighth embodiment of the present invention.

Referring to FIG. 31, a shortened-TTI UE receives information on the number of RBs through which a shortened-TTI PUCCH format is to be sent from the BS in each slot through higher layer signaling (3100). Thereafter, the shortened-TTI UE receives a shortened-TTI resource within the RB range from the BS through higher layer signaling (3102). In one embodiment of the present invention, the shortened-TTI resource may be identified by a sequence number or sequence type used in the RB range.

Thereafter, the shortened-TTI UE receives the (E)PDCCH, and, if blind decoding of the (E)PDCCH is successful, obtains a shortened-TTI PUCCH resource indicated by the DCI (3106). The UE composes an uplink control signal in a shortened-TTI PUCCH format and maps the uplink control signal to the shortened-TTI PUCCH resource for transmission to the BS (3108). One of step 3102 and step 3106 for obtaining the shortened-TTI PUCCH resource may be skipped.

Ninth Embodiment

The ninth embodiment relates to a method where bits indicating information on a resource block to which a shortened-TTI PUCCH can be mapped are explicitly added to the downlink control resource of the shortened-TTI PDCCH or EPDCCH. The ninth embodiment is described with reference to FIG. 32.

Figure 32:
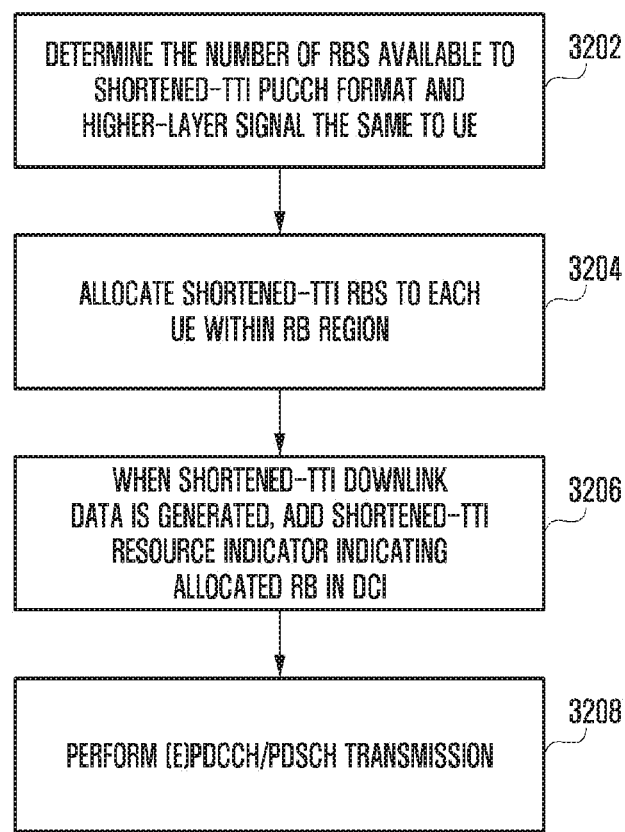
FIG. 32 depicts a BS procedure according to the ninth embodiment of the present invention.

FIG. 32 depicts a procedure for the BS to allocate and send a shortened-TTI PUCCH resource to the UE according to the ninth embodiment of the present invention.

Referring to FIG. 32, the BS determines the number of RBs ($N_{RB}^{(shortend-TTI)}$) available to the shortened-TTI PUCCH format in consideration of the number of shortened-TTI UEs and the number of shortened-TTI UEs supporting carrier aggregation in the current cell, and notifies all shortened-TTI UEs in the cell of information on the number of RBs ($N_{RB}^{(shortend-TTI)}$) available to the shortened-TTI PUCCH format through higher layer signaling (3202). The BS allocates $n_{PUCCH}^{(shortend-TTI)}$ RBs for the shortened-TTI PUCCH format to each shortened-TTI UE without exceeding the $N_{RB}^{(shortend-TTI)}$ RBs (3204). To notify each shortened-TTI UE of the allocated shortened-TTI PUCCH format resource, the BS includes the shortened-TTI downlink control resource and a shortened-TTI PUCCH resource indicator in the DCI format (3208). Here, the shortened-TTI PUCCH resource indicator may be included using the TPC field of the existing DCI format or using newly added bits. This indicator explicitly notifies the UE of the shortened-TTI PUCCH format resource.

Figure 33:
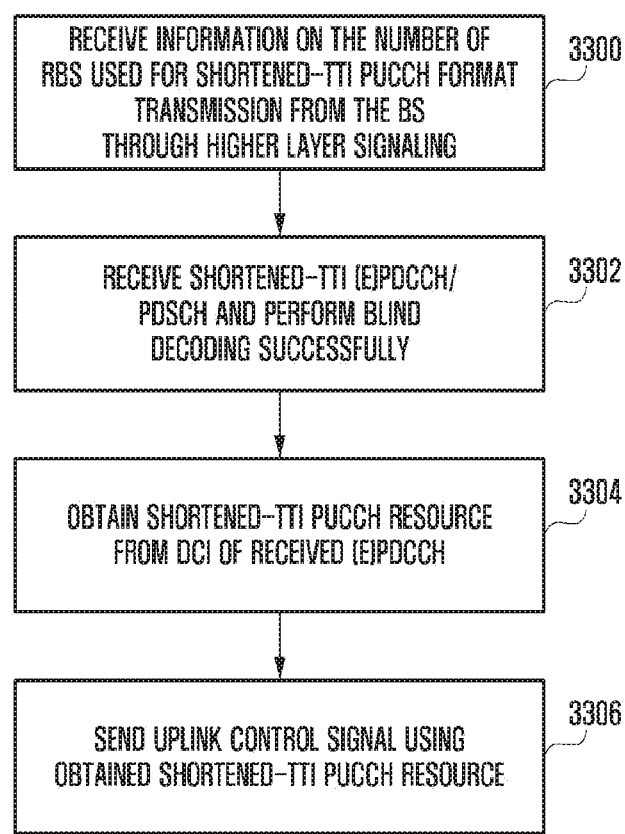
FIG. 33 depicts a UE procedure according to the ninth embodiment of the present invention.

FIG. 33 depicts a procedure for the UE to receive a shortened-TTI control signal sent in each slot and obtain a shortened-TTI PUCCH resource according to the ninth embodiment of the present invention.

Referring to FIG. 33, a shortened-TTI UE receives information on the number of RBs through which a shortened-TTI PUCCH format is to be sent from the BS in each slot through higher layer signaling (3300). Thereafter, the shortened-TTI UE receives the (E)PDCCH, and, if blind decoding of the (E)PDCCH is successful (3302), obtains a shortened-TTI PUCCH resource indicated by the DCI (3304). The UE composes an uplink control signal in a shortened-TTI PUCCH format and maps the uplink control signal to the shortened-TTI PUCCH resource for transmission to the BS (3306).

Tenth Embodiment

The tenth embodiment relates to a method where the BS allocates resource elements to which a shortened-TTI PUCCH and a normal-TTI PUCCH are mapped and higher-layer signals the allocated resources to the UE, and the UE performs PUCCH transmission by use of the resources allocated by the BS. The tenth embodiment is described with reference to FIG. 34.

Note that, in the tenth embodiment, the BS may not separately notify the UE of the number of RBs available to shortened-TTI PUCCH format transmission.

Figure 34:
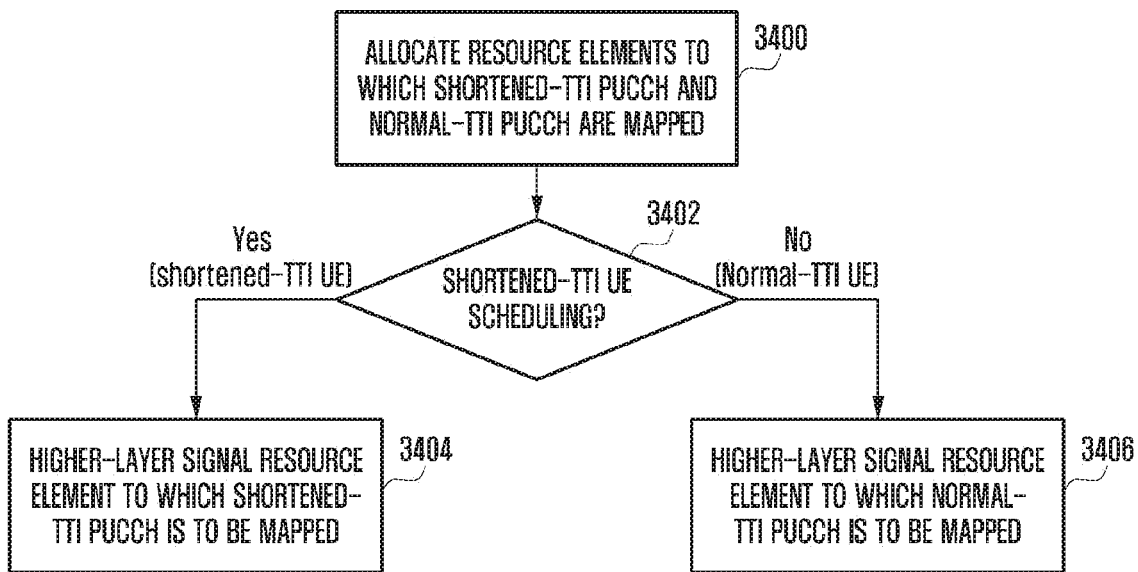
FIG. 34 depicts a BS procedure according to the tenth embodiment of the present invention.

FIG. 34 depicts a procedure for the BS to allocate a shortened-TTI PUCCH resource to the UE according to the tenth embodiment of the present invention.

Referring to FIG. 34, the BS allocates resource elements to which a shortened-TTI PUCCH and a normal-TTI PUCCH are mapped (3400). Thereafter, for shortened-TTI transmission, the BS higher-layer signals the resource element to which a shortened-TTI PUCCH is to be mapped (3404). For normal-TTI transmission, the BS higher-layer signals the resource element to which a normal-TTI PUCCH is to be mapped (3406).

Figure 35:
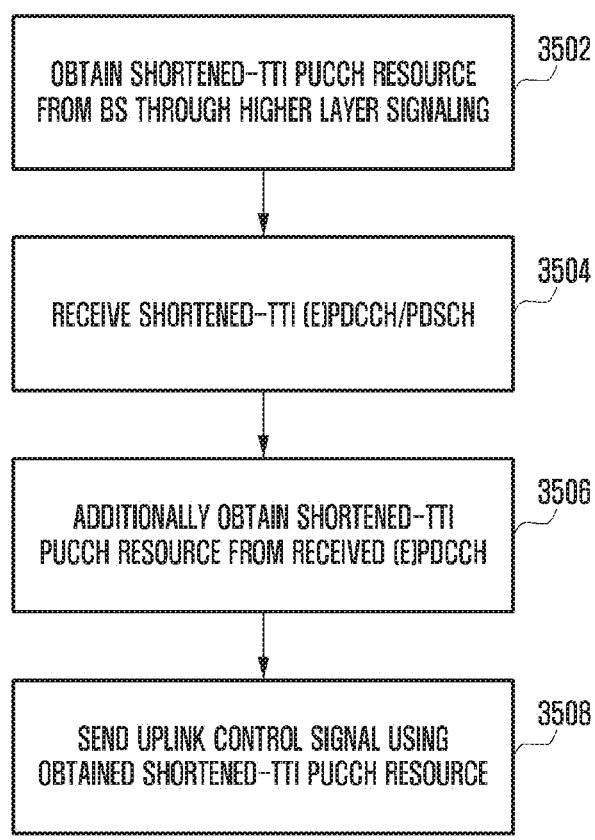
FIG. 35 depicts a UE procedure according to the tenth embodiment of the present invention.

FIG. 35 depicts a procedure for the UE to receive a shortened-TTI control signal sent in each slot and send an uplink control signal by use of a shortened-TTI PUCCH resource higher-layer signaled in advance according to the tenth embodiment of the present invention.

Referring to FIG. 35, the UE obtains a shortened-TTI PUCCH resource from the BS via higher layer signaling (3502). The shortened-TTI PUCCH resource may be identified by $n_{PUCCH}^{(1,p)}$, $n_{PUCCH}^{(2,p)}$, and $n_{PUCCH}^{(3,p)}$ according to PUCCH format 1, 2 and 3, and is determined through higher layer signaling. The shortened-TTI PUCCH sent during one slot may be identified by a resource index $n_{PUCCH}^{(shortended-TTI,p)}$ and be higher-layer signaled. After being higher-layer signaled, the UE receives a shortened-TTI PDCCH, EPDCCH, or PDSCH (3504), and may receive information on the shortened-TTI PUCCH resource from the downlink control signal (3506). For example, the UE may utilize the CCE number used for PDCCH transmission to determine the PUCCH resource index as a function of the CCE number. Thereafter, the UE performs PUCCH transmission using the PUCCH resource index (3508).

Eleventh Embodiment

The eleventh embodiment relates to a method where the BS processes data packets from the higher layer separately for shortened-TTI transmission and normal-TTI transmission according to QoS (Quality of Service) Class Identifier (QCI). The eleventh embodiment is described with reference to FIG. 36.

Figure 36:
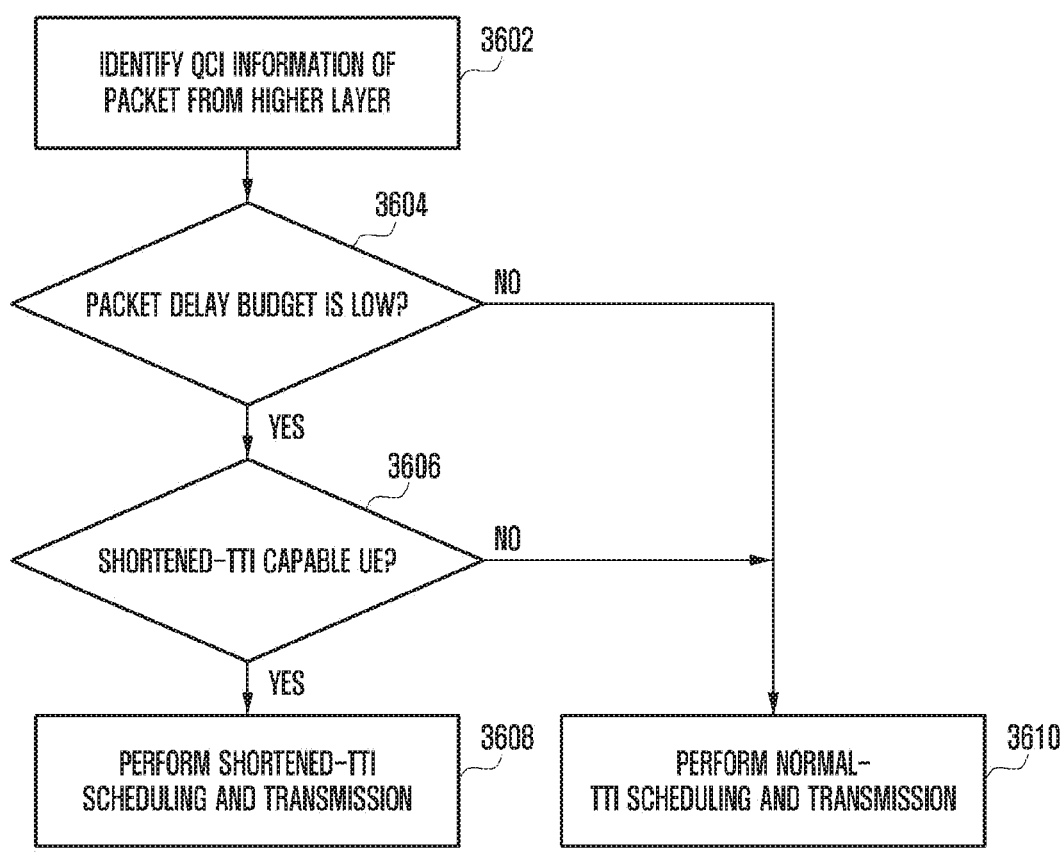
FIG. 36 depicts a BS procedure according to the eleventh embodiment of the present invention.

Referring to FIG. 36, the BS receives a data packet and associated QCI information from the higher layer (3602). If the packet delay budget of the QCI information is less than a preset threshold (3604) and the data packet is for a shortened-TTI UE (3606), the BS transmits the data packet through shortened-TTI scheduling (3608). If the packet delay budget of the QCI information is greater than the preset threshold (3604), the BS transmits the data packet through normal-TTI scheduling (3610). Here, the sequence of decisions at steps 3604 and 3606 may be reversed.

The value of the threshold referenced at step 3604 may be set by the BS in advance.

Figure 37:
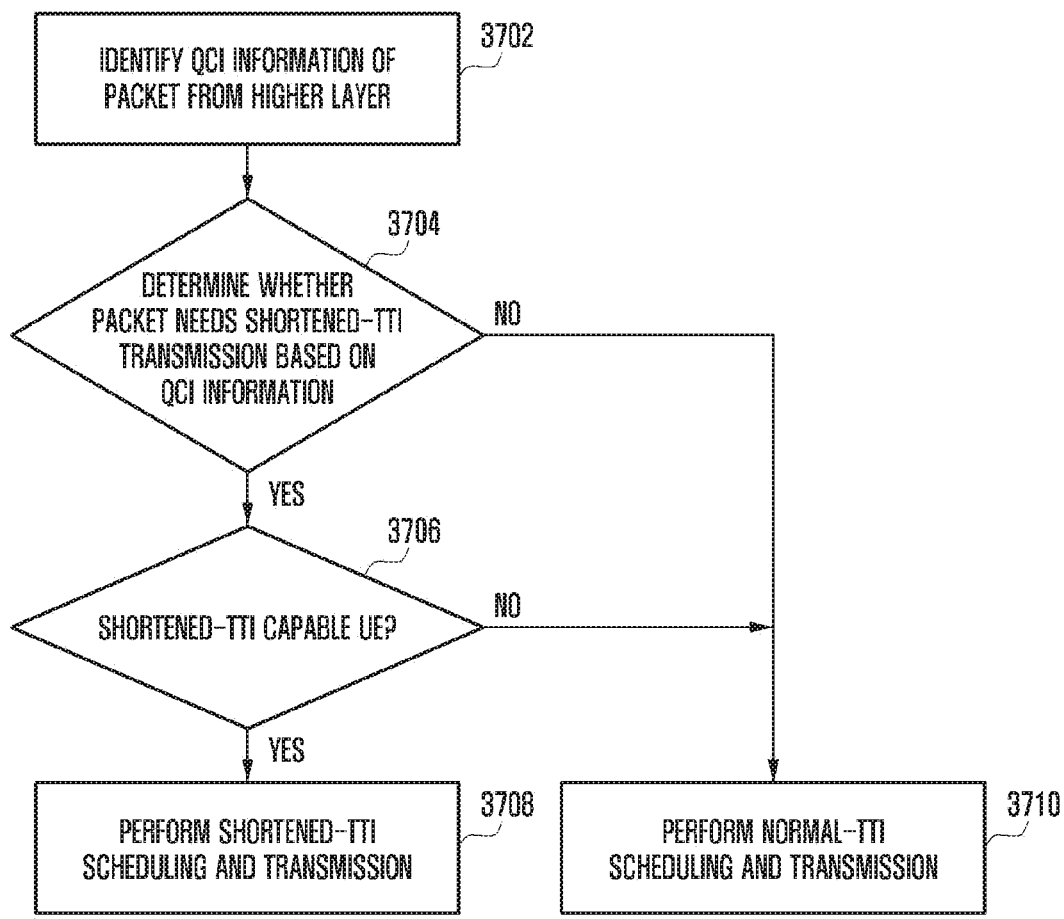
FIG. 37 depicts another BS procedure according to the eleventh embodiment of the present invention.

FIG. 37 depicts a procedure of the BS to process data packets from the higher layer separately for shortened-TTI transmission and normal-TTI transmission.

As steps of FIG. 37 are similar to those of FIG. 37, a repeated description is omitted. However, the difference is that the criterion for determining whether a data packet is for shortened-TTI transmission or for normal-TTI transmission (3704) is distinct (i.e. different attribute of the QCI).

The attribute of the QCI usable as a criterion may include resource type, priority level, packet error loss rate, or service type (agreed in advance).

Twelfth Embodiment

The twelfth embodiment relates to a method where the BS notifies a UE whether the UE should operate in shortened-TTI transmission mode (first type UE mode) or in normal-TTI transmission mode (second type UE mode) through higher layer signaling before actual data transmission. The twelfth embodiment is described with reference to FIGS. 40 and 41.

Figure 40:
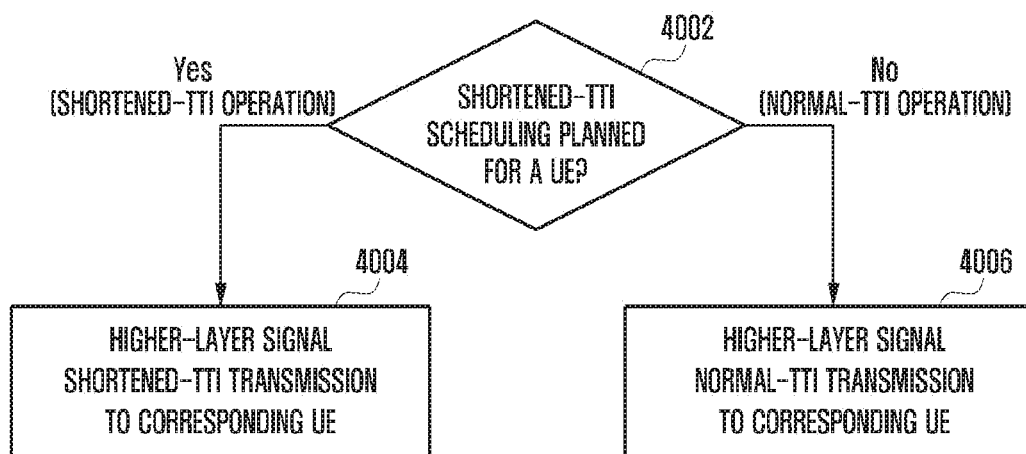
FIG. 40 depicts a BS procedure according to the twelfth embodiment of the present invention.

FIG. 40 is a flowchart depicting a procedure for the BS to notify a shortened-TTI UE of transmission mode through higher layer signaling.

The BS determines the UE to be scheduled next for shortened-TTI data (4002). For shortened-TTI operation, the BS notifies the determined UE of shortened-TTI transmission through higher layer signaling (4004). This higher layer signaling may carry information on the location of RBs that can be sent in shortened-TTI mode and information on the location of RBs to which a control signal for shortened-TTI mode is to be mapped.

For normal-TTI operation, the BS notifies the determined UE of normal-TTI transmission through higher layer signaling (4006).

In this embodiment, when shortened-TTI mode is notified by the BS to a UE that is operating in normal-TTI mode to send and receive a data signal, to allow the UE to operate again in normal-TTI mode, the BS may have to notify the UE of normal-TTI mode through higher layer signaling.

The transmission mode may be changed in various ways. For example, the BS and the UE can make an agreement in advance that when shortened-TTI mode is higher-layer signaled at a first point in time, the transmission mode returns to normal-TTI mode after a given time from the first point in time. Here, higher layer signaling may carry information on the duration for shortened-TTI mode operation or information on the time for returning to normal-TTI mode.

In the above case, the BS may operate in normal-TTI mode for the UE after the agreed time without separate higher layer signaling.

Figure 41:
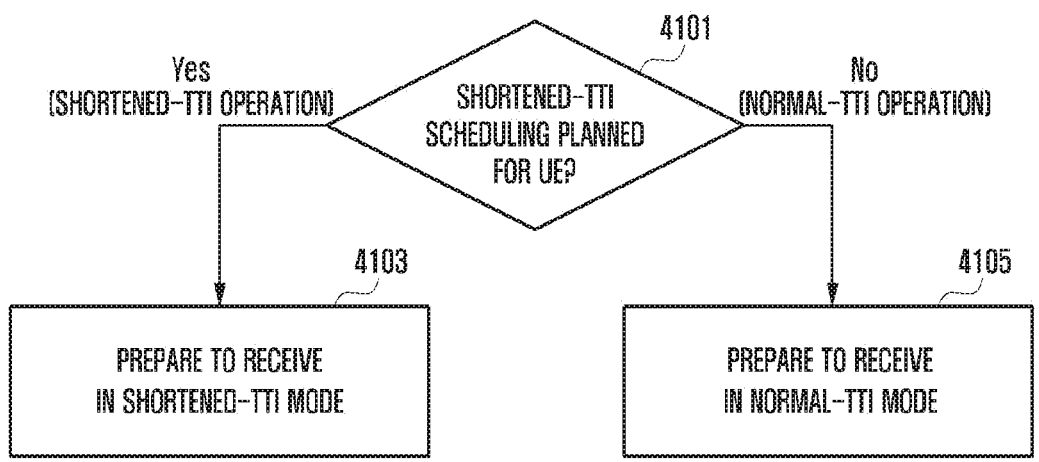
FIG. 41 depicts a UE procedure according to the twelfth embodiment of the present invention.

FIG. 41 is a flowchart depicting a procedure for a shortened-TTI UE to receive a notification of shortened-TTI mode or normal-TTI mode from the BS through higher layer signaling.

When transmission mode is higher-layer signaled by the BS, the UE determines whether shortened-TTI mode or normal-TTI mode is signaled (4101). If shortened-TTI mode is higher-layer signaled, the UE prepares to receive control and data signals in shortened-TTI mode (4103).

If normal-TTI mode is higher-layer signaled, the UE prepares to receive control and data signals in normal-TTI mode (4105).

In this embodiment, when shortened-TTI mode is notified by the BS to the UE that is operating in normal-TTI mode to send and receive a control or data signal, to allow the UE to operate again in normal-TTI mode, normal-TTI mode is to be notified by the BS to the UE through higher layer signaling.

The transmission mode may be changed in various ways. For example, the BS and the UE can make an agreement in advance that when shortened-TTI mode is higher-layer signaled at a first point in time, the transmission mode returns to normal-TTI mode after a given time from the first point in time. Here, higher layer signaling may carry information on the duration for shortened-TTI mode operation or information on the time for returning to normal-TTI mode.

As such, the UE may operate in normal-TTI mode after the agreed time without separate higher layer signaling from the BS.

Thirteenth Embodiment

Figure 42:
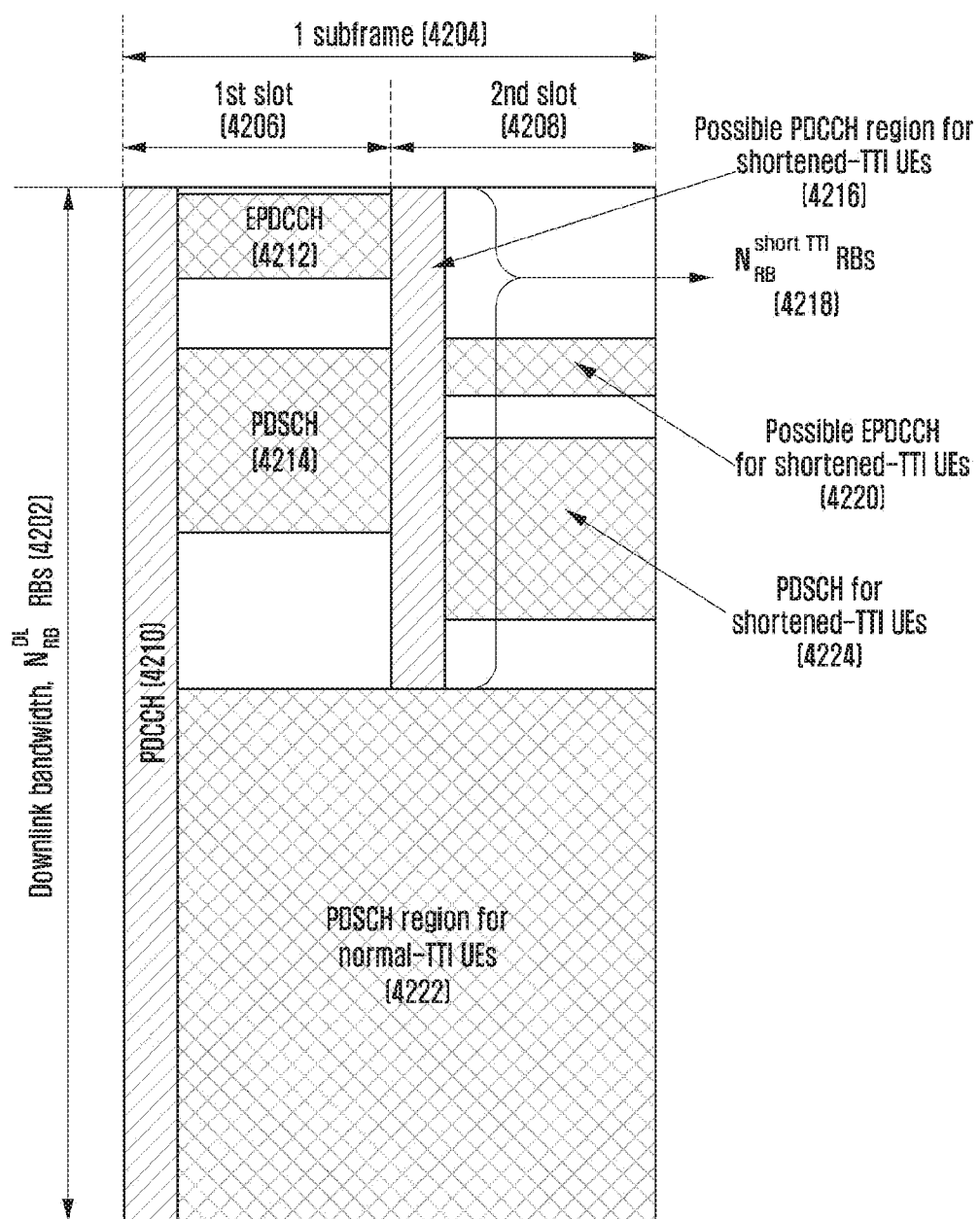
FIG. 42 illustrates the structure of downlink control and data signals according to the thirteenth embodiment of the present invention.

In the thirteenth embodiment, a description is given of the structure of downlink control and data signals used by the BS when the BS notifies the UE of transmission and reception in shortened-TTI mode through higher layer signaling with reference to FIG. 42.

FIG. 42 illustrates resources in the overall downlink frequency bandwidth 4202 during one subframe 4204.

A single subframe 4204 may be divided into two slots 4206 and 4208. A UE having received a notification of shortened-TTI mode through higher layer signaling may receive control and data signals in each slot.

In FIG. 42, the downlink control signal channel (PDCCH) 4210 is mapped to up to the first three OFDM symbols of the first slot (4206). This region carries PCFICH and PHICH information and may be used to map control signals for normal-TTI UEs. Control signals for shortened-TTI UEs may be mapped to the PDCCH 4210 or to the EPDCCH region 4212 inside the slot.

The EPDCCH 4212 may indicate a downlink control signal mapped to an RB within a slot and may carry scheduling assignment information for a UE. The RB where the EPDCCH 4212 can be present may be higher-layer signaled to a shortened-TTI UE.

The UE identifies the location of the RB to which downlink data is mapped by use of a control signal mapped to the PDCCH 4210 or EPDCCH 4212 and receives the PDSCH 4214 as data in the first slot of the identified RB location. The BS may notify in advance a shortened-TTI UE of the OFDM symbol numbers corresponding respectively to the starts of the EPDCCH 4212 and the PDSCH 4214 through higher layer signaling.

Control signals may be mapped to the PDCCH 4210 only without use of the EPDCCH 4212.

In FIG. 42, downlink control signals in the second slot may be mapped to up to the first three OFDM symbols of the second slot 4208, and the location or length of RBs 4218 in the second slot available to shortened-TTI UEs may be higher-layer signaled in advance.

In addition, a control signal may be carried by the EPDCCH region 4220 that may be transmitted in the second slot of a specific RB, and the RB to which the EPDCCH region 4220 is mapped may be higher-layer signaled to a shortened-TTI UE in advance. Information on the second slot data (PDSCH 4224) is mapped to the PDCCH 4216 or EPDCCH 4220 in the second slot.

Control signals may be mapped to the PDCCH 4216 only without use of the EPDCCH 4220.

The PDCCH 4216 to which downlink control signals can be mapped in the second slot may be utilized in the same manner as in the case of the fifth embodiment.

The EPDCCH regions 4212 and 4220 to which downlink control signals can be mapped respectively in the first slot and in the second slot may be utilized in the same manner as in the case of the sixth or seventh embodiment.

In the existing LTE or LTE-A system, EREG 0 to EREG 15 are formed to map the EPDCCH to resource elements by numbering resource elements of a resource block in a frequency-first manner from 0 to 15. In this EREG numbering, resource elements used to map DM-RS are excluded.

Figure 43:
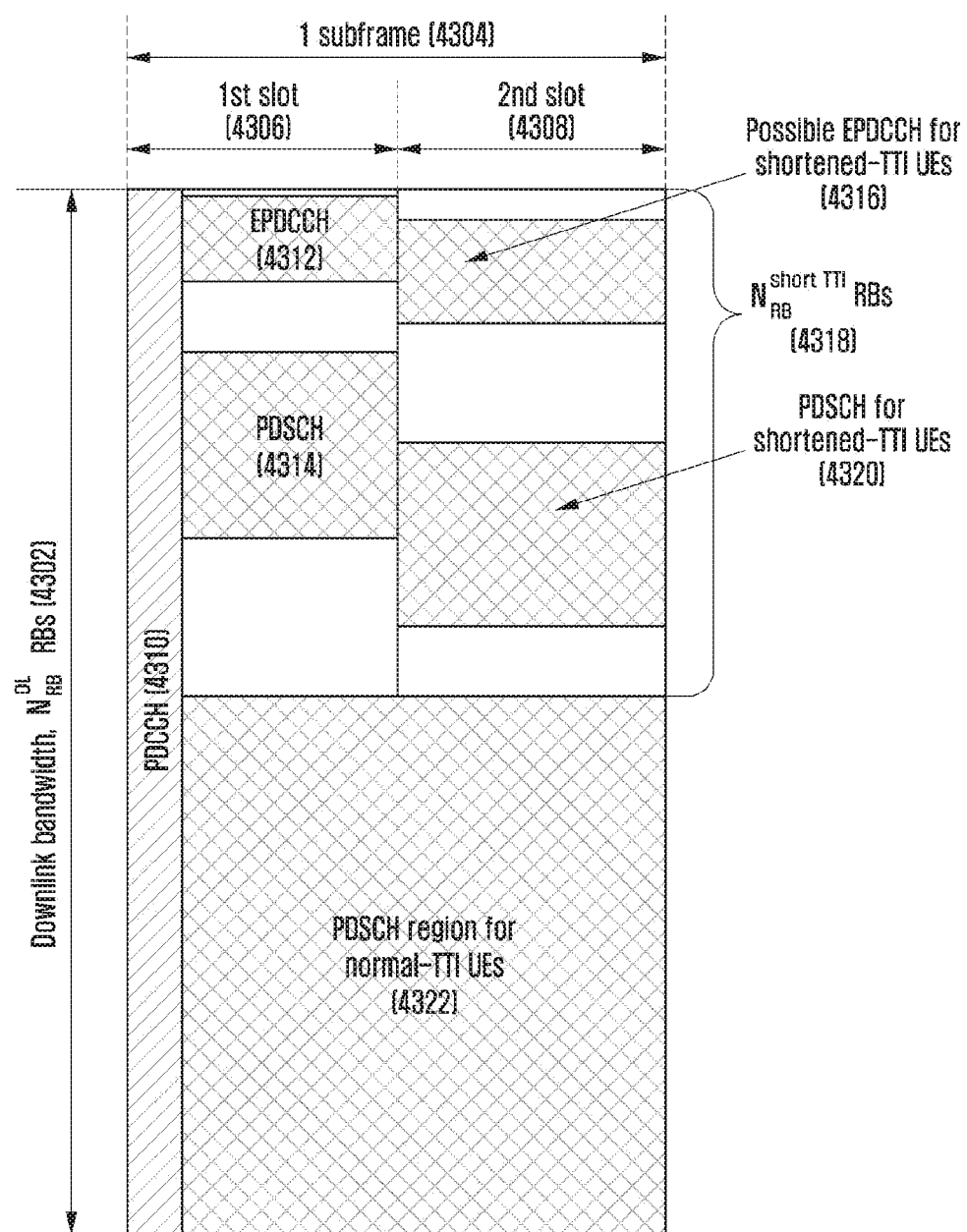
FIG. 43 illustrates the structure of downlink control and data signals according to the thirteenth embodiment of the present invention.

Meanwhile, in embodiments of the present invention depicted in FIG. 42 or 43, the EPDCCH used for shortened-TTI transmission is mapped only within the slot. This mapping may be performed only within the slot by forming EREGs similarly to the case of the existing EDPCCH or by forming EREG 0 to EREG 7 (other than EREG 0 to EREG 15) in one resource block. Alternatively, the EPDCCH may be mapped to a resource block within one slot similarly to the case of the existing PDCCH or similarly to the case of the existing PDSCH.

EPDCCH resource mapping for shortened-TTI transmission described above may be modified in various ways. Hence, the EDPCCH in one subframe for normal-TTI transmission and the EDPCCH in one slot for shortened-TTI transmission may be present in the same resource block or in different resource blocks.

Meanwhile, the BS may notify in the second slot a shortened-TTI UE of the OFDM symbol numbers corresponding respectively to the starts of the EPDCCH 4216 and the PDSCH 4224 through higher layer signaling in advance.

In the second slot, control signals may be mapped only to the EPDCCH region 4220 without use of the PDCCH 4216 to which downlink control signals can be mapped.

FIG. 43 shows the EPDCCH region 4316 to which downlink control signals are mapped in the second slot of a resource block and the PDSCH region 4320 to which data is mapped in the second slot without use of the PDCCH 4216 shown in FIG. 42.

In FIG. 42 or 43, the PDSCH region 4222 or 4322 for normal-TTI mode is mapped to a resource block in one subframe. The location or length of a resource block to which the PDSCH 4222 or 4322 for normal-TTI UEs is mapped may be higher-layer signaled to shortened-TTI UEs.

Fourteenth Embodiment

The fourteenth embodiment relates to a method where the UE sends the BS a HARQ ACK/NACK signal for the PDCCH and EPDCCH associated with PDSCH or SPS transmission when the BS operates the LTE or LTE-A system. The fourteenth embodiment is described with reference to FIGS. 44, 45A, 45B, 45C, 45D, 45E, 46A, 46B, 46C, 46D, 46E, and 47. In the following drawings, "SF" denotes the slot number in one frame (10 ms).

First, a description is given of the LTE system supporting time-division duplex (TDD).

In the existing LTE or LTE-A TDD system, the UE sends the BS an ACK/NACK signal at subframe n through an uplink channel for the PDCCH and EPDCCH associated with PDSCH or SPS transmission sent at subframe n-k of the downlink. Here, k is an element of a set K prepared according to the TDD configuration and subframe number.

In the fourteenth embodiment, the UE operating in shortened-TTI mode sends the BS an ACK/NACK signal at slot n through an uplink channel for the PDCCH and EPDCCH associated with PDSCH or SPS transmission sent in shortened-TTI mode at slot n-k of the downlink.

That is, while the point in time to send an uplink ACK/NACK signal is determined on a subframe basis in the related art, the point in time to send an uplink ACK/NACK signal is determined on a slot basis in the fourteenth embodiment of the present invention. Hence, it is necessary to redefine n and k of n-k (serving as a reference for sending an uplink ACK/NACK signal for PDCCH and EPDCCH) in terms of slot number within the LTE frame.

In this case, k is an element of a set K prepared according to the TDD configuration and slot number. An example for the set K is illustrated in FIG. 44.

For example, for TDD configuration 0 and slot 4, the slot number n is 4. In this case, an ACK/NACK signal is sent for the PDCCH and EPDCCH associated with PDSCH or SPS transmission received by the UE at slot n-k. Referring to the table of FIG. 44, k=4. That is, for the PDCCH and EPDCCH associated with PDSCH or SPS transmission received by the UE at slot 0, an ACK/NACK signal is sent to the BS at slot 4.

As another example, for TDD configuration 5 and slot 5, the slot number n is 5. In this case, referring to the table, the set K is given by (4, 5, 6, 7, 8, 9, 10, 11). Hence, ACK/NACK signals are sent to the BS at slot 5 for the PDCCH and EPDCCH associated with PDSCH or SPS transmission received by the UE at slot n-k (slot 1 and slot 0 of current frame, and slot 19, slot 18, slot 17, slot 16, slot 15 and slot 14 of previous frame).

The table of FIG. 44 is merely an example and may be modified in various ways. In the TDD system, while the BS schedules a second type UE to use a specific subframe for the uplink, the BS may also schedule a first type UE to use the subframe for the downlink. In this case, the timing when the first type UE sends HARQ ACK/NACK feedback may be different from that of the present embodiment.

For example, the HARQ ACK/NACK function performed using the table of FIG. 44 may also be performed using the tables of FIGS. 45A, 45B, 45C, 45D, 45E, 46A, 46B, 46C, 46D, and 46E.

Meanwhile, the configuration shown in different tables of FIGS. 33, 35, 46A, 46B, 46C, 46D, and 46E may be not limited to only one table itself. For example, the HARQ ACK/NACK transmission scheme may be performed by using a table created by combining different tables shown in FIGS. 33, 35, 46A, 46B, 46C, 46D, and 46E.

Figure 47:
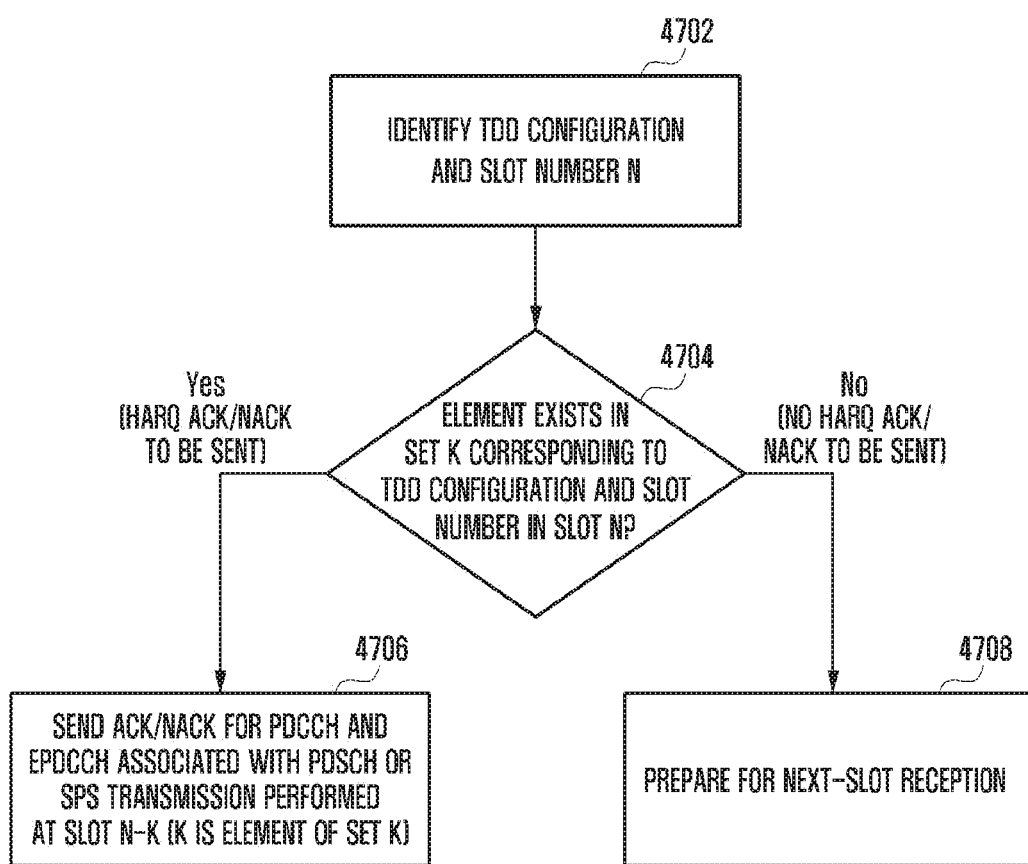
FIG. 47 depicts a UE procedure according to the fourteenth embodiment of the present invention.

FIG. 47 depicts a procedure for the UE operating in shortened-TTI mode to send HARQ ACK/NACK feedback to the BS in the LTE or LTE-A TDD system.

First, the UE identifies the TDD configuration and slot number n in operation (4702). The UE may obtain information on the TDD configuration from the system information, and obtain information on the slot number n from the master information block and synchronization signals.

The UE determines whether an element exists in the set K corresponding to the TDD configuration and slot number at slot n (4704). If there is no element in the set K, as there is no HARQ ACK/NACK feedback to be sent at slot n, the UE may prepare to receive a downlink signal for the next slot (4708).

If there is an element in the set K, as there may be HARQ ACK/NACK feedback to be sent at slot n, the UE sends, for each element k of the set K, the BS an ACK/NACK signal at slot n for the PDCCH and EPDCCH associated with PDSCH or SPS transmission received at slot n−k (4706).

The set K may be found from the tables of FIGS. 44, 45A, 45B, 45C, 45D, 45E, 46A, 46B, 46C, 46D, and 46E or from a new table created by combining the existing tables.

In the above description, a scheme is proposed for sending ACK/NACK feedback for the PDCCH and EPDCCH associated with PDSCH or SPS transmission received by the UE in the LTE TDD system.

On the other hand, for the LTE system operating in frequency division duplex (FDD) mode, the value of k of TDD mode may be fixed to 3, 4, 5, 6, 7, or 8 for every slot. For example, when k=4 in the LTE FDD system, the UE sends an HARQ ACK/NACK signal at slot n for the PDCCH and EPDCCH associated with PDSCH or SPS transmission received at slot n−4.

Fifteenth Embodiment

The fifteenth embodiment relates to a method where the BS operating the LTE or LTE-A system sends the UE a HARQ ACK/NACK signal for the uplink data channel PUSCH. The fifteenth embodiment is described with reference to FIGS. 48, 49A, 49B, 49C, 49D, 49E, 50A, 50B, 50C, 50D, 50E, and 51. In the following drawings, "SF" denotes the slot number in one frame (10 ms).

In the existing LTE or LTE-A TDD system, the BS sends the UE an ACK/NACK signal at subframe n+k through the PHICH for the PUSCH sent at subframe n of the uplink. Here, k is an element of a set K prepared according to the TDD configuration and subframe number.

In the fifteenth embodiment, the BS sends the UE operating in shortened-TTI mode an ACK/NACK signal at slot n+k through a downlink channel for the PUSCH sent at slot n of the uplink in shortened-TTI mode.

That is, while the point in time to send a downlink ACK/NACK signal is determined on a subframe basis in the related art, the point in time to send a downlink ACK/NACK signal is determined on a slot basis in the fifteenth embodiment of the present invention. Hence, it is necessary to redefine n and k of n+k (serving as a reference for sending a downlink ACK/NACK signal) in terms of slot number within the LTE frame.

In this case, k is an element of a set K determined in advance according to the TDD configuration and slot number. An example for the set K is illustrated in FIG. 48.

For example, for TDD configuration 0 and slot 4, the slot number n is 4. In this case, the BS sends the UE a HARQ ACK/NACK signal at slot n+k for the PUSCH sent by the UE at slot n. Referring to the table of FIG. 48, k=6. That is, for the PUSCH sent by the UE at slot 4, the BS sends the UE a HARQ ACK/NACK signal at slot 10 through a downlink channel.

As another example, for TDD configuration 5 and slot 5, the slot number n is 5. In this case, referring to the table, the set K is given by {4}. That is, for the PUSCH sent by the UE at slot 5 (slot n), the BS sends the UE an ACK/NACK signal at slot 9 (slot n+k).

As further example, the BS may use the set K in the tables of FIGS. 49A, 49B, 49C, 49D, 49E, 50A, 50B, 50C, 50D, and 50E to send the UE a HARQ ACK/NACK signal for the PUSCH.

Meanwhile, the configuration shown in different tables of FIGS. 48,49A, 49B, 49C, 49D, 49E, 50A, 50B, 50C, 50D, and 50E may be not limited to only one table itself. For example, HARQ ACK/NACK transmission may be performed by using a table created by combining different configurations shown in the tables of FIGS. 48, 49A, 49B, 49C, 49D, 49E, 50A, 50B, 50C, 50D, and 50E.

Figure 51:
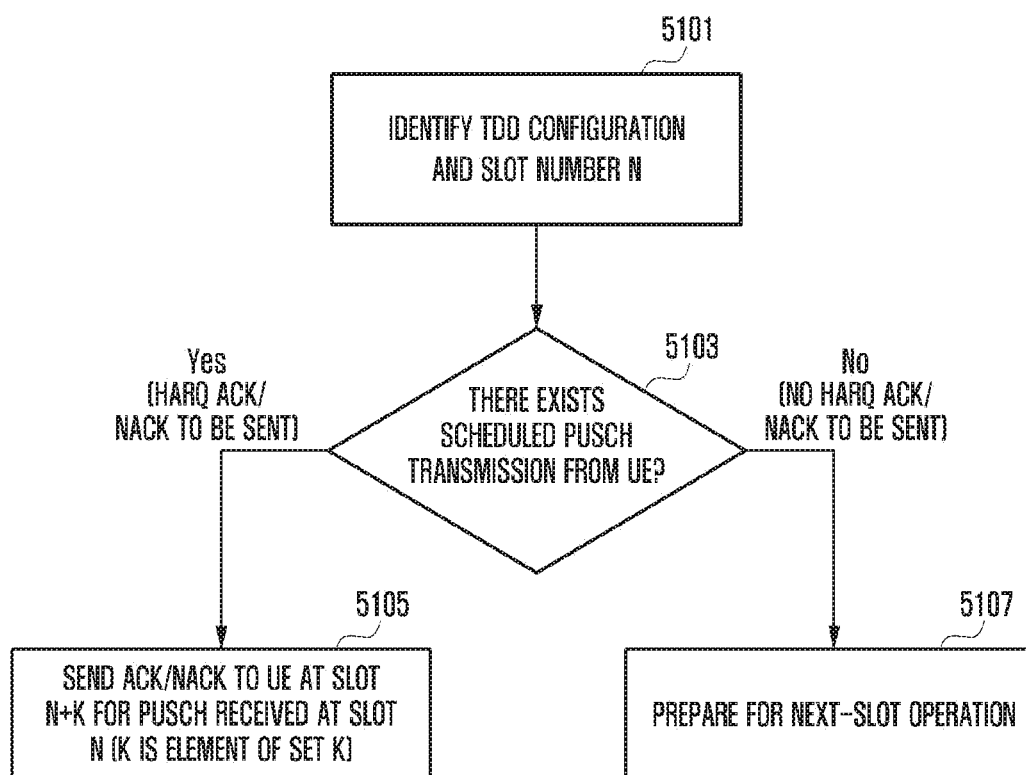
FIG. 51 depicts a BS procedure according to the fifteenth embodiment of the present invention.

FIG. 51 is a flowchart depicting a procedure for the BS to send HARQ ACK/NACK feedback through a downlink channel to the UE operating in shortened-TTI mode in the LTE or LTE-A TDD system.

The BS identifies the TDD configuration and slot number n in operation (5101).

The BS determines whether a PUSCH transmission is scheduled at slot n from the UE (5103). If PUSCH data transmission is scheduled at slot n, the BS sends the UE a corresponding HARQ ACK/NACK signal at slot n+k through a downlink channel (4905). The set K may be found from the tables of FIGS. 48, 49A, 49B, 49C, 49D, 49E, 50A, 50B, 50C, 50D, and 50E or from a new table created by combining configurations given in the above tables.

If PUSCH data transmission is not scheduled at slot n, as there is no HARQ ACK/NACK signal to be sent to the UE at slot n, the BS prepares for next-slot operation (5107).

In the above description, a scheme is proposed for sending ACK/NACK feedback in a TDD system. In the existing LTE TDD system, the BS and the UE can make an agreement in advance that shortened-TTI transmission does not occur at the special subframe.

In the above description, a scheme is proposed that enables the BS to send the UE a HARQ ACK/NACK signal for the PUSCH in the LTE TDD system. For the LTE system operating in frequency division duplex (FDD) mode, the value of k of TDD mode may be fixed to 3, 4, 5, 6, 7, or 8 for every slot. For example, when k=4 in the LTE FDD system, the BS sends the UE an HARQ ACK/NACK signal at slot n+4 through the PHICH or another downlink control channel for the PUSCH received by the BS at slot n.

Sixteenth Embodiment

The sixteenth embodiment relates to a method for calculating the transport block size (TBS) indicating the number of information bits contained in one codeword when the BS and the UE send data. The sixteenth embodiment is described with reference to FIGS. 52, 53A, and 53B.

FIG. 52 shows a table used for determining the TBS index based on the MCS index in the existing LTE system.

For example, in the table of FIG. 52, when the MCS index is 10, the corresponding TBS index is 9.

FIGS. 53A and 53B show tables used for determining the TBS according to the number of PRBs allocated to the UE and the TBS index in the existing LTE system.

For example, when the number of PRBs allocated to a UE is 25 and the MCS index is 9, the TBS is 4008.

As the tables of FIGS. 53A and 53B illustrate TBS computation when transmission is carried out on a subframe basis, it is necessary to newly define a scheme for TBS computation when transmission is carried out in shortened-TTI mode. When a short TTI shorter than one subframe such as a slot, 2 OFDM symbols or 1 OFDM symbol is employed, the value corresponding to the number of PRBs is newly computed using Equation 9 below and used to determine the TBS.

$$N_{PRB}' = \max\{\lfloor N_{PRB} \times \alpha \rfloor, 1\} \qquad \text{[Equation 9]}$$

In Equation 9, $N_{PRB}'$ indicates the number of PRBs actually allocated to the UE, and $N_{PRB}$ is the result of this computation and is used to find the TBS, for example, in the table of FIGS. 53A and 53B.

In Equation 9, max{a,b} returns the largest value among a and b. $\lfloor a \rfloor$ returns the greatest integer less than or equal to a. In the above equation, $\lfloor a \rfloor$ may be replaced by $\lceil a \rceil$, where $\lceil a \rceil$ returns the least integer greater than or equal to a. In Equation 9, a can be selected as a real number greater than 0 and less than 1. For example, in the case of shortened-TTI mode with a 0.5 ms TTI, α can be set to 0.3, 0.4 or 4/14 for the first slot in TBS determination and can be set to 0.7, 0.6 or 7/14 for the second slot. The TBS determined in this way may be used by the UE and the BS as the number of information bits contained in one codeword. When a first type UE uses a TTI less than 0.5 ms, it may set a to a different value for TBS determination. In addition, when transmission is carried out to first type UEs using different-length TTIs, or when transmission is carried out to a first type UEs using different-length TTIs, α may be set to a different value according to the TTI length.

Equation 9 used for TBS determination in the sixteenth embodiment does not need to be limited to shortened-TTI mode using a 0.5 ms slot as the TTI unit. Equation 9 may also be applied to shortened-TTI mode using various lengths like one OFDM symbol and two OFDM symbols as the TTI unit.

In the above embodiments of the present invention, a shortened-TTI UE indicates a UE supporting shortened-TTI transmission. A shortened-TTI UE may also support normal-TTI transmission, and in this case it transmits downlink and uplink control information in the same way as a normal-TTI UE.

Figure 38:
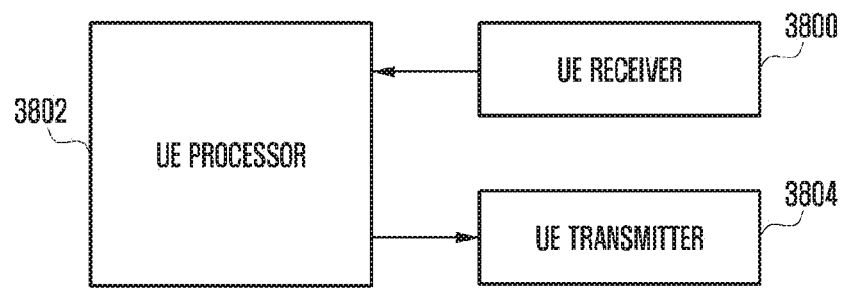
FIG. 38 shows a user equipment including a receiver, processor and transmitter employed in various embodiments of the present invention.
Figure 39:
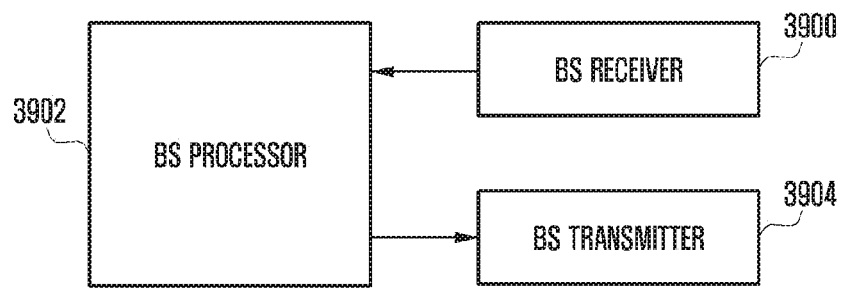
FIG. 39 shows a base station including a receiver, processor and transmitter employed in various embodiments of the present invention.

To carry out the above embodiments of the present invention, FIGS. 38 and 39 show a user equipment and a base station each including a transmitter, a receiver, and a processor. Operations of the BS and the UE for transmitting shortened-TTI downlink control signals are described in the first to seventh embodiments. To carry out these operations, the transmitters, receivers and processors of the BS and the UE should function according to each of the above embodiments. Operations of the BS and the UE for transmitting shortened-TTI uplink control signals are described in the eighth and ninth embodiments. To carry out these operations, the transmitters, receivers and processors of the BS and the UE should function according to each of the above embodiments.

Specifically, FIG. 38 is a block diagram showing the internal structure of a user equipment according to an embodiment of the present invention. As shown in FIG. 38, the UE may include a terminal receiver 3800, a terminal transmitter 3804, and a terminal processor 3802.

In one embodiment, the terminal receiver 3800 and the terminal transmitter 3804 may be collectively referred to as a transceiver. The transceiver may send and receive a signal to and from a base station. The signal may include control information, and data.

To this end, the transceiver may include a radio frequency (RF) transmitter for upconverting the frequency of a signal to be transmitted and amplifying the signal, and an RF receiver for low-noise amplifying a received signal and downconverting the frequency of the received signal. The transceiver may receive a signal through a radio channel and output the received signal to the terminal processor 3802, and may send a signal from the terminal processor 3802 through a radio channel.

The terminal processor 3802 may control a series of operations so that the UE can function according to the above embodiments of the present invention.

FIG. 39 is a block diagram showing the internal structure of a base station according to an embodiment of the present invention. As shown in FIG. 39, the BS may include a BS receiver 3900, a BS transmitter 3904, and a BS processor 3902.

In one embodiment, the BS receiver 3900 and the BS transmitter 3904 may be collectively referred to as a transceiver. The transceiver may send and receive a signal to and from a user equipment. The signal may include control information, and data.

To this end, the transceiver may include an RF transmitter for upconverting the frequency of a signal to be transmitted and amplifying the signal, and an RF receiver for low-noise amplifying a received signal and downconverting the frequency of the received signal. The transceiver may receive a signal through a radio channel and output the received signal to the BS processor 3902, and may send a signal from the BS processor 3902 through a radio channel. The BS processor 3902 may control a series of operations so that the BS can function according to the above embodiments of the present invention.

For example, the BS processor 3902 may determine whether a UE to be scheduled is a first type UE or a second type UE, and, if the UE to be scheduled is a first type UE, control an operation to generate control information on the basis of control information for the first type UE. In this case, the TTI length for the first type UE may be shorter than that for the second type UE.

In one embodiment of the present invention, the BS processor 3902 may control an operation to generate downlink control information (DCI) for the first type UE. In this case, the DCI may indicate control information for the first type UE.

In one embodiment of the present invention, the BS processor 3902 may control an operation to generate the DCI for the first type UE on the basis of a UE identifier for the first type UE. In one embodiment of the present invention, the BS processor 3902 may control an operation to map the DCI for the first type UE to a search space for the first type UE.

In one embodiment of the present invention, the BS processor 3902 may control an operation to generate downlink control information (DCI) including resource allocation information of a data channel for the first type UE.

In one embodiment of the present invention, the BS processor 3902 may control an operation to send the UE, in the second slot of a subframe, information on the number of resource blocks to which a control signal for the first type UE can be mapped or on a set of numbers each denoting the number of resource blocks, and to send, in the second slot of the subframe, the DCI for the first type UE on the basis of the above information.

In one embodiment of the present invention, the BS processor 3902 may control an operation to generate enhanced control information for the first type UE. The enhanced control information may be mapped, in the first slot of a subframe, to the remaining symbols of the first slot except for pre-designated symbols, and be mapped, in the second slot of the subframe, to the remaining symbols of the second slot except for pre-designated symbols.

In one embodiment of the present invention, the BS processor 3902 may control an operation to map the enhanced control information for the first type UE to a resource block to which enhanced control information for the first type UE can be mapped.

In one embodiment of the present invention, the BS processor 3902 may control a process of determining the number of resource blocks available to the uplink control information (UCI) format for a first type UE and sending information on the determination result, allocating resources for a first type UE to each UE without exceeding the determined number of resource blocks and sending information on the allocation result, and sending control information and data associated with the control information according to the resources allocated to each UE.

Hereinabove, various embodiments of the present invention have been shown and described for the purpose of illustration without limiting the subject matter of the present invention. It should be understood that many variations and modifications of the basic inventive concept described herein will still fall within the spirit and scope of the present invention as defined in the appended claims and their equivalents. In addition, it is possible to combine the individual embodiments if necessary for joint operation. For example, the third embodiment and the seventh embodiment of the present invention can be combined for operations of the base station and user equipment.

What is claimed is:

1. A method performed by a base station in a wireless communication system, the method comprising:
   transmitting, to a terminal, a plurality of physical uplink control channel (PUCCH) resource information and a plurality of control resource set information, wherein control resource set information includes information on resource blocks (RBs) allocated to a control resource set, and the control resource set is defined for a physical downlink control channel (PDCCH);
   transmitting, to the terminal, downlink control information (DCI) on the PDCCH in a control resource set among a plurality of control resource sets defined based on the plurality of control resource set information, wherein the DCI includes a resource indicator for explicitly indicating a PUCCH resource among a plurality of PUCCH resources defined based on the plurality of PUCCH resource information; and
   receiving, from the terminal, uplink control information (UCI) on the PUCCH resource,
   wherein PUCCH resource information includes information on an RB for a PUCCH.

2. The method of claim 1, wherein the PUCCH resource information further includes information on a number of symbols configured for the PUCCH.

3. The method of claim 1, wherein:
   the control resource set information further includes information on a duration; and
   the duration is one of 1, 2, or 3 symbols.

4. The method of claim 1, wherein a frequency hopping is applied for the PUCCH.

5. The method of claim 1, wherein at least one modulated symbol for the UCI is processed based on a block-wise spreading, a discrete fourier transform (DFT), and an inverse fast fourier transform (IFFT).

6. A method performed by a terminal in a wireless communication system, the method comprising:
   receiving, from a base station, a plurality of physical uplink control channel (PUCCH) resource information and a plurality of control resource set information, wherein control resource set information includes information on resource blocks (RBs) allocated to a control resource set, and the control resource set is defined for a physical downlink control channel (PDCCH);
   receiving, from the base station, downlink control information (DCI) on the PDCCH in a control resource set among a plurality of control resource sets defined based on the plurality of control resource set information, wherein the DCI includes a resource indicator for explicitly indicating a PUCCH resource among a plurality of PUCCH resources defined based on the plurality of PUCCH resource information; and
   transmitting, to the base station, uplink control information (UCI) on the PUCCH resource,
   wherein PUCCH resource information includes information on an RB for a PUCCH.

7. The method of claim 6, wherein the PUCCH resource information further includes information on a number of symbols configured for the PUCCH.

8. The method of claim 6, wherein:
   the control resource set information further includes information on a duration; and
   the duration is one of 1, 2, or 3 symbols.

9. The method of claim 6, wherein a frequency hopping is applied for the PUCCH.

10. The method of claim 6, wherein at least one modulated symbol for the UCI is processed based on a block-wise spreading, a discrete fourier transform (DFT), an inverse fast fourier transform (IFFT).

11. A base station in a wireless communication system, the base station comprising:
    a transceiver; and
    a controller coupled with the transceiver and configured to control to:
      transmit, to a terminal, a plurality of physical uplink control channel (PUCCH) resource information and a plurality of control resource set information, wherein control resource set information includes information on resource blocks (RBs) allocated to a control resource set, and the control resource set is defined for a physical downlink control channel (PDCCH),
      transmit, to the terminal, downlink control information (DCI) on the PDCCH in a control resource set among a plurality of control resource sets defined based on the plurality of control resource set information, wherein the DCI includes a resource indicator for explicitly indicating a PUCCH resource among a plurality of PUCCH resources defined based on the plurality of PUCCH resource information, and
      receive, from the terminal, uplink control information (UCI) on the PUCCH resource,
      wherein PUCCH resource information includes information on an RB for a PUCCH.

12. The base station of claim 11, wherein the PUCCH resource information further includes information on a number of symbols configured for the PUCCH.

13. The base station of claim 11, wherein:
the control resource set information further includes information on a duration, and
the duration is one of 1, 2, or 3 symbols.

14. The base station of claim 11, wherein a frequency hopping is applied for the PUCCH.

15. The base station of claim 11, wherein at least one modulated symbol for the UCI is processed based on a block-wise spreading, a discrete fourier transform (DFT), an inverse fast fourier transform (IFFT).

16. A terminal in a wireless communication system, the terminal comprising:
a transceiver; and
a controller coupled with the transceiver and configured to control to:
receive, from a base station, a plurality of physical uplink control channel (PUCCH) resource information and a plurality of control resource set information, wherein control resource set information includes information on resource blocks (RBS) allocated to a control resource set, and the control resource set is defined for a physical downlink control channel (PDCCH),
receive, from the base station, downlink control information (DCI) on the PDCCH in a control resource set among a plurality of control resource sets defined based on the plurality of control resource set information, wherein the DCI includes a resource indicator for explicitly indicating a PUCCH resource among a plurality of PUCCH resources defined based on the plurality of PUCCH resource information, and
transmit, to the base station, uplink control information (UCI) on the PUCCH resource,
wherein PUCCH resource information includes information on an RB for a PUCCH.

17. The terminal of claim 16, wherein the PUCCH resource information further includes information on a number of symbols configured for the PUCCH.

18. The terminal of claim 16, wherein:
the control resource information further includes information on a duration, and
the duration is one of 1, 2, or 3 symbols.

19. The terminal of claim 16, wherein a frequency hopping is applied for the PUCCH.

20. The terminal of claim 16, wherein at least one modulated symbol for the UCI is processed based on a block-wise spreading, a discrete fourier transform (DFT), an inverse fast fourier transform (IFFT).

* * * * *